United States Patent
Yamamoto et al.

(10) Patent No.: US 7,243,117 B2
(45) Date of Patent: Jul. 10, 2007

(54) RANDOM NUMBER GENERATOR AND PROBABILITY GENERATOR

(75) Inventors: Hiroyasu Yamamoto, Tokyo (JP); Takakuni Shimizu, Tokyo (JP); Ananda Vithanage, Tokyo (JP); Misako Koibuchi, Tokyo (JP); Ryuji Soga, Tokyo (JP); Takaaki Shiga, Tokyo (JP)

(73) Assignee: FDK Corporation, Tokyo (JP)

( * ) Notice: Subject to any disclaimer, the term of this patent is extended or adjusted under 35 U.S.C. 154(b) by 720 days.

(21) Appl. No.: 10/626,848

(22) Filed: Jul. 23, 2003

(65) Prior Publication Data
US 2005/0193045 A1    Sep. 1, 2005

Related U.S. Application Data

(63) Continuation of application No. PCT/JP02/00743, filed on Jan. 31, 2002.

(30) Foreign Application Priority Data

| Feb. 7, 2001 | (JP) | ............................. | 2001-030833 |
| Jun. 6, 2001 | (JP) | ............................. | 2001-170945 |
| Jul. 17, 2001 | (JP) | ............................. | 2001-216704 |
| Jul. 18, 2001 | (JP) | ............................. | 2001-217710 |

(51) Int. Cl.
*G06F 1/02* (2006.01)

(52) U.S. Cl. ..................................... 708/250; 708/251
(58) Field of Classification Search ................. 708/250, 708/251, 255
See application file for complete search history.

(56) References Cited

U.S. PATENT DOCUMENTS

| 6,247,033 | B1 * | 6/2001 | Kowalski | ..................... 708/255 |
| 6,631,390 | B1 * | 10/2003 | Epstein | ....................... 708/250 |
| 2002/0156819 | A1 * | 10/2002 | Oerlemans | ................... 708/252 |

FOREIGN PATENT DOCUMENTS

| JP | 48 95759 A | 12/1973 |
| JP | 5 80987 A | 4/1993 |
| JP | 08-227682 A | 9/1996 |

* cited by examiner

*Primary Examiner*—Chuong D. Ngo
(74) *Attorney, Agent, or Firm*—Martin Fleit; Paul D. Bianco; Fleit Kain Gibbons Gutman Bongini & Bianco P.L.

(57) ABSTRACT

A random number generator includes a flip-flop in which an output state (0 or 1) becomes definite according to a phase difference between signals inputted to two input units, a delay unit for producing the phase difference in these two input signals, and a feedback circuit for controlling the phase difference so that an occurrence ratio of 0 or 1 of an output from the flip-flop by the input signals is constant within a specified repetition cycle.

41 Claims, 39 Drawing Sheets

RANDOM NUMBER GENERATOR AND PROBABILITY GENERATOR

RELATED APPLICATION

This is a Continuation of International Application PCT/JP02/00743, filed Jan. 31, 2002, which is hereby incorporated by reference in its entirety.

TECHNICAL FIELD

The present invention relates to a random number generator suitable for use in scientific calculation, a game machine, encryption processing or the like, and a probability generator constructed by using this random number generator. Further, the invention relates to a random number generator in which a phase difference between two input signals inputted to a flip-flop is automatically adjusted so that an occurrence ratio of 0 or 1 of an output from the flip-flop becomes constant, and particularly to efficient phase adjustment means.

BACKGROUND OF THE INVENTION

It is indispensable to use a random number for high level scientific calculation, a game machine, encryption processing or the like, and in recent years, the demand for a high performance generator of a natural random number (true random number) with uniformity (a difference in occurrence ratio is not produced according to a random number) and without regularity of random number occurrence, before-and-after correlativity, periodicity and the like, or a probability generator has been escalating.

Then, as the above natural random number/probability generator, one using a random pulse obtained by use of, for example, extremely weak radiation, thermal noise of a resistor or a diode, fluctuation of a crystal oscillator, or the like is well known.

However, in the random number/probability generating circuit using the random pulse by the above natural phenomenon, since analog components, such as a generating source of the random pulse, an amplifier of a signal, waveform shaping, and an optimizing circuit of uniformity, are much included, the circuit scale becomes large and complicated, and accordingly, it is difficult to mount these as an integrated logic LSI, and it also becomes disadvantageous for application to a microminiature and thin high-tech equipment, such as an IC card, the demand of which is expected to be increased in future. Besides, since the formation as an LSI is difficult, the productivity is poor and the cost becomes high.

Especially, since one using the thermal noise is apt to be influenced by an external noise, power supply fluctuation, temperature or the like, there is a defect that it is lacking in operation stability. Besides, with respect to one using radiation, since there is a fear that the radiation influences the environment or the like even though it is extremely weak, the amount of usable radiation has a limit, and it has been difficult to cope with such a use that a lot of random numbers are generated in a short time.

SUMMARY OF THE INVENTION

An object of the invention is to provide a random number generator and a probability generator having high performance and high stability, which realizes generation of a natural random number by a structure of a digital circuit, so that the problem of the prior art, that is, the problem of uniformity, regularity, correlativity, periodicity and the like is resolved.

A still another object of the invention is to provide a high performance random number generator and probability generator, which resolves the problem of the prior art, realizes miniaturization and reduction in thickness suitable for mounting on LSI, is excellent in productivity, and has such performance that there does not arise a problem of uniformity, regularity, correlativity, periodicity and the like.

A still another object of the invention is to provide a high speed and high performance random number generator.

A still another object of the invention is to provide a one-bit random number generator, a multi-bit random number generator and a probability generator, in which the uniformity of occurrence of random number data is easily verified, and the reliability can be raised.

Here, a D-type flip-flop is known as a flip-flop in which an output state (0 or 1) becomes definite according to a phase difference between signals inputted to two input units.

As shown in FIG. 13, this D-type flip-flop includes a clock terminal CLK and a data terminal D as input units, and is a so-called edge trigger type flip-flop in which like input/output waveforms shown in FIGS. 14(a) and 14(b), the states of outputs Q and /Q (/Q: inversion output of Q) become definite according to the state (0 or 1) of the data terminal D at the time of rising of a CLK input.

Here, when a difference (phase difference) Δt between the rising time of a CLK signal and the rising time of a D signal is made to approach 0 from the state of FIG. 14(a) or FIG. 14(b), as shown in FIG. 14(c), there is a range of the phase difference in which the outputs Qn and /Qn from the flip-flop become indefinite.

The invention actively uses such indefinite operation of a flip-flop to generate a natural random number.

First Mode of the Invention

That is, a random number generator as set forth herein is characterized by comprising a flip-flop in which an output state (0 or 1) becomes definite according to a phase difference between signals inputted to two input units, a delay unit for producing the phase difference between these two input signals, and a feedback circuit for controlling the phase difference of the delay unit so that an occurrence ratio of 0 or 1 of an output from the flip-flop by the input signals is constant within a specified repetition cycle.

Besides, a random number generator as set forth herein is characterized in that the delay unit comprises a delay circuit for delaying the input signals at several stages and outputting them, and a selection circuit for selecting one of delay outputs according to a select input.

Besides, a random number generator as set forth herein is characterized in that the feedback circuit comprises a first counter for measuring the specified repetition cycle of the input signals, a second counter for measuring the number of occurrences of 0 or 1 of the output from the flip-flop in every repetition cycle, a register for holding a measurement output of the second counter every repetition cycle, a constant setter for generating comparison data for setting of the occurrence ratio of 0 or 1 of the output from the flip-flop, a comparator for comparing output data of the register with the comparison data, and a reversible counter for generating a select signal of the selection circuit on the basis of a comparison output of the comparator.

In the structure of the invention, the natural random number generator, which relates to the generation of a random number, has uniformity, and has no regularity, no correlativity and no periodicity, can be realized entirely by the digital circuits. Besides, by suitably setting the repetition cycle of the input signals and the resolution of the set phase difference in the delay unit, a lot of random numbers can be generated at high speed. Further, because of the digital circuit structure, it is easy to cope with the formation as an LSI.

Besides, a random number generator as set forth herein is characterized in that a random number outputted from the flip-flop, or a random number constructed by scrambling the former random number is used as set data of the repetition cycle set for the first counter and the comparison data of the comparator.

In this structure, the periodicity relating to the generation of the random number can be completely eliminated.

Besides, a random number generator as set forth herein is characterized by comprising an auxiliary random number generating unit having a same structure as the random number generator as set forth herein, in which a random number from the auxiliary random number generating unit is used as set data of the repetition cycle set for the first counter and the comparison data of the comparator.

Besides, a random number generator as set forth herein is characterized by comprising an auxiliary random number generating unit having a same structure as the random number generator as set forth herein, in which a random number from the auxiliary random number generating unit and a random number constructed by scrambling a random number from the random number generator are used as set data of the repetition cycle set for the first counter and the comparison data of the comparator.

In the structure of above, since the random number data from the auxiliary random number generating unit is not entirely outputted to the outside (outside of the random number generator), it is impossible to predict the property, tendency, periodicity and the like of the generated random number, and a complete natural random number can be formed.

Besides, a random number generator as set forth herein is characterized in that a waveform shaping circuit is added to an input signal line of the flip-flop.

By the dullness of the input signal caused by the waveform shaping, the indefinite operation range of the flip-flop is extended, and the generation of the random number is more facilitated.

Besides, a random number generator as set forth herein is characterized by comprising an initial control circuit for setting the comparison data of the comparator to 0 for a specified period when power is turned on.

By this, a period from the power-on to the generation of a suitable random number can be shortened.

Besides, a random number generator as set forth herein is characterized in that a D-type flip-flop or an R-S flip-flop is used as the flip-flop.

Besides, a random number generator as set forth herein is characterized by comprising a plurality of the random number generators as set forth above arranged in parallel to one another. A mutual relation does not exist entirely between the respective random number generators constituting this parallel type random number generator. Besides, each of the random number generators has no regularity, no correlativity and no periodicity.

Besides, a probability generator as set forth herein is characterized by comprising the random number generator.

As described above, since the random number generator has uniformity and has no regularity, no correlativity and no periodicity, the whole probability distribution is uniform.

Second Mode of the Invention

As set forth above, a D-type flip-flop is well known as a flip-flop in which an output state (1 or 0) becomes definite according to a phase difference between signals inputted to two input units. As shown in FIG. 13, the D-type flip-flop includes the clock terminal CLK and the data terminal D as the input units, and is the so-called edge trigger type flip-flop in which the states of the outputs Q and /Q (/Q: inversion output of Q) become definite according to the state (0 or 1) of the data terminal D at the time of rising of a CLK input signal.

Here, when the difference (phase difference) $\Delta t$ between the rising time of the CLK signal and the rising time of the D signal is made to approach 0 from the state of FIG. 14($a$) or FIG. 14($b$), as shown in FIG. 14($c$), there is a range of the phase difference in which the outputs Qn and /Qn from the flip-flop become indefinite. The indefinite operation range of this flip-flop is extended as jitter in the input signal becomes large, and the generation of the random number is more facilitated.

The invention increases the jitter in the input signal, and actively uses the indefinite operation of the flip-flop at that time to generate a natural random number.

That is, a random number generator as set forth herein in which a phase difference between two input signals inputted to a flip-flop is automatically adjusted to make an occurrence ratio of 1 or 0 of an output from the flip-flop constant, wherein a jitter generation circuit including a source for generating a noise, an amplifier circuit for amplifying the noise, and a mixer circuit for generating jitter in the input signals by the amplified noise signal is added to an input line of the flip-flop.

Besides, a random number generator as set forth herein is constructed by adding the jitter generation circuit to both input lines of the flip-flop.

Besides, a random number generator as set forth herein is constructed by adding the jitter generation circuit to any one of input lines of the flip-flop, and adding an integration circuit for delay time correction to the other of the input lines.

Here, in the structure as set forth above, the jitter is generated in the input signals inputted to the flip-flop, and the indefinite operation range of the flip-flop is extended. By this, it becomes possible to easily generate a more complete natural random number with uniformity and without regularity, correlativity and periodicity.

Besides, a random number generator is constructed by adding latch means for latching an output of the jitter generation circuit every repetition cycle of the input signals.

In this structure, one input signal can be obtained in one random number generation, and the generation operation of the random number becomes stable.

Besides, a random number generator as set forth herein in which a phase difference between two input signals is automatically adjusted to make an occurrence ratio of 1 or 0 of an output from a flip-flop constant, wherein a phase-voltage conversion circuit for converting the phase difference between the two input signals into a voltage is added to a data input line of the flip-flop.

In this structure, in an output of the phase-voltage conversion circuit, a voltage almost equal to a threshold voltage of a semiconductor element (for example, a buffer in FIG.

39) connected thereto is generated, and the phase difference between the two input signals (that is, the output of the phase-voltage conversion circuit) is automatically adjusted to make the occurrence ratio of 1 or 0 of the output from the flip-flop constant.

Besides, in a random number generator as set forth herein, the phase-voltage conversion circuit is constructed by adding enable means operating only at an operation permissible time.

In this structure, an operation enabling signal is issued only at the time when a random number is needed, so that an active period of the circuit can be freely controlled, and reduction in electric power can be realized.

Besides, a random number generator as set forth herein claim is constructed by adding a jitter generation circuit including a source for generating a noise, an amplifier circuit for amplifying the noise, and a mixer circuit for generating jitter in the input signals by the amplified noise signal to an output of the phase-voltage conversion circuit.

In this structure, an indefinite element in probability of the occurrence of 1 or 0 of the output from the flip-flop is actively increased. By this, it becomes possible to easily generate a more stable natural random number with uniformity and without regularity, correlativity and periodicity.

Besides, in a random number generator as set forth herein, the jitter generation circuit is constructed by adding enable means operating only at an operation permissible time.

In this structure, an operation permissible signal is issued only at the time when a random number is needed, so that an active period of the circuit can be freely limited, and reduction in electric power can be realized.

Besides, in a random number generator as set forth herein, the mixer circuit includes an integration circuit, and a series connection circuit of a series P-channel transistor circuit and a series N-channel transistor circuit respectively having, as inputs, the integration output signal and the amplified noise signal.

Besides, in a random number generator as set forth herein, the mixer circuit is also constructed by a series transistor circuit of an N-channel transistor and a P-channel transistor having, as an input, a combined signal of the amplified noise signal and the input signal.

Besides, a random number generator as set forth herein in which a phase difference between two input signals inputted to an R-S flip-flop is automatically adjusted to make an occurrence ratio of 0.1 or 0 of an output from the flip-flop constant, wherein a P-channel transistor is connected in series to a power supply side of an R side gate circuit or an S side gate circuit of an internal transistor circuit constituting the R-S flip-flop, an N-channel transistor is connected in series to a GND side, a source for generating a noise and an amplifier circuit for amplifying the noise are connected to inputs of the P-channel transistor and the N-channel transistor, and a threshold voltage of one of the gate circuits is changed by the amplified noise signal.

Besides, a random number generator as set forth herein in which a phase difference between two input signals inputted to an R-S flip-flop is automatically adjusted to make an occurrence ratio of 1 or 0 of an output from the flip-flop constant, wherein a P-channel transistor is connected in series to a power supply side of an R side gate circuit and an S side gate circuit of an internal transistor circuit constituting the R-S flip-flop, an N-channel transistor is connected in series to a GND side, a source for generating a noise and an amplifier circuit for amplifying the noise are connected to inputs of the P-channel transistor and the N-channel transistor, and threshold voltages of both of the gate circuits are changed by the amplified noise signal.

In the R-S flip-flop, when a phase difference between the rising of the R side input signal and the rising of the S side input signal is made to approach 0, a metastable phenomenon occurs. When this phenomenon occurs, it takes a time until the output of the flip-flop becomes definite, and an output state after a given time becomes 0 or 1, or holding of the threshold voltage, or an oscillation state. Here, in the structure as set forth above, by changing the threshold voltage of the R side and/or S side gate circuit, the metastable state can be instantaneously made the stable state of 1 or 0. Then, the phase difference between the two input signals is automatically adjusted so that the occurrence ratio of 1 or 0 of the output from the flip-flop becomes constant.

Besides, in a random number generator as set forth herein, the amplifier circuit includes a series input circuit of a capacitor and a resistor, and a series circuit of a P-channel transistor and an N-channel transistor, and a resistor intervenes between an input and an output of the transistor circuit.

Besides, in a random number generator as set forth herein, the amplifier circuit includes a series input circuit of a capacitor and a resistor, and a series circuit of a P-channel transistor and an N-channel transistor, and a resistor and a capacitor intervenes in parallel between an input and an output of the transistor circuit.

Besides, in a random number generator as set forth herein, the amplifier circuit is made to have a multi-stage structure.

Here, in the structure above, when frequency characteristics of a Low Pass Filter and a High Pass Filter are suitably set according to an after-mentioned noise generation source, the amplifier with suitable characteristics can be realized. Besides, when a MOS transistor is used for the construction, the influence of temperature and power supply fluctuation can be lessened, and a stable operation can be obtained.

Besides, in a random number generator as set forth herein, the source for generating the noise is constructed by connecting a P-channel transistor and an N-channel transistor in series and short-circuiting an input and an output.

Besides, in a random number generator as set forth herein, the source for generating the noise is also constructed by connecting a P-channel transistor and an N-channel transistor in series and making a resistor intervene between an input and an output.

Besides, in a random number generator as set forth herein, the source for generating the noise is constructed by connecting a P-channel transistor and an N-channel transistor in series, making a resistor intervene between an input and an output, and making a series circuit of a resistor and a capacitor intervene between the input and GND.

Besides, in a random number generator as set forth herein, the source for generating the noise is constructed by connecting a P-channel transistor and an N-channel transistor in series, making a resistor intervene between an input and an output, and making a series circuit of a resistor and a capacitor intervene between the input and a power supply.

Besides, in a random number generator as set forth herein, the source for generating the noise is constructed by short-circuiting an input and an output of an N-channel transistor, and making a resistor intervene between the output and a power supply.

Besides, in a random number generator as set forth herein, the source for generating the noise is constructed by making a resistor intervene between an input and an output of an N-channel transistor, and by making a resistor intervene between the output and a power supply.

Besides, in a random number generator as set forth herein, the source for generating the noise is constructed by short-circuiting an input and an output of a P-channel transistor, and by making a resistor intervene between the output and GND.

Besides, in a random number generator as set forth herein, the source for generating the noise is constructed by making a resistor intervene between an input and an output of a P-channel transistor, and by making a resistor intervene between the output and GND.

Here, in the structure as set forth herein, since a faint thermal noise generated from the circuit element (transistor, resistor, capacitor, or combination of these) in the active state is used as the source for generating the noise, it can be realized by a simple circuit structure and very inexpensively.

Besides, a probability generator as set forth herein is constructed by using the random number generator.

In this structure, since the random number generator has uniformity and no regularity, no correlativity and no periodicity, an ideal probability generator can be realized. Besides, when it is used for encryption communication or the like, the communication with excellent security can be performed.

Third Mode of the Invention

As set forth above, for example, the D-type flip-flop is well known as the flip-flop in which the output state (0 or 1) becomes definite according to the phase difference between signals inputted to two input units.

As shown in FIG. 13, the D-type flip-flop includes the clock terminal CLK and the data terminal D as the input units, and is the so-called edge trigger type flip-flop in which the states of the outputs (Q and /Q) become definite according to the state of the data terminal D at the time of rising of the CLK input signal.

Here, when the difference (phase difference) Δt between the rising time of the CLK signal and the rising time of the D signal is made to approach 0 from the state of FIG. 14(a) or FIG. 14(b), as shown in FIG. 14(c), there is a range of the phase difference in which the outputs Qn and /Qn from the flip-flops become indefinite. The indefinite operation range of this flip-flop is extended as jitter in the input signals becomes large, and the generation of the random number is facilitated.

The invention relates to a random number generator which actively uses such indefinite operation of the flip-flop.

That is, the invention as set forth herein is a random number generator comprising a flip-flop in which an output state (0 or 1) becomes definite according to a phase difference between two input signals, a phase adjustment unit for adjusting phases of the input signals, and a feedback circuit unit for controlling the phase difference so that an occurrence ratio of 0 or 1 of an output from the flip-flop by the input signals converges on a given value within a specified repetition cycle, wherein the phase adjustment unit includes coarse adjustment means of a phase and fine adjustment means operating in sequence.

Besides, according to the invention as set forth herein, in the random number generator as set forth herein, each of the coarse adjustment means and the fine adjustment means includes a delay circuit for delaying the input signals at several stages and outputting them, a selection circuit for selecting one of delay outputs according to a select input, and a reversible counter for controlling the select input according to the phase difference.

In the structure as set forth above, the coarse adjustment and fine adjustment of the phase are performed, so that it becomes possible to enlarge a phase adjustment range and to make an efficient phase adjustment.

Besides, the invention as set forth herein is a random number generator comprising a flip-flop in which an output state (0 or 1) becomes definite according to a phase difference between two input signals, a phase adjustment unit for adjusting phases of the input signals, and a feedback circuit unit for controlling the phase difference so that an occurrence ratio of 0 or 1 of an output from the flip-flop by the input signals converges on a given value within a specified repetition cycle, wherein the phase adjustment unit includes a delay circuit for delaying the input signals at several stages and outputting them, a selection circuit for selecting one of delay outputs according to a select input, and a reversible counter for controlling the select input according to the phase difference, and includes a control circuit for comparing a normal distribution of the occurrence ratio of 0 or 1 with the number of times of occurrence of 0 or 1 within the repetition cycle and making a count number of the reversible counter variable according to a position of the normal distribution to which the number of times of occurrence corresponds.

In this structure, in a region where the number of times of occurrence of 0 or 1 is small, a switching width of the delay output is made large to perform the coarse adjustment of the phase, and as it approaches the center of the normal distribution, the switching width of the delay output is made small to finely adjust the phase. By this, it becomes possible to efficiently make the phase adjustment.

Besides, the invention as set forth herein is constructed by comprising, in the random number generator as set forth herein, an initial control circuit for making the repetition cycle shorter than the repetition cycle at a normal operation time for a given period from power activation.

By this, it is possible to shorten the period from the power activation to a time when a suitable random number is generated.

The invention as set forth herein is constructed by adding, in the random number generator as set forth herein a noise generation source and a noise/phase converter to both input lines of the flip-flop.

Further, the invention as set forth herein is constructed by adding, in the random number generator as set forth herein, a noise generation source and a noise/phase converter to any one of input lines of the flip-flop.

In the structure above, jitter is generated in the signals inputted to the flip-flop, and the indefinite operation range of the flip-flop is extended. By this, it becomes possible to generate a natural random number with uniformity and without regularity, correlativity and periodicity at high speed and with high accuracy.

Fourth Mode of the Invention

In the invention, attention has been paid to a built-in function capable of verifying the uniformity of occurrence of random number data by itself in order to raise the reliability as a product of a one-bit random number generator, a multi-bit random number generator, and a probability generator.

That is, among the inventions, the invention of above comprises a random number generating unit for outputting "1" and "0" as random number data, a first counter for counting a given number of times, a second counter for counting the number of times of occurrence of the random number data outputted from the random number generating unit to produce count data, a register for holding the count data of the second counter in every cycle counted by the first counter, and an output circuit for outputting the count data held in this register as verification data.

Besides, among the inventions, the invention above comprises, instead of the output circuit, a comparator for comparing previously set upper limit comparison data and lower limit comparison data with the data held in the register to output a verification signal.

Besides, among the inventions, the invention above comprises a random number generating unit for outputting "1" and "0" as random number data, a data holding unit for holding previous random number data outputted from this random number generating unit, a comparator for comparing present random number data outputted from the random number generating unit with the previous random number data held in the data holding unit, outputting a count up signal when both are identical to each other, and outputting a count clear signal when both are different from each other, a counter for counting up when the count up signal is received from the comparator and clearing count when the count clear signal is received from the comparator, and an output circuit for outputting data held in this counter as verification data.

Besides, among the inventions, the invention above comprises a random number generating unit for outputting "1" and "0" as random number data, a data holding unit for holding previous random number data outputted from this random number generating unit, a first comparator for comparing present random number data outputted from the random number generating unit with the previous random number data held in the data holding unit, outputting a count up signal when both are identical to each other, and outputting a count clear signal when both are different from each other, a counter for counting up when the count up signal is received from the first comparator and clearing count when the count clear signal is received from the first comparator, a register for holding output data of this counter, a second comparator for comparing the data of this register with the output data of the counter, outputting a data overwrite signal when the latter is larger than the former, and outputting a data hold signal at a time other than that, a control circuit for performing a control to write the output data of the counter into the register when the data overwrite signal is received from the second comparator, and to hold the data of the register when the data hold signal is received from the second comparator, and an output circuit for outputting the data held in the register as verification data.

Besides, among the inventions, the invention above comprises, instead of the output circuit, a third comparator for comparing previously set comparison data with the data held in the register to output a verification signal.

Besides, among the inventions, the invention above is constructed by comprising a random number generating unit for outputting "1" and "0" as random number data, a first counter for counting a given number of times, a data holding unit for holding previous random number data outputted from the random number generating unit, a comparator for comparing present random number data outputted from the random number generating unit with the previous random number data held in the data holding unit, outputting a count up signal when both are identical to each other, and outputting a count clear signal when both are different from each other, a second counter for counting up when the count up signal is received from the comparator and clearing count when the count clear signal is received from the comparator, a decoder for decoding output data of the second counter to output it for respective signal lengths, plural third counters for respectively counting output data of the decoder for the respective signal lengths, plural registers for respectively holding output data of the respective third counters every given number of times counted by the first counter, and a control circuit for performing a control to output verification data from the respective registers on the basis of a signal in every given number of times counted by the first counter and output data of the comparator.

Besides, among the inventions, the invention above is constructed by providing a selection circuit for selecting and outputting the output data of the registers.

Besides, among the inventions, the invention above is constructed by connecting a plurality of the one-bit random number generators in parallel to each other and providing a selection circuit for selecting verification data outputted from these one-bit random number generators for every bit and outputting them.

Besides, among the inventions, the invention above is constructed by connecting a plurality of the one-bit random number generators in parallel to each other and providing a selection circuit for selecting verification signals outputted from these one-bit random number generators for every bit and outputting them.

Besides, among the inventions, the invention above is constructed by comprising the one-bit random number generator, a shift register for converting the random number data outputted from the one-bit random number generator from serial data to parallel data, a counter for counting a bit length of given parallel data, a register for holding the parallel data of the shift register in every cycle counted by the counter, and a comparator for comparing previously set probability upper limit data and probability lower limit data with the parallel data held in the register to output a probability signal.

Further, among the inventions, the invention above is constructed by comprising the multi-bit random number generator, and a comparator for comparing previously set probability upper limit data and probability lower limit data with random number data outputted from the multi-bit random number generator to output a probability signal.

In these structures, a D-type flip-flop can be cited as a typical example of the data holding unit, and an exclusive-OR element can be cited as a typical example of the comparator. Then, by adopting such structure, it becomes possible to verify the uniformity of occurrence of the random number data by itself, and an operation is performed so that it becomes unnecessary for a user to perform a statistical processing.

Incidentally, signs in brackets are for the convenience in the expression of corresponding elements in the drawings, and accordingly, the invention is not limited to the illustration of the drawings.

BRIEF DESCRIPTION OF THE DRAWINGS

FIGS. 1 to 14 show a first mode of the invention, in which

FIG. 1 is a circuit diagram showing a first embodiment of a random number generator of the invention, FIG. 2 is similar to FIG. 1 and is a circuit diagram showing a second embodiment of a random number generator, FIG. 3 is a circuit diagram showing a third embodiment of a random number generator, FIG. 4 is a circuit diagram showing a fourth embodiment of a random number generator, FIG. 5 is a circuit diagram showing a fifth embodiment of a random number generator, FIG. 6 is an essential part circuit diagram of a random number generator of the invention added with a waveform shaping circuit, FIG. 7 is a view showing a specific waveform shaping circuit, FIG. 8 is a view showing input/output waveforms of the waveform shaping circuit of FIG. 7, FIG. 9 is an essential part circuit diagram of a random number generator of the invention added with an initial control circuit, FIG. 10 is an essential part circuit diagram of a random number generator of the invention using an R-S flip-flop, FIG. 11 is a block structural view of a parallel type random number generator of the invention, FIG. 12 is a view showing a probability distribution of a probability generator of the invention, FIG. 13 is a view showing a D-type flip-flop, and FIG. 14 is a view showing input/output waveforms of the D-type flip-flop of FIG. 13.

FIGS. 15 to 47 shows a second mode of the invention, in which

FIG. 15 is a view showing a first embodiment of a random number generator in the second mode of the invention, FIG. 16 is a view showing a structure different from the random number generator (FIG. 15), FIG. 17 is a view showing a structure of a jitter generation circuit of the invention, FIG. 18 is a view showing a structure of a jitter generation circuit of the invention different from FIG. 17, FIG. 19 is a view showing input/output waveforms in jitter generation, FIG. 20 is a view showing a structure of a noise generation source of the invention, FIG. 21 is a view showing a structure of a noise generation source of the invention different from FIG. 20, FIG. 22 is a view showing a structure of a noise generation source of the invention different from FIG. 21, FIG. 23 is a view showing a structure of a noise generation source of the invention different from FIG. 22, FIG. 24 is a view showing a structure of a noise generation source of the invention different from FIG. 23, FIG. 25 is a view showing a structure of a noise generation source of the invention different from FIG. 24, FIG. 26 is a view showing a structure of a noise generation source of the invention different from FIG. 25, FIG. 27 is a view showing a structure of a noise generation source of the invention different from FIG. 26, FIG. 28 is a view showing a structure of an amplifier circuit of the invention, FIG. 29 is a view showing a structure of an amplifier circuit of the invention different from FIG. 28, FIG. 30 is a view showing a circuit structure of a jitter generation circuit of the invention, FIG. 31 is a view showing a circuit structure of a jitter generation circuit of the invention different from FIG. 30, FIG. 32 is a view showing a circuit structure of a jitter generation circuit of the invention different from FIG. 31, FIG. 33 is a view showing a circuit structure of a jitter generation circuit of the invention different from FIG. 32, FIG. 34 is a view showing a circuit structure of a jitter generation circuit of the invention different from FIG. 33, FIG. 35 is a view showing a circuit structure of a jitter generation circuit of the invention different from FIG. 34, FIG. 36 is a view showing a circuit structure of a jitter generation circuit of the invention different from FIG. 35, FIG. 37 is an essential part circuit diagram of a random number generator of the invention added with a latch circuit, FIG. 38 is an essential part circuit diagram of a random number generator of the invention added with a latch circuit different from FIG. 37, FIG. 39 is a view showing a second embodiment of a random number generator in the second mode of the invention, FIG. 40 is a view showing a phase-voltage conversion circuit of the invention, FIG. 41($a$) and FIG. 41($b$) are views showing an operation of the phase-voltage conversion circuit of FIG. 40, FIG. 42 is a view showing a structure of a phase-voltage conversion circuit of the invention different from FIG. 40, FIG. 43 is a view showing a constitution of a random number generator of the second embodiment of the invention different from FIG. 39.

FIG. 44 is a view showing a third embodiment of a random number generator of the invention, FIG. 45 is a view showing an internal structure of an R-S flip-flop, FIG. 46 is a view showing an internal structure of an R-S flip-flop of the third embodiment in the second mode of the invention, and FIG. 47 is a view showing an internal structure of an R-S flip-flop of the third embodiment of the invention different from FIG. 46.

FIGS. 48 to 54 are views showing a third mode of the invention, in which

FIG. 48 is a view showing a structure of a random number generator of a first embodiment in the third mode of the invention, FIG. 49 is a view showing a structure of a random number generator of the first embodiment different from FIG. 48, FIG. 50 is a view showing a structure of a random number generator of a second embodiment, FIG. 51 is a view showing an operation range of coarse adjustment and fine adjustment at a time of phase adjustment, FIG. 52 is a view showing a structure of a random number generator of a third embodiment, FIG. 53 is a view showing a normal distribution of random numbers with uniformity, and FIG. 54 is a view in which the normal distribution of FIG. 53 is divided and is weighted.

FIGS. 55 to 67 show a fourth mode of the invention, in which

FIG. 55 is a circuit diagram showing a first embodiment of a one-bit random number generator of the invention, FIG. 56 is a circuit diagram showing a second embodiment of a one-bit random number generator of the invention, FIG. 57 is a circuit diagram showing a third embodiment of a one-bit random number generator of the invention, FIG. 58 is a circuit diagram showing a fourth embodiment of a one-bit random number generator of the invention, FIG. 59 is a circuit diagram showing a fifth embodiment of a one-bit random number generator of the invention, FIG. 60 is a circuit diagram showing a sixth embodiment of a one-bit random number generator of the invention, FIG. 61 is a circuit diagram showing a seventh embodiment of a one-bit random number generator of the invention, FIG. 62 is a circuit diagram showing a first embodiment of a multi-bit random number generator of the invention, FIG. 63 is a circuit diagram showing a second embodiment of a multi-bit random number generator of the invention, FIG. 64 is a circuit diagram showing a first embodiment of a probability generator of the invention, FIG. 65 is a circuit diagram showing a second embodiment of a probability generator of the invention, FIG. 66 is a circuit diagram showing a third embodiment of a probability generator of the invention, and FIG. 67 is a circuit diagram showing a fourth embodiment of a probability generator of the invention.

BEST MODE FOR CARRYING OUT THE INVENTION

Embodiments of the First Mode

First, embodiments of a random number generator and a probability generator of the invention will be described with reference to FIGS. 1 to 12.

Figure 1:
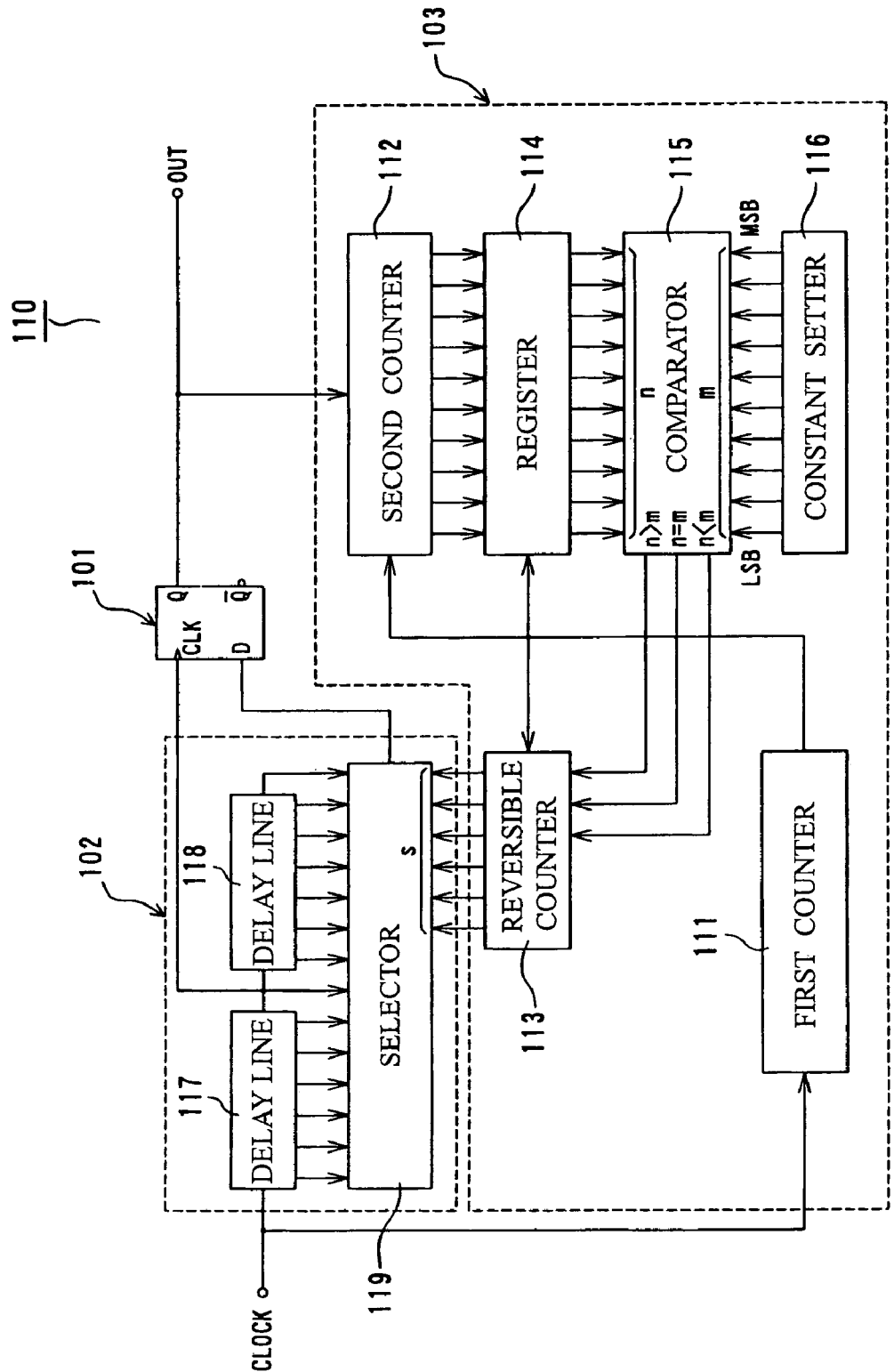

FIG. 1 is a circuit diagram showing a first embodiment of a random number generator.

As shown in FIG. 1, a random number generator 110 of the first embodiment is constituted by a flip-flop 101, a delay unit 102, and a feedback circuit 103.

Figure 13:
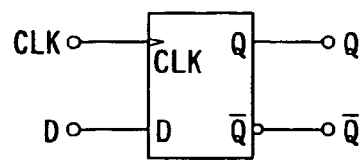

Here, a flip-flop having such a function that an output state (0 or 1) becomes definite according to a phase difference between input signals (CLOCK) inputted to two input units can be used as the flip-flop 101, and this embodiment uses a D-type flip-flop provided with a clock terminal CLK and a data terminal D for signal input and shown in FIG. 13.

Besides, the delay unit 102 includes plural delay output terminals, and is constituted by two delay circuits 117 and 118 (delay line) connected in series to each other, and a selection circuit 119 (selector) for selecting any one of the delay outputs according to a select input. A connection point (which becomes a delay intermediate point) of the two delay circuits 117 and 118 is connected to the clock terminal CLK of the D-type flip-flop 101, an output of the selection circuit 119 is connected to the data terminal D, and the phase difference between rising times of two signals inputted to the D-type flip-flop 101 can be arbitrarily adjusted.

Besides, the feedback circuit 103 is constituted by a first counter 111, a second counter 112, a register 114, a constant setter 116, a comparator 115, and a reversible counter 113 (up/down counter).

The first counter 111 measures a previously determined repetition cycle [CLOCK number (2×m)] of the input signal CLOCK, and the second counter 112 measures the number of occurrences of 1 (or 0) of the output from the flip-flop in every repetition cycle. Besides, the register 114 captures and holds a count value of the second counter 112 in every repetition cycle. Incidentally, the second counter 112 is cleared to 0 each time the count value is set in the register 114. The constant setter 116 outputs comparison data for setting an occurrence ratio of 1 (or 0) of the output from the flip-flop. In this embodiment, it is previously set so that a value (m) of half of the repetition cycle [CLOCK number (2×m)] is outputted. Besides, the comparator 115 compares the held data (n) of the register 114 with the comparison data (m) from the constant setter 116, and generates a comparison output corresponding to a comparison result (n>m) or (n=m) or (n<m). The reversible counter 113 operates in an operation mode set by the comparison output from the comparator 115, and outputs its count data as the select signal s of a next stage of the selection circuit 119. Then, as described before, the selection circuit 119 outputs a predetermined delay signal of the original CLOCK signal selected by the select signal s.

That is, according to the above structure, according to the comparison output of the output data (n) of the register 114 and the output data (m) from the constant setter 116, the reversible counter 113 performs an up/down operation (for example, at the time of n>m, count up, at the time of n<m, count down) in every repetition cycle, and automatically corrects the rising time of the CLOCK signal inputted to the data terminal D of the D-type flip-flop 101 so that the comparison output of the comparator 115 converges on n=m (at the time of n=m, the count operation is stopped, and the phase difference between the CLOCK signals is kept constant). Specifically, as in FIG. 14(c), a control is performed such that the phase difference Δt between the rising of the CLK signal and the rising of the D signal approaches 0. By this, one-bit serial random number data OUT in which the occurrence ratio of 0 and 1 is always kept 50% and which has uniformity can be obtained at the output of the D-type flip-flop 101.

Besides, in this embodiment, although the comparison data set in the constant setter 116 is set to half (that is, m) of the repetition cycle of the first counter 111, the occurrence ratio of 0 or 1 of the D-type flip-flop can be set to a value other than 50% by changing the value of m. For example, if m is set to ⅕ of the repetition cycle, the occurrence ratio of 0 or 1 becomes 20%.

By the way, in the first embodiment, since the repetition cycle of the first counter 111 is always fixed to be constant (2×m), there is a possibility that generated random numbers indicate some periodic tendency. Hereinafter, a second to a fourth embodiments shown in FIGS. 2 to 5 are methods for completely eliminating such periodicity of random numbers.

Figure 2:
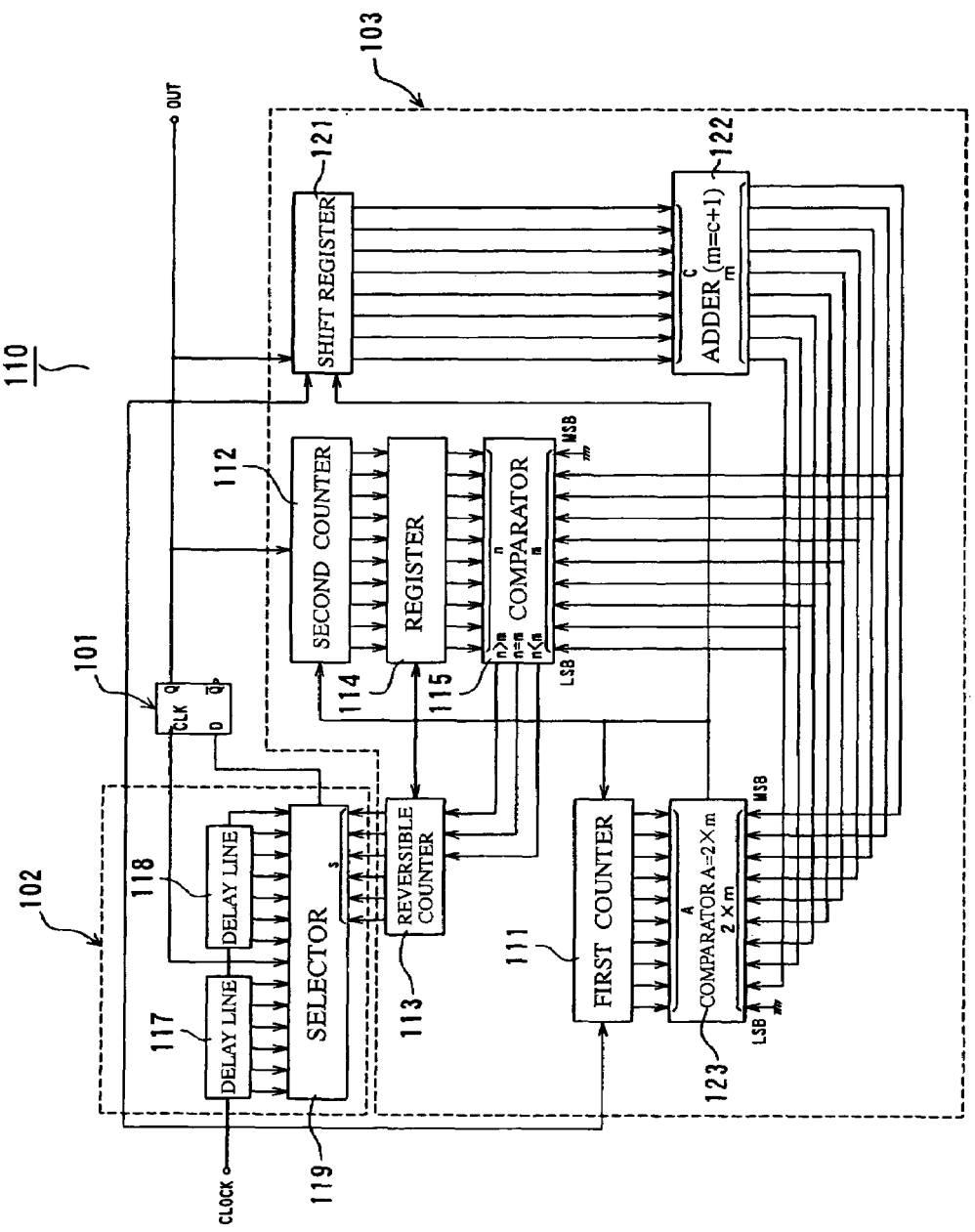

First, the second embodiment shown in FIG. 2 is an example in which instead of the foregoing constant setter 116, a shift register 121, an adder 122, a comparator 123, and the like are newly provided, and a random number sequence outputted every repetition cycle is made setting data (2×m) of a next repetition cycle and comparison data (m) of a comparator 115. Incidentally, the adder 122 adds 1 to a range of output random numbers (0 to m−1) to change it to a range of (1 to m) in order to use the random number sequence as the setting data and the comparison data. Besides, the new comparator 123 generates a repetition cycle (2×m) from count data (A) of the first counter 111 and output data (m) of the adder 122.

Figure 3:
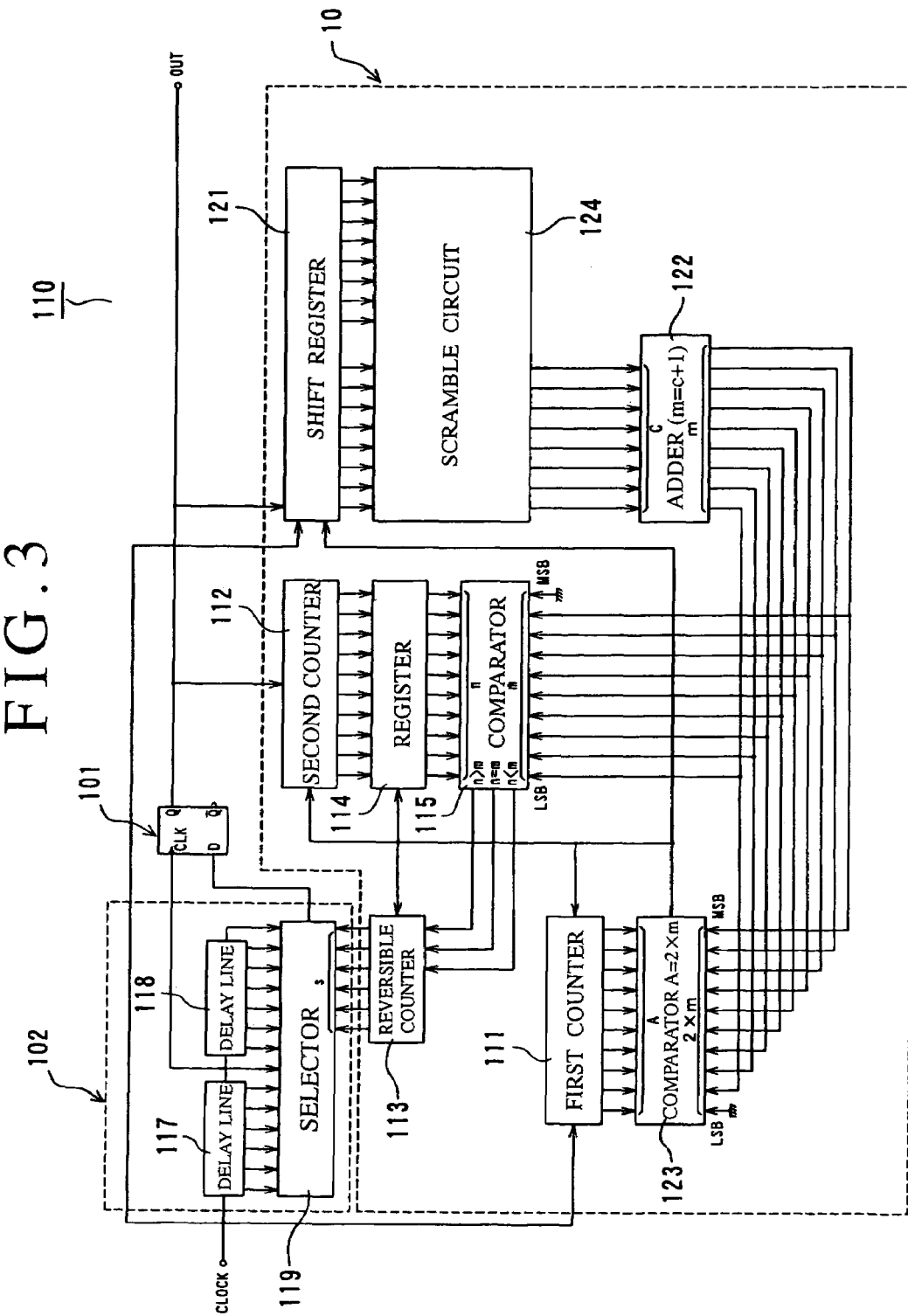

Next, a third embodiment shown in FIG. 3 is an example in which a scramble circuit 124 is added to the second embodiment, and an outputted random number is further scrambled and is used as the setting data and the comparison data. Incidentally, the term "scramble" means to perform a logical operation (for example, exclusive OR, exclusive OR of exclusive OR and exclusive OR, etc.) of arbitrary data of plural data lines each other to convert it to data different from original data. In FIG. 3, 16-bit output data of the shift register 121 is converted into 8-bit data by the scramble circuit 124.

According to these second and third embodiments, since the repetition cycle is successively changed when a random number is generated, the periodicity of generated random numbers is completely removed.

Figure 4:
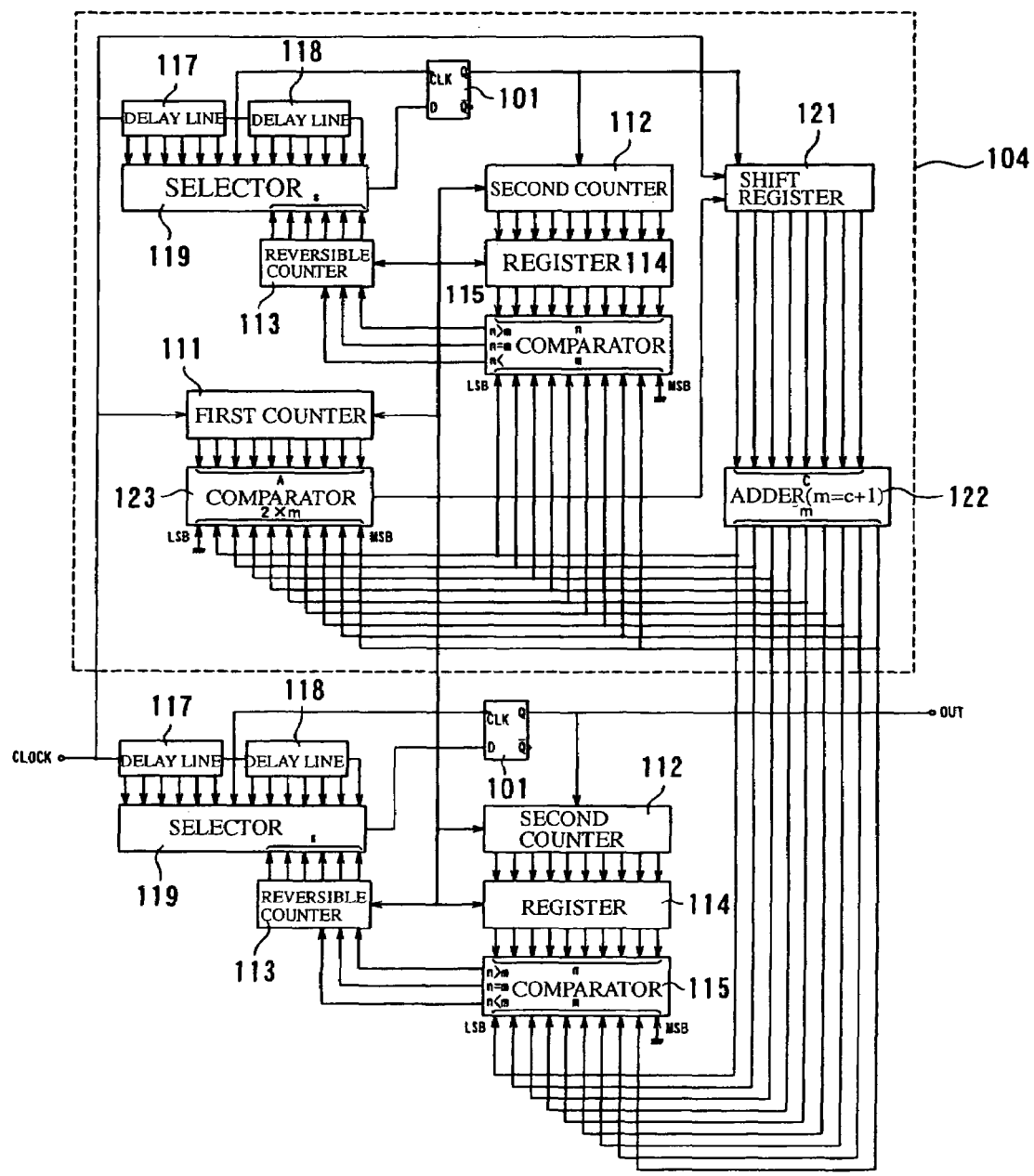
Figure 5:
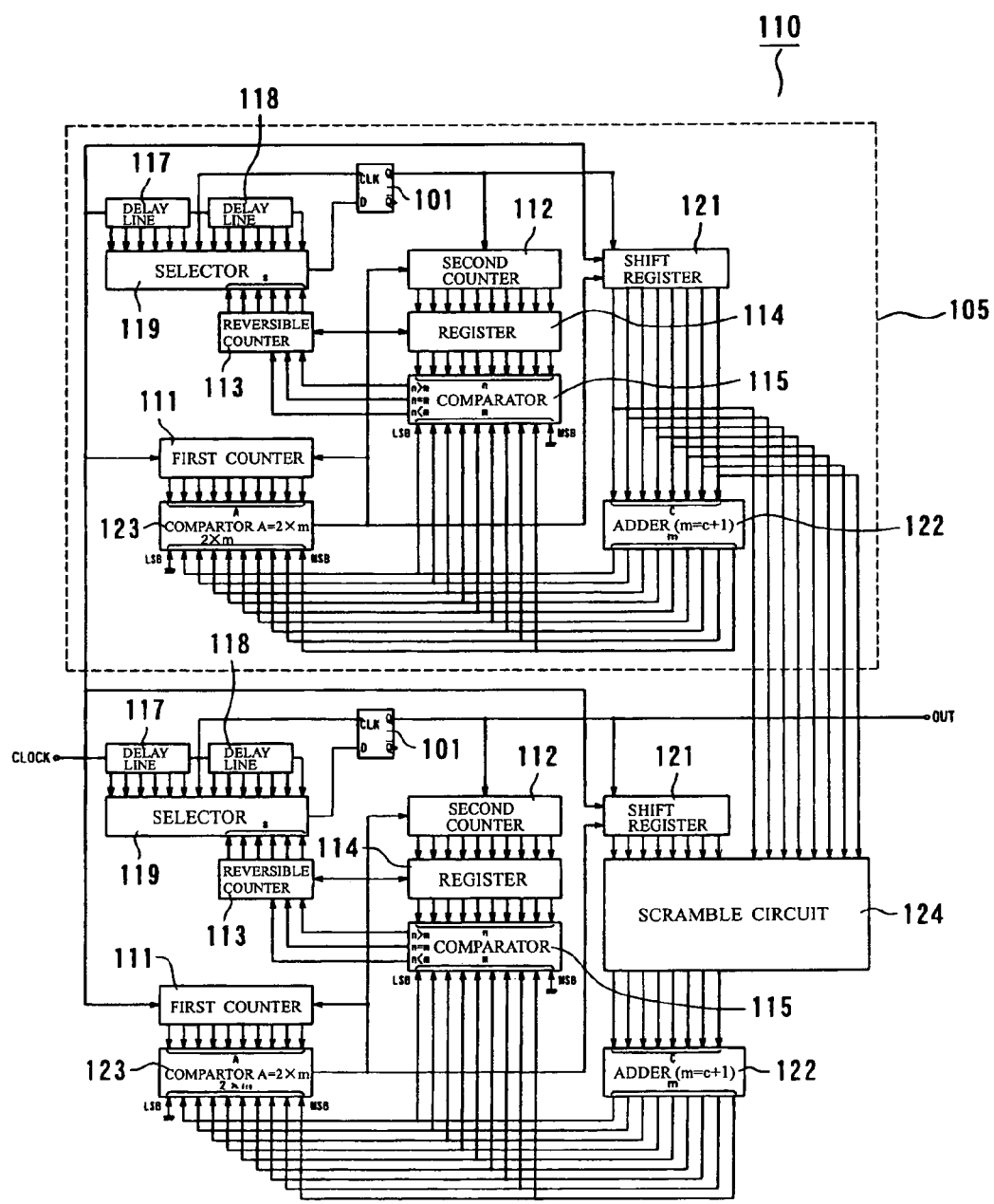

Next, a fourth embodiment shown in FIG. 4 is an example in which the random number generator according to the second embodiment is added as an auxiliary random number generating unit 104, and a random number sequence generated by this auxiliary random number generating unit 104 is used as, similarly to the above, setting data (2×m) of a repetition cycle and comparison data (m) of a comparator 115. A fifth embodiment shown in FIG. 5 is an example in which the random number generator according to the third embodiment is added as an auxiliary random number generating unit 105, and an output of the auxiliary random number generating unit 105 and an output of a random number generator 110 itself are scrambled.

According to these fourth and fifth embodiments, the random numbers of the auxiliary random number generating units 104 and 105 as the setting data and the comparison data are used for the internal circuits of the random number generators 110, and are not outputted to the outside, and therefore, a third party can not predict the property, tendency and periodicity of the random numbers, and complete natural random numbers can be obtained.

Figure 6:
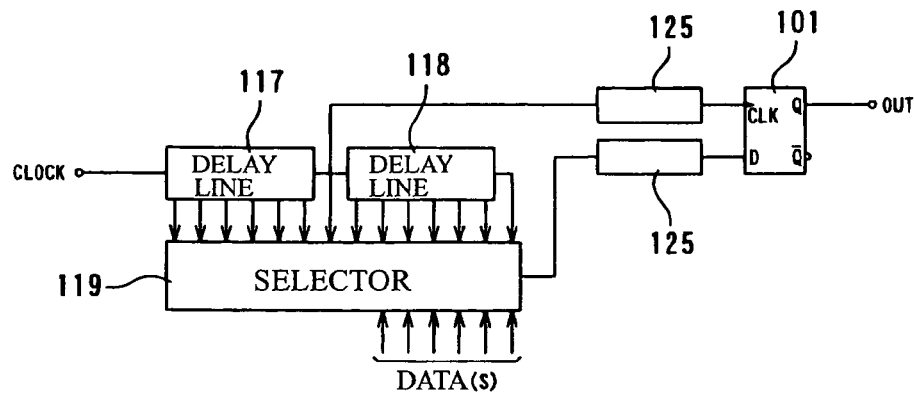

FIG. 6 shows an essential part circuit of a random number generator added with waveform shaping circuits 125. Like this, when the waveform shaping circuits 125 are added to input lines (D terminal and CLK terminal) of a D-type flip-flop 101 to forcibly dull edges of respective input signals, the generation of a random number can be made more easier.

Figure 7:
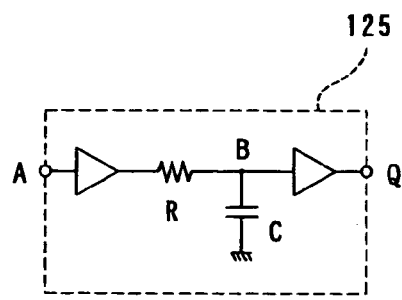
Figure 8:
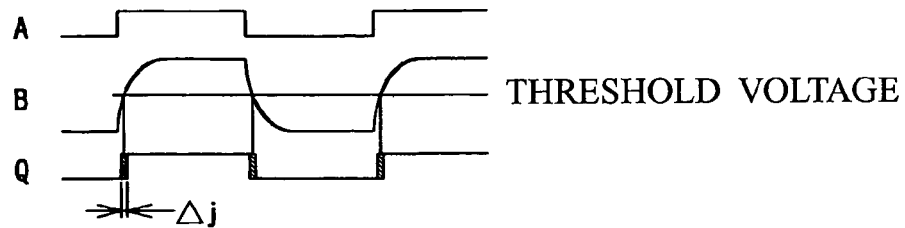
Figure 8:
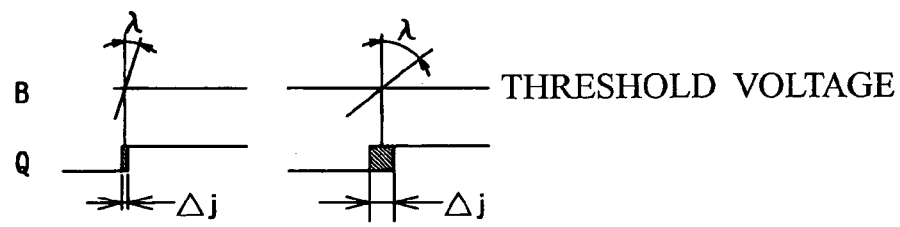

FIG. 7 shows the waveform shaping circuit 125 constructed by inserting an integration circuit of a resistor R and a capacitor C between input and output gates. Like input and output waveforms shown in FIG. 8(*a*), jitter $\Delta j$ is generated in the output waveform at an intersection point of a threshold voltage of the gate and an integration waveform. FIG. 8(*b*) shows a relation between an inclination $\lambda$ of an intersection part of the threshold voltage and the integration waveform, and the jitter $\Delta j$, and as the inclination $\lambda$ (that is, dullness of the signal) becomes large, the jitter $\Delta j$ becomes large. That is, the magnitude of the jitter $\Delta j$ extends an indefinite operation range of the flip-flop, and eventually, the generation of a random number is more facilitated.

Incidentally, the waveform shaping circuit 125 is not limited to that of the resistor R and the capacitor C, but may be naturally constructed by, for example, a coil and a capacitor.

Figure 9:
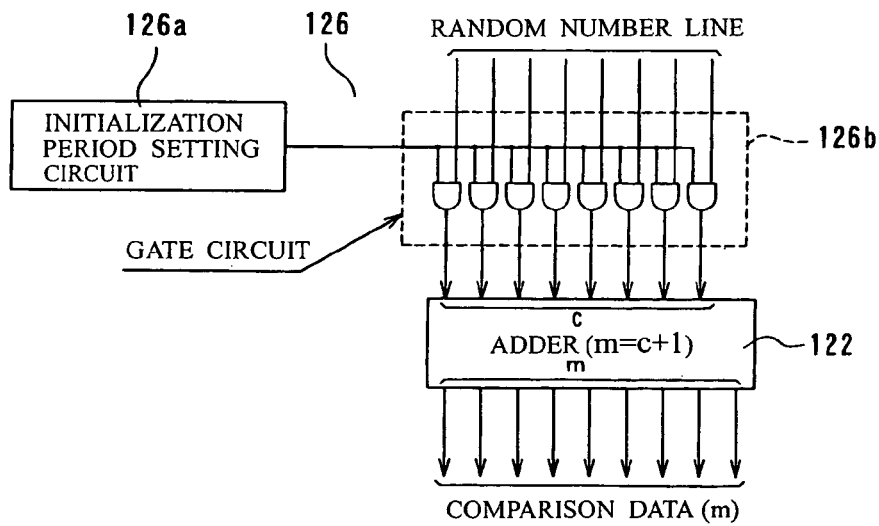

Besides, as shown in FIG. 9, in the foregoing second to fifth embodiments, an initial control circuit 126 constituted by an initialization period setting circuit 126*a* and a gate circuit 126*b* is added to a random number output line for comparison data, and the comparison data is forcibly made 0 for a specified repetition cycle period when power is turned on. By such initialization of the comparison data, a phase correction operation of input signals at power-on can be made efficient, and a transitional period from power-on to a time when a suitable random number is obtained can be made minimum.

Figure 10:
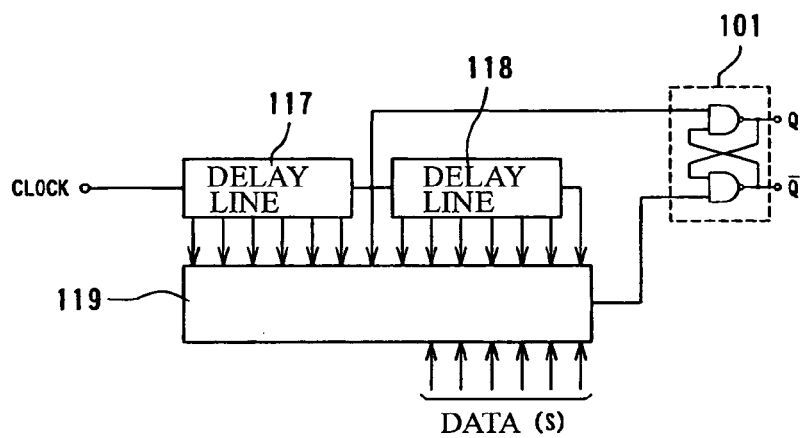

In the embodiments described above, although the D-type flip-flop is used as the flip-flop for generating a random number, the invention is not limited to only this, and any flip-flop can be used as long as it has a function equivalent to this. For example, as another example, a structure using an R-S flip-flop is shown in FIG. 10. According to FIG. 10, a connection point between delay circuits 117 and 118 is connected to the set input of an R-S flip-flop 101, and an output of a selection circuit 119 is connected to the reset input of the R-S flip-flop 101.

Figure 11:
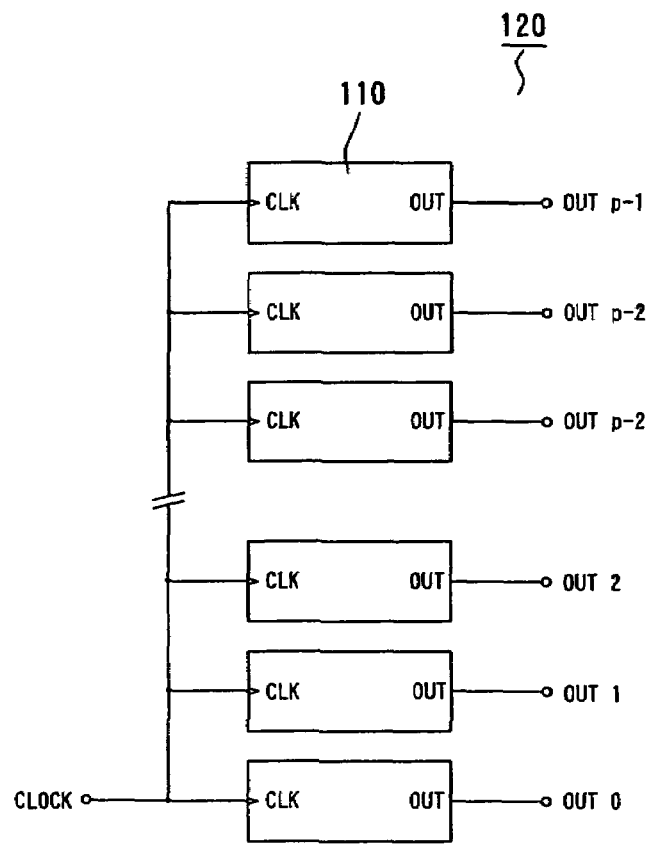

Besides, as shown in FIG. 11, when the P serial type random number generators 110 described above are arranged in parallel to each other, a parallel type random number generator 120 of a P-bit structure can be constructed. In this parallel type random number generator 120, there is no mutual relation between the respective random number generators 110.

Next, a probability generator constructed by using the random number generator of the invention will be described.

Figure 12:
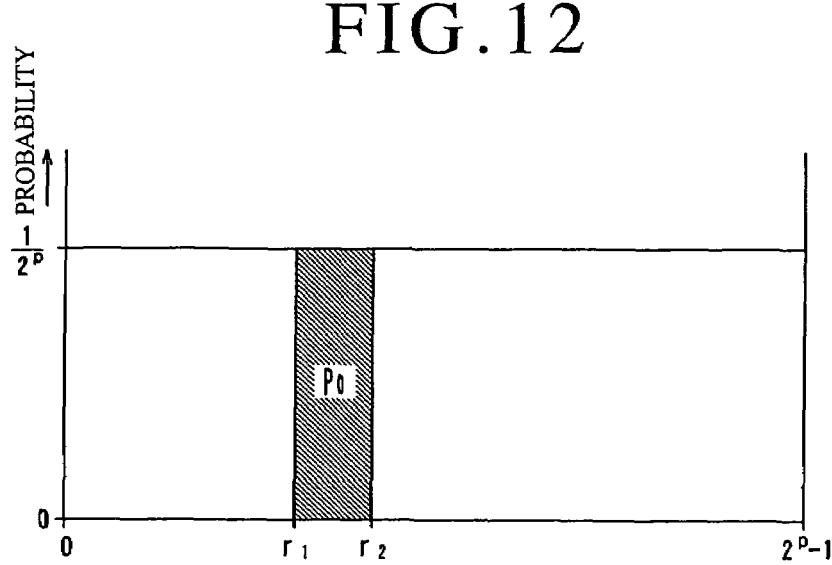

FIG. 12 shows a probability distribution of a probability generator constructed by P (bit). In the parallel type random number generator, in each of random number generators, the occurrence ratio of 0 and 1 is always corrected to, for example, 50%. Since each of the random number generators 110 has uniformity and has no regularity, no correlativity and no periodicity, the total probability distribution is uniform.

Here, with respect to the whole of the uniform output data in this random number generator, by setting arbitrary range data (r1, r2) as indicated by slant lines of FIG. 12, a probability can be generated by the following expression.

$$P0=(r2-r1+1)/2^P$$

Accordingly, an arbitrary probability can be obtained by suit-ably setting the range data (r1 to r2).

As described above, according to the invention, the natural random number generator and the probability generator having excellent uniformity and having no regularity, no correlativity and no periodicity can be realized by the digital circuits. The digital circuit structure is easily used when an LSI is formed, and is excellent in productivity, and a lot of random numbers and probability data can be supplied at high speed and inexpensively for a use in a wide field, such as scientific calculation, game machine, and encryption processing.

Besides, since the influence of an external factor such as external noise, temperature or power supply fluctuation is small, a stable operation is obtained. Further, safety to the environment is excellent, and there is no problem in disposal due to throw-away or the like.

Second Mode of the Invention

Hereinafter, a random number generator and a probability generator according to a second mode of the invention will be described with reference to FIGS. 15 to 47.

Figure 15:
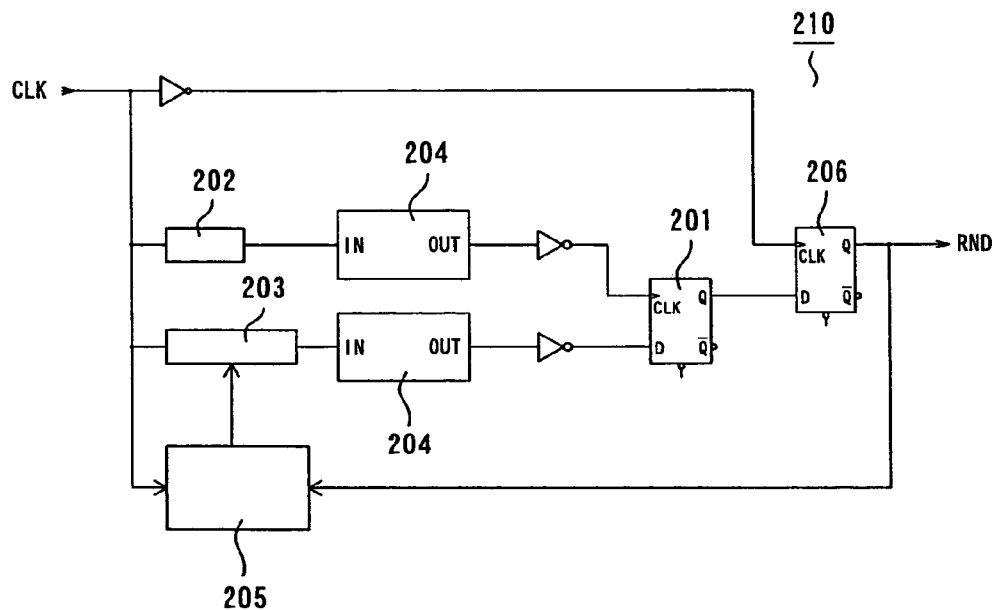

Initially, a first embodiment of the invention will be described. As shown in FIG. 15, a random number generator 210 of the first embodiment is roughly constituted by a flip-flop 201 for outputting a one-bit serial random number RND, two-line delay circuits 202 and 203 for giving a phase difference between inputs (CLK signal) of the flip-flop, jitter generation circuits 204 and 204 added correspondingly to the respective delay circuits 202 and 203, and a phase control circuit 205 for adjusting a delay time of the delay circuit 203.

Figure 14:
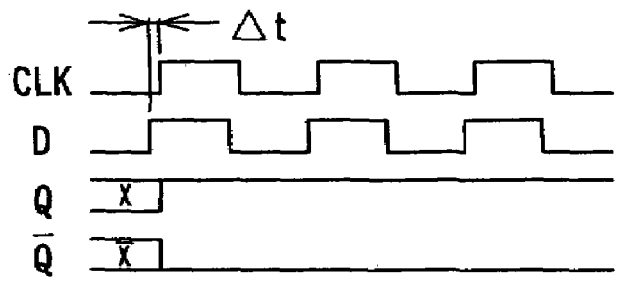
Figure 14:
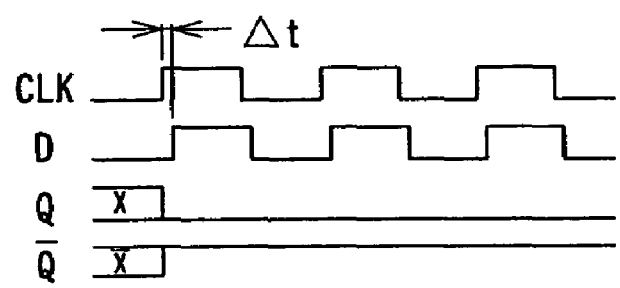
Figure 14:
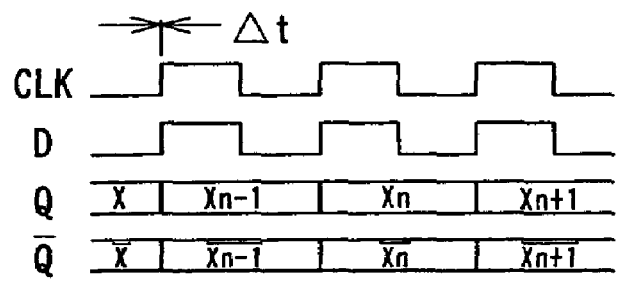

The phase control circuit 205 measures a specified repetition cycle of the CLK signal, monitors the number of occurrences of 1 or 0 of the output (random number data RND) from the flip-flop in this specified cycle, and performs a feedback control to automatically adjust the delay time of the delay circuit so that the occurrence ratio is kept a constant value (for example, 50%), and eventually, as in FIG. 14(*c*) explained in the first mode of the invention, an operation is performed to cause the phase difference $\Delta t$ between two input signals inputted to the flip-flop 201 to approach 0.

Incidentally, a flip-flop 206 added to the final stage is a latch circuit for making the output timing of the random number data RND synchronize with the CLK signal.

Here, an edge trigger type flip-flop in which a state (1 or 0) of an output becomes definite according to a phase difference between input signals can be used as the flip-flop 201, and in this embodiment, a D-type flip-flop provided with a CLK terminal and a D terminal is used, and by the jitter generation circuits 204 described later in detail, phase jitter is generated in the input signal, and an indefinite operation is actively made to occur.

Figure 17:
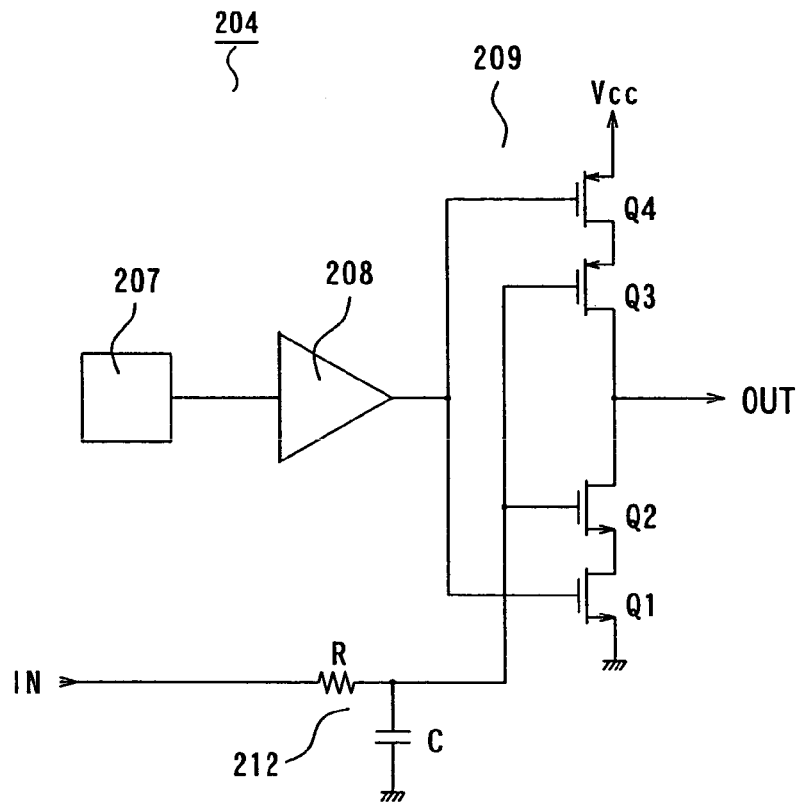

As shown in FIG. 17, the jitter generation circuit 204 is constituted by a noise generation source 207, an amplifier circuit 208 for power-amplifying a generated faint noise, and a mixer circuit 209 for generating jitter in an input signal by an amplified noise signal.

The mixer circuit 209 mounted in the jitter generation circuit 204 of FIG. 17 is constructed by series connection (cascade connection) of a circuit of P-channel MOS transistors Q4 and Q3 connected in series to each other and a circuit of N-channel MOS transistors Q2 and Q1 connected in series to each other, and in the respective series transistor circuits, an output of the amplifier circuit 208 is connected to gates of the transistors Q4 and Q1, and an output of an integration circuit 212 of a resistor R and a capacitor C is connected to gates of the transistors Q3 and Q2. Incidentally, an output of the delay circuit 202 or the delay circuit 203 is connected to an input IN.

Figure 19:
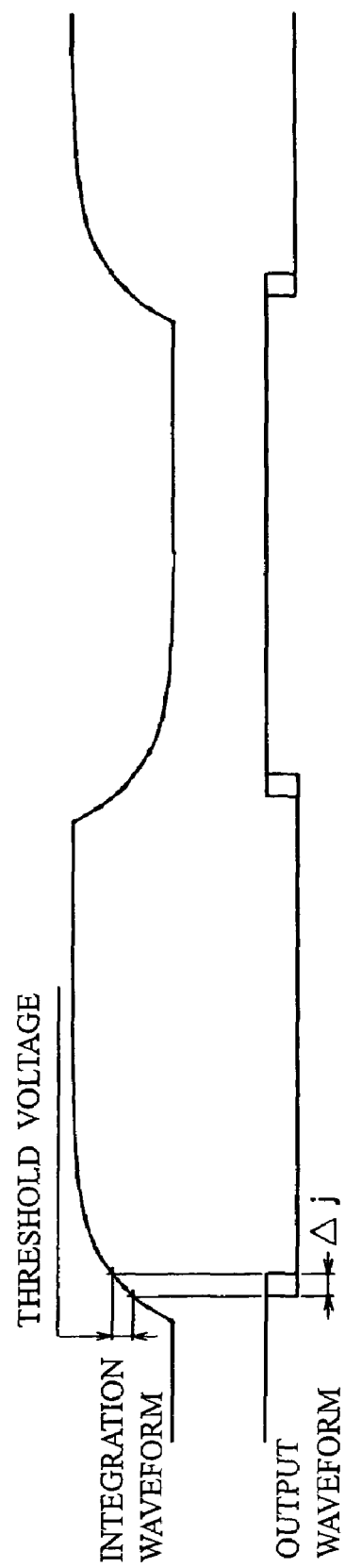

In the above circuit structure, as shown in FIG. 19, the amplified noise signal is inputted to the gates of the transistors Q4 and Q1, so that the threshold voltages of the transistors Q3 and Q2 to the integration output waveform of the delay CLK signal are changed, and jitter $\Delta j$ is generated in an output OUT. The magnitude of the jitter $\Delta j$ greatly extends the indefinite operation range of the latter stage flip-flop 201.

Figure 18:
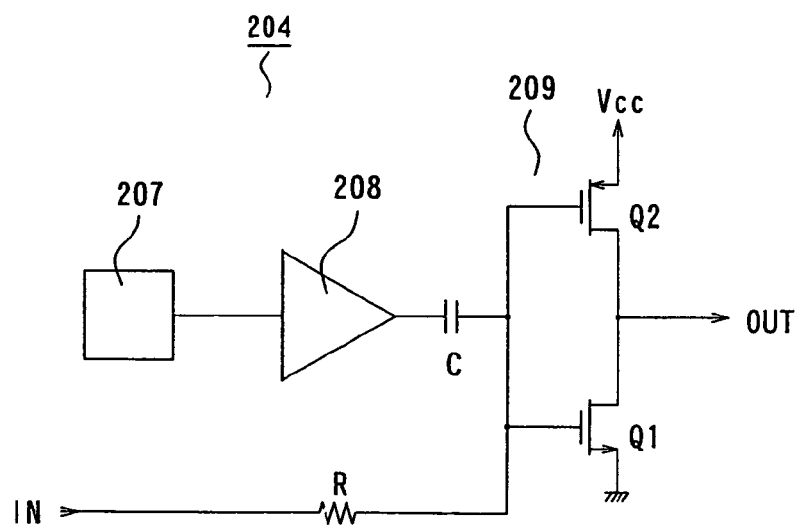

Besides, as the mixer circuit 209, in addition to the embodiment of FIG. 17, a structure shown in FIG. 18 can also be adopted. An embodiment of FIG. 18 is constituted by a series circuit of a P-channel MOS transistor Q2 and an N-channel MOS transistor Q1, and an output of an amplifier circuit 208 and a delay CLK signal from an input IN are connected to the respective gates through a capacitor C and a resistor R, respectively.

Accordingly, in the above circuit structure, the amplified noise signal and the CLK signal whose phase is adjusted by the delay circuit are combined by the capacitor C and is inputted to the gates of the transistors Q2 and Q1, and the output OUT with jitter $\Delta j$ is obtained similarly to the case of FIG. 17.

Next, a structure of the noise generation source 207 will be described.

FIGS. 20 to 27 show specific circuit examples of the noise generation source 207.

Figure 20:
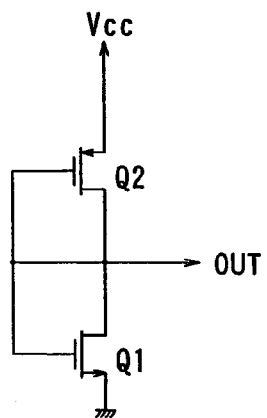
Figure 21:
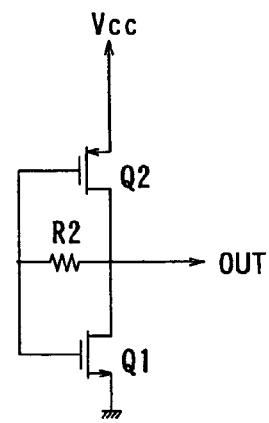
Figure 22:
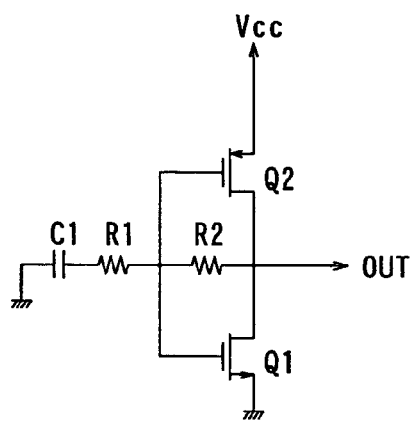
Figure 23:
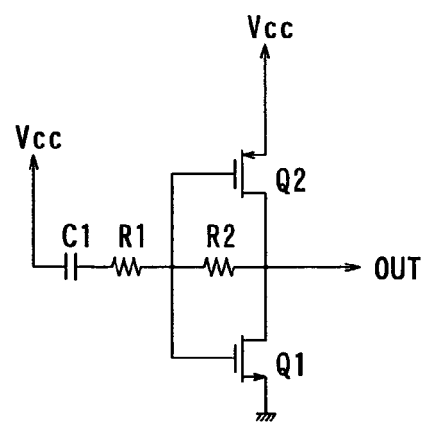
Figure 24:
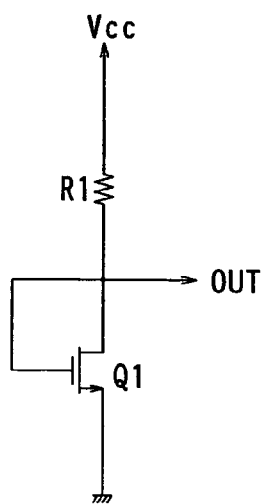
Figure 25:
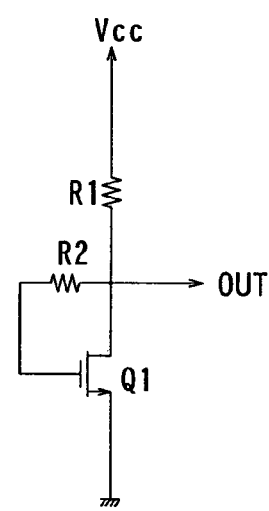
Figure 26:
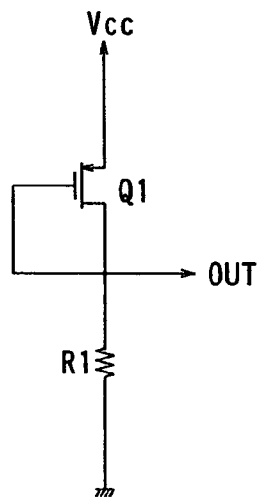
Figure 27:
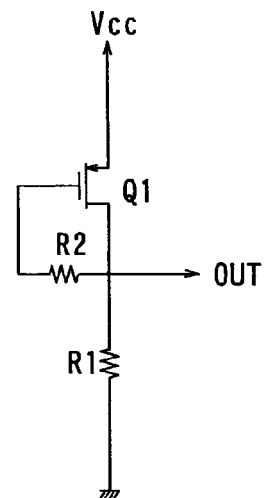

FIG. 20 shows a structure in which a P-channel MOS transistor Q2 and an N-channel MOS transistor Q1 are connected in series to each other, and a gate and an output are short-circuited. Besides, in FIG. 21, a resistor R2 intervenes between the gate and the output in FIG. 20. Besides, FIG. 22 shows a structure in which a P-channel MOS transistor Q2 and an N-channel MOS transistor Q1 are connected in series to each other, a resistor R2 intervenes between a gate and an output, and an RC series circuit of a resistor R1 and a capacitor C1 intervenes between the gate and GND. Besides, FIG. 23 shows a structure in which the RC series circuit in FIG. 22 intervenes between the gate and power supply. Besides, FIG. 24 shows a structure in which a gate and an output of an N-channel MOS transistor are short-circuited, and a resistor R1 intervenes between the output and power supply. Besides, FIG. 25 shows a structure in which a resistor R2 intervenes between the gate and the output in FIG. 24. Besides, FIG. 26 shows a structure in which a gate and an output of a P-channel transistor Q1 are short-circuited, and a resistor R1 intervenes between the output and GND. Besides, FIG. 27 shows a structure in which a resistor R2 intervenes between the gate and the output in FIG. 26.

In the above examples, a faint thermal noise generated in circuit elements (transistor, resistor, capacitor, or combination of these) in an active state is used, and an inexpensive noise source is realized. Besides, the influence of an external noise, power supply fluctuation and the like is also small, and a stable operation is obtained, and further, since a radiation source is not used, safety to the environment is excellent, and there does not arise a problem in disposal due to throw-away or the like.

Figure 28:
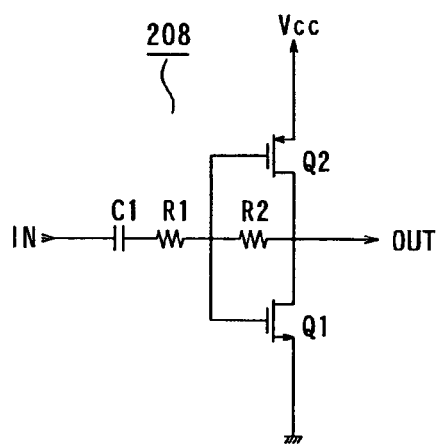
Figure 29:
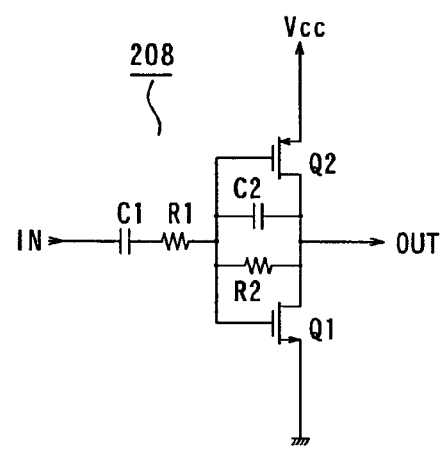

An amplifier circuit 208 shown in FIG. 28 is constituted by a series input circuit (High Pass Filter) of a capacitor C1 and a resistor R1, and a series circuit of a P-channel MOS transistor Q2 and an N-channel MOS transistor Q1. An amplifier circuit 208 shown in FIG. 29 has a structure in which in FIG. 28, a capacitor C2 is connected in parallel to a feedback resistor R2 to form a Low Pass Filter. Although not shown, the output of the noise generation source 207 is connected to the input IN of the amplifier circuit 208, and the output OUT is connected to the mixer circuit 209.

In the amplifier circuit 208 of the above structure, the characteristics of the Hight Pass Filter and the Low pass Filter are set according to the respective structures of the foregoing noise generation source 207, and an amplifier with suitable characteristics is realized.

Next, specific circuit structures of the jitter generation circuit 204 will be described with reference to FIGS. 30 to 36. These are constructed by combination of the foregoing noise generation source 207, the amplifier circuit 208 and the mixer circuit 209, and the following shows typical examples among them. Accordingly, it is a matter of course that the invention is not limited to only these circuit examples.

Figure 30:
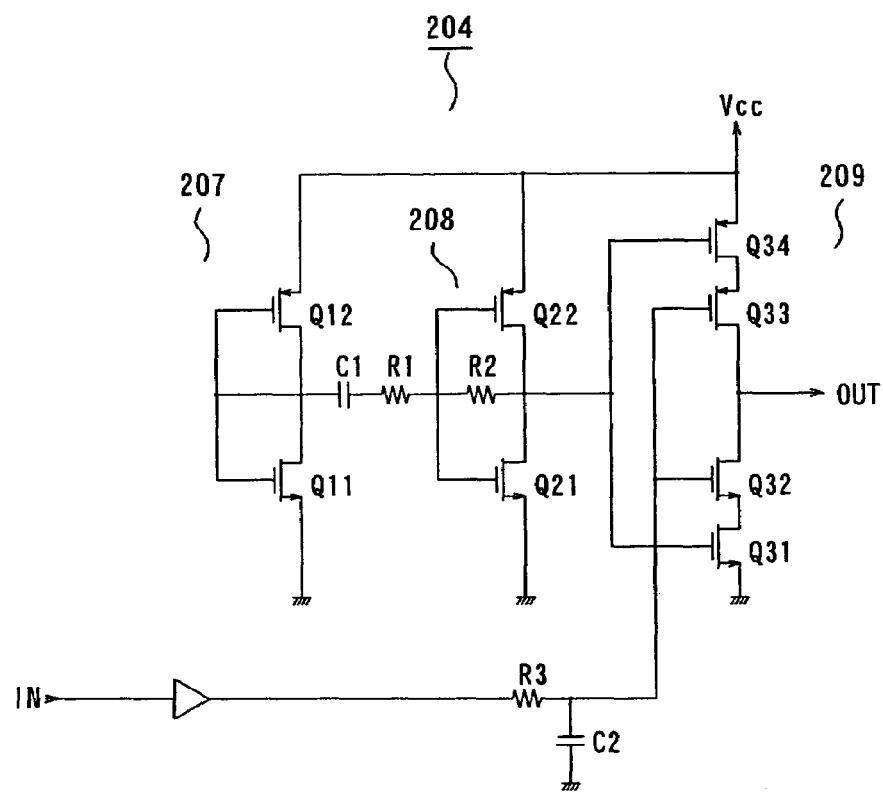
Figure 33:
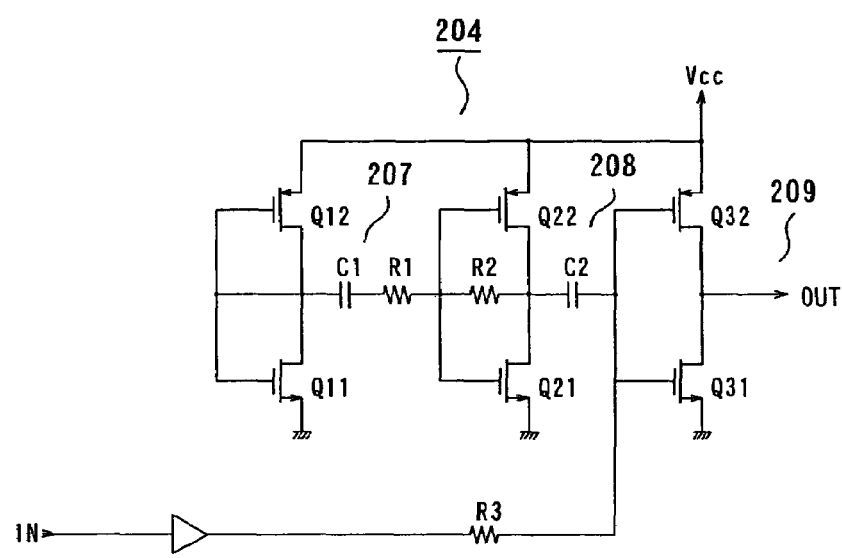

FIG. 30 shows the jitter generation circuit 204 according to the structure of FIG. 17, and is constructed by the combination of the noise generation source 207 shown in FIG. 20 and the amplifier circuit 208 shown in FIG. 28. Besides, FIG. 31 shows a circuit example in which two stages of the amplifier circuits 208 are connected in series to each other in FIG. 30.

Figure 31:
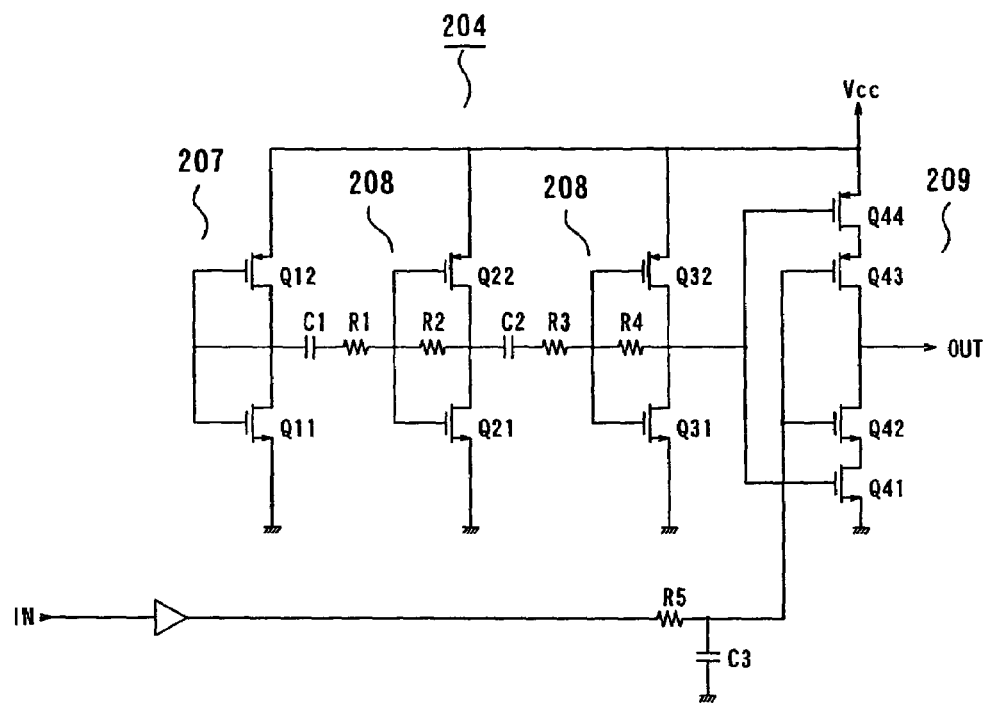
Figure 32:
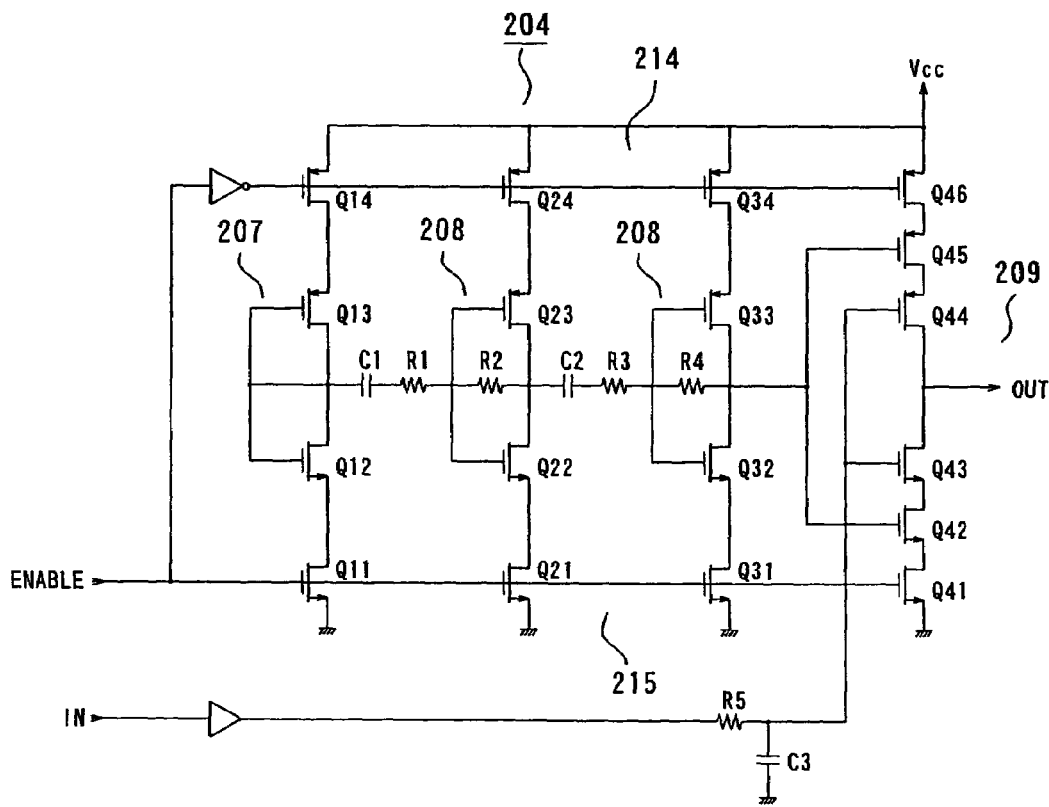
Figure 34:
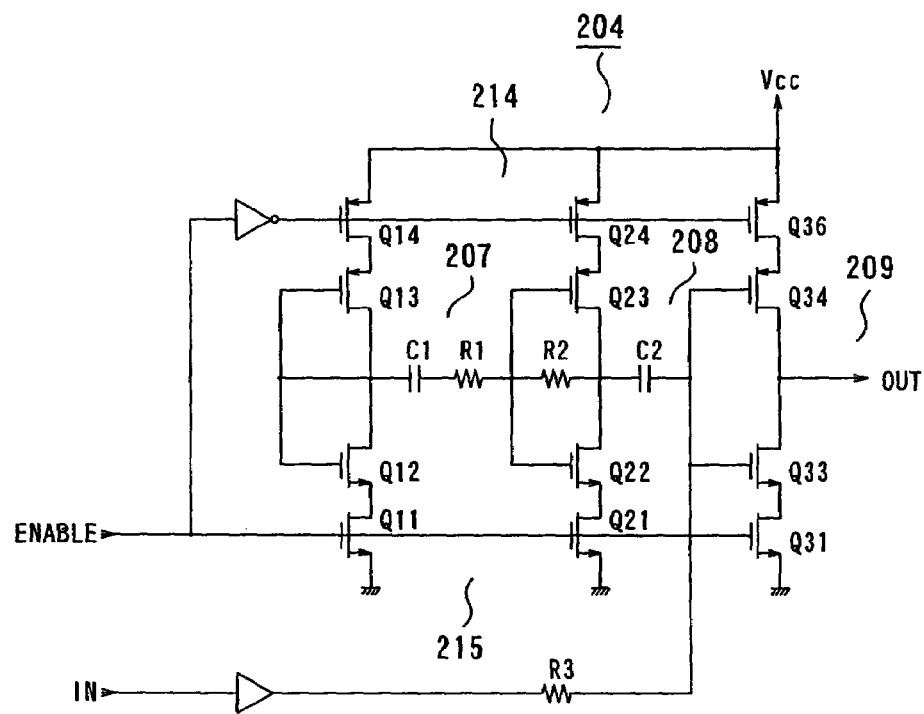
Figure 35:
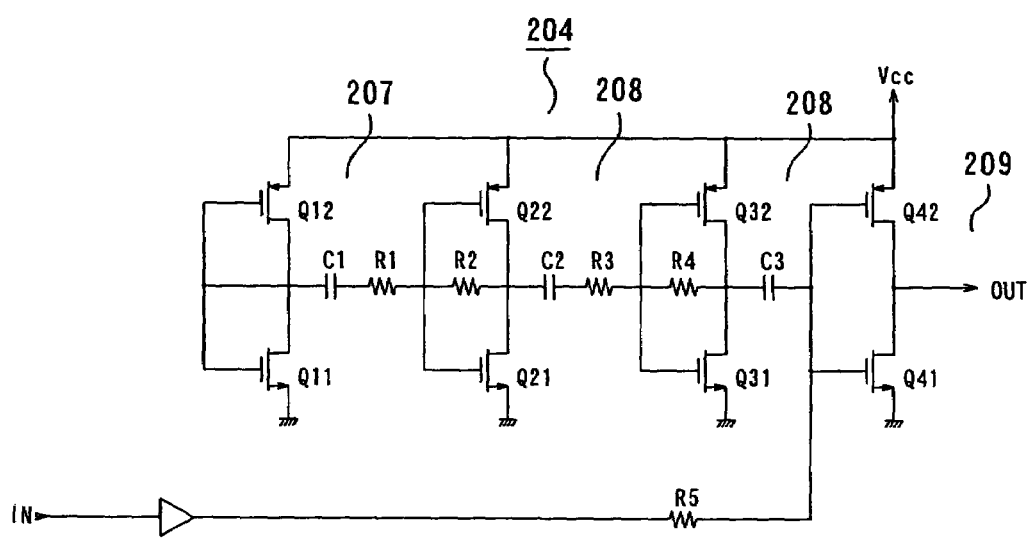
Figure 36:
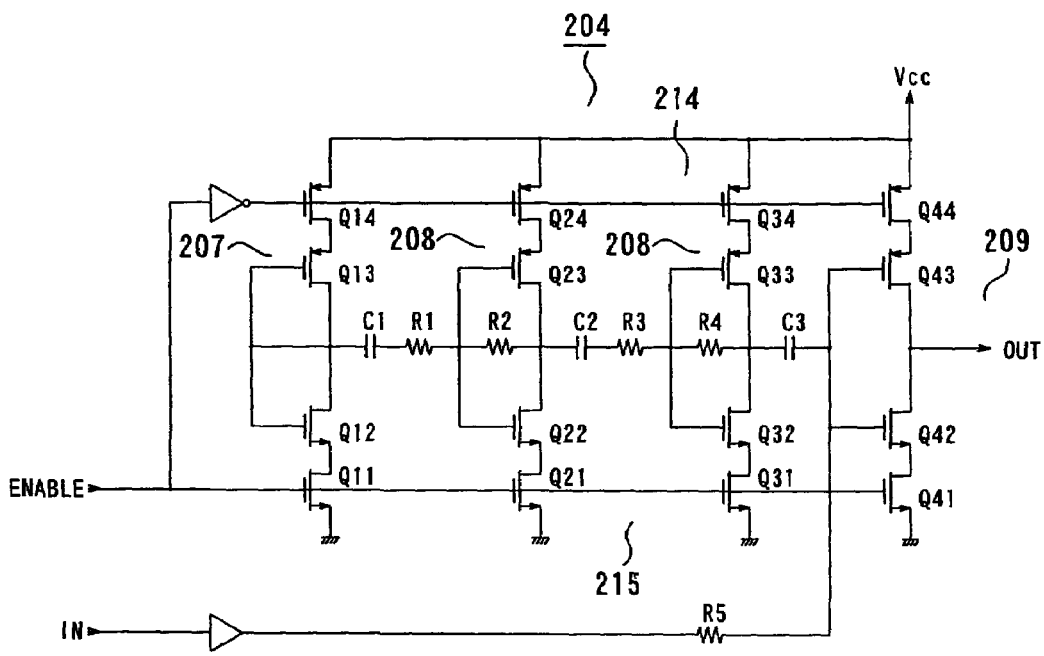

Besides, FIG. 32 shows a structure in which in FIG. 31, a switch circuit 214 composed of P-channel MOS transistors Q14, Q24, Q34 and Q46 is connected to the respective power supply sides of the noise generation source 207, the amplifier circuit 208, and the mixer circuit 209, a switch circuit 215 composed of N-channel MOS transistors Q11, Q21, Q31 and Q41 is connected to the respective ground sides, these switch circuits 214 and 215 are turned on/off by an operation enable signal ENABLE from the outside, and specifically, power is supplied to the respective circuits only at the time when a random number is needed, so that the jitter generation circuit 204 is operated.

As stated above, since the active period of the circuit is freely limited by the enable function, wasteful electric power consumption can be eliminated, and reduction in electric power of the random number generator can be realized.

Besides, FIGS. 33 to 36 show jitter generation circuits 204 on the basis of the structure of FIG. 18, and the respective combination forms of the noise generation source 207 and the amplifier circuit 208 are the same as the foregoing cases of FIGS. 30 to 32, and accordingly, the description will be omitted here.

Figure 16:
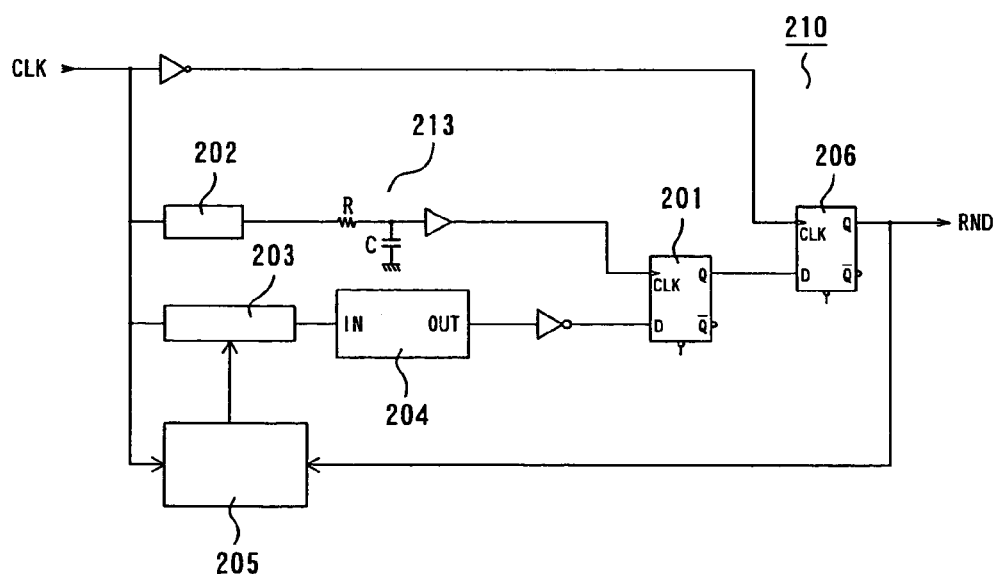

In the above, the examples of the jitter generation circuit 204 have been described, in the invention, in addition to the structure of the random number generator 210 of FIG. 15 in which the jitter-generation circuits 204 are added to both input lines (CLK terminal and D terminal) of the flip-flop 201, the structure of FIG. 16 in which the jitter generation circuit 204 is added to only any one input line (D terminal side in this embodiment) of the flip-flop 201 may be adopted, and by this, the same effect as the structure of FIG. 15 can be obtained.

Incidentally, in this case, in order to make the input timings of both input terminals coincident with each other, an RC integration circuit 213 (corresponding to a time constant of the integration circuit 212 of FIG. 17) for correcting the delay time by the jitter generation circuit 204 is added to the other input line (CLK terminal in this embodiment).

By the way, in the jitter generation circuit 204, chattering occurs in the output of the mixer circuit 209 according to an integration waveform input, and there occurs a disadvantage that plural input signals are inputted to the input terminal of the flip-flop 201 in one random number generation cycle.

Figure 37:
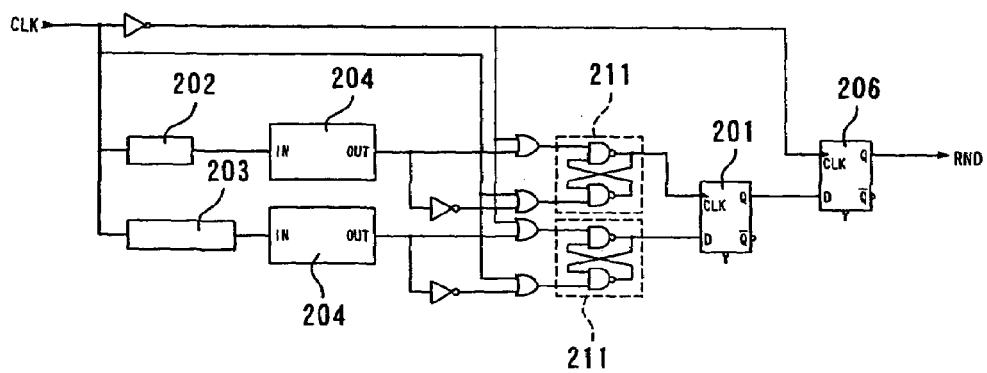
Figure 38:
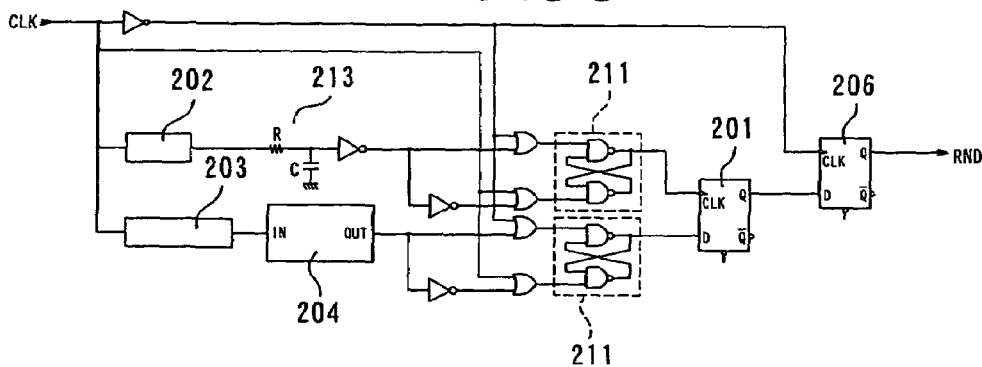

Then, in this embodiment, as shown in FIGS. 37 and 38, an R-S flip-flop 211 operating (set/reset) at both edges (rising/falling) of a CLK signal is provided at a latter stage of the jitter generation circuit 204, and the output OUT of the mixer circuit 209 is latched by the CLK signal. By this, a signal without chattering can be inputted to the flip-flop 201, and stable generation of a random number can be performed. Incidentally, in the structure of FIG. 38, also with respect to the integration circuit 213, chattering occurs in the buffer output of a latter stage, an R-S flip-flop 211 is added.

In the embodiment described above, although the D-type flip-flop 201 is used as the flip-flop 201 for generating a random number, the invention is not limited to only this, and any flip-flop may be used as long as it has a function equivalent to this, for example, an R-S flip-flop can also be used.

Next, a second embodiment in the second mode of the invention will be described.

Figure 39:
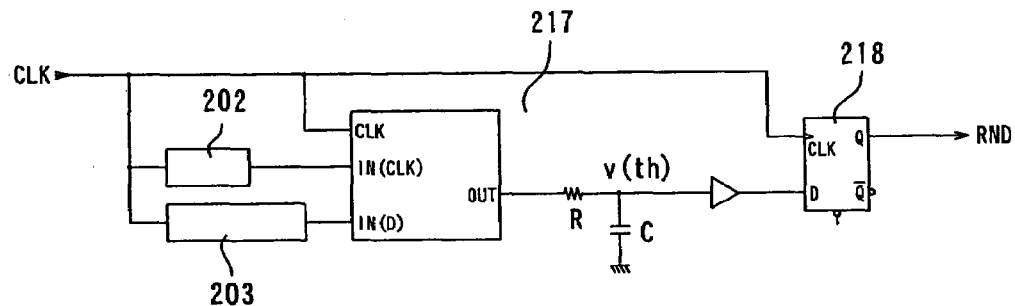

As shown in FIG. 39, a random number generator 210 of the second embodiment is constituted by a D-type flip-flop 218 for outputting a one-bit serial random number RND, two-line delay circuits 202 and 203, a phase-voltage conversion circuit 217, and a not-shown phase control circuit 205 (see FIGS. 15 and 16).

Figure 40:
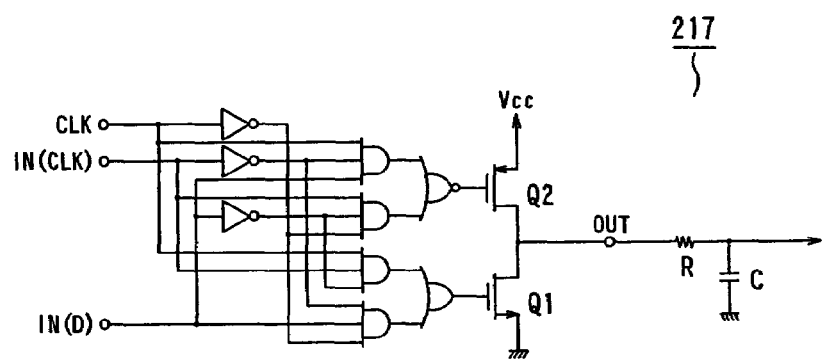

Here, the phase-voltage conversion circuit 217 is a circuit for converting a phase difference between delay output signals of the delay circuits 202 and 203 into a voltage, and as shown in an internal circuit of FIG. 40, it is constituted by gate circuits for detecting a phase difference between an input IN(CLK) and an input IN(D), a series circuit of a P-channel MOS transistor Q2 and an N-channel MOS transistor Q1, which are turned on/off by the outputs of the respective gate circuits, and an RC integration circuit connected to its output side.

Figure 41A:
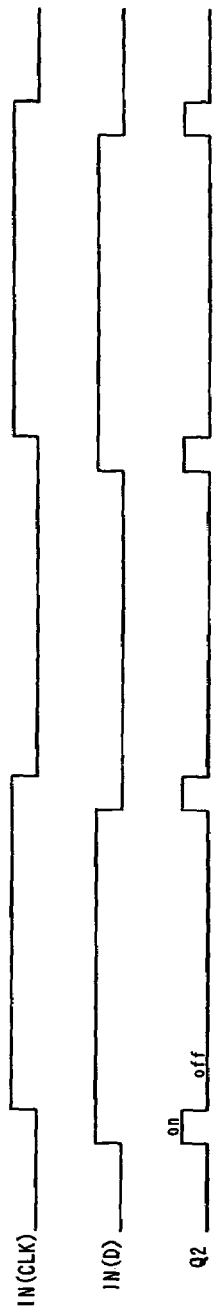
Figure 41B:
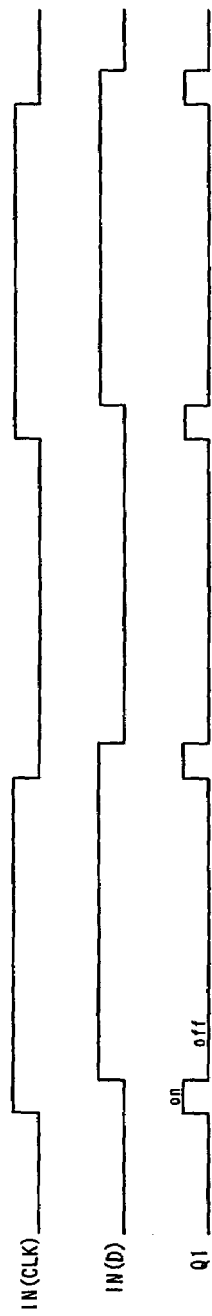

As shown in FIG. 41(*a*), the phase-voltage conversion circuit 217 of the above structure operates in such a manner that in the case where the phase of the IN(D) leads the IN(CLK), the P-channel MOS transistor Q2 is turned ON by the amount of the phase difference (during this, the N-channel MOS transistor Q1 is turned off) to charge the capacitor C through the resistor R and to raise an input voltage v(th) of a buffer. Besides, as in FIG. 41(*b*), in the case where the phase of the IN(D) is behind the IN(CLK), the N-channel MOS transistor Q1 is turned on by the amount of the phase difference (during this, the P-channel MOS transistor Q2 is turned off), the capacitor C is discharged through the resistor R, and the input voltage V(th) of the buffer is dropped.

Accordingly, at the output of this phase-voltage conversion circuit 217, the voltage V(th) almost equal to the threshold voltage of the buffer connected thereto is generated, the fluctuation of the output voltage generated by the phase difference between the two inputs IN(CLK) and IN(D) is converted into a digital signal by the relation to the threshold voltage of the buffer and is inputted to the D terminal of the flip-flop 218, and one-bit random number data RND synchronous to the CLK signal is obtained at the output. Then, this random number data RND is monitored by the phase control circuit 205, and the phase difference between the two input signals (that is, the output of the phase-voltage conversion circuit 217) is automatically adjusted so that the occurrence ratio of 1 or 0 of the output from the flip-flop becomes constant (for example, 50%).

Besides, although not shown, in FIG. 39, by connecting a resistor in series after the RC integration circuit, noise generated by the resistor makes the threshold operation of the next stage element due to the fluctuation of V(th) more effective.

Incidentally, in FIG. 39, although the phase-voltage conversion circuit 217 is connected to the flip-flop 218 through the buffer, it may be directly connected to the D terminal of the flip-flop 218 without intervening the buffer. In this case, the output voltage V(th) of the phase-voltage conversion circuit 217 is automatically adjusted to approximately the threshold voltage of the D terminal.

Besides, a comparator is used instead of the buffer, and a digital signal may be a constitution obtained by comparison between this output voltage V(th) and a reference voltage.

Figure 42:
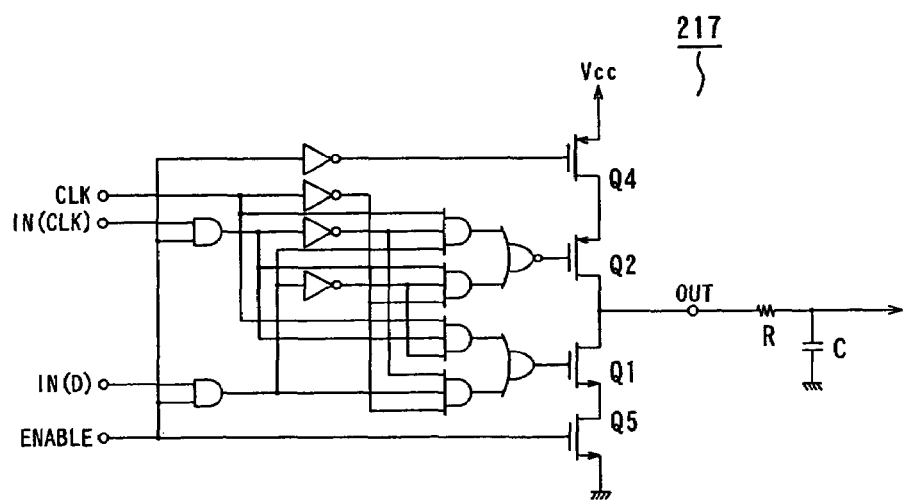

Besides, as shown in FIG. 42, a P-channel MOS transistor Q4 and an N-channel transistor Q5 are added to the series transistor circuit of the phase-voltage conversion circuit 217, and a circuit operation is stopped by an external operation enabling signal ENABLE at a time other than a necessary time, so that reduction in electric power can be realized.

Figure 43:
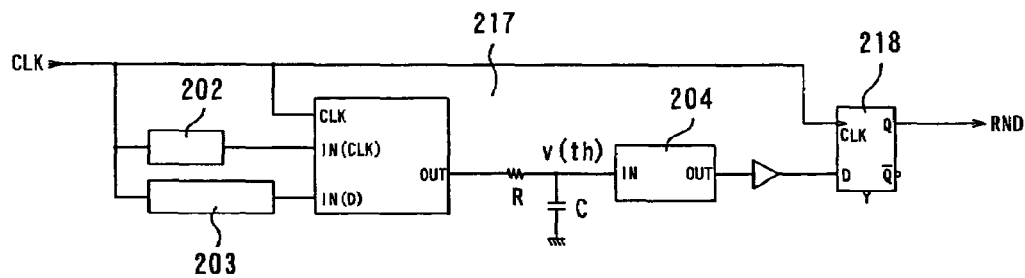

FIG. 43 shows a structure in which a jitter generation circuit 204 is connected to the output side of the phase-voltage conversion circuit 217. Incidentally, this jitter generation circuit 204 has the foregoing structure of FIG. 17 or 18 constituted by the noise generation source 207, the amplifier circuit 208 and the mixer circuit 209, and the description will be omitted here.

The jitter generation circuit 204 is connected to generate jitter in the threshold voltage V(th), so that indefinite elements in probability of occurrence of 1 or 0 of an output from the flip-flop are actively increased, and by this, it becomes possible to easily generate a more stable natural random number with uniformity and without regularity, correlativity and periodicity.

Next, a third embodiment in the second mode of the invention will be described.

Figure 44:
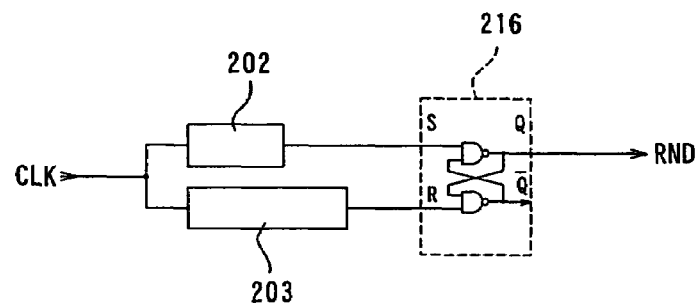

As shown in FIG. 44, a random number generator of the third embodiment is constituted by an R-S flip-flop 216 for outputting a one-bit serial random number RND, delay circuits 202 and 203 connected to an S terminal and an R terminal of the R-S flip-flop 216, and a not-shown phase control circuit 205 (see FIGS. 15 and 16).

Figure 45:
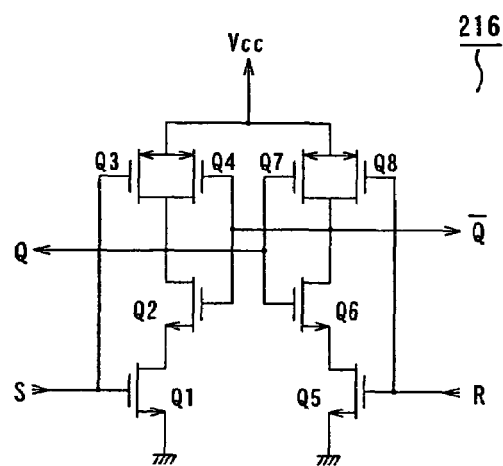

Here, FIG. 45 shows an internal circuit of the R-S flip-flop constituted by N-channel MOS transistors and P-channel MOS transistors. An S side NAND gate circuit is constituted by transistors Q1 to Q4, and an R side NAND gate circuit is constituted by transistors Q5 to Q8.

In an edge trigger type flip-flop such as, for example, an R-S flip-flop, it is known that when a rising phase difference between an S side input signal and an R side input signal is made to approach 0, a metastable phenomenon occurs, and when this phenomenon occurs, it takes a time for a flip-flop output to become definite, and an output state after a given time period becomes 0 or 1, or holds a threshold voltage or becomes an oscillation state. This embodiment actively uses this metastable phenomenon to generate a natural random number.

Figure 46:
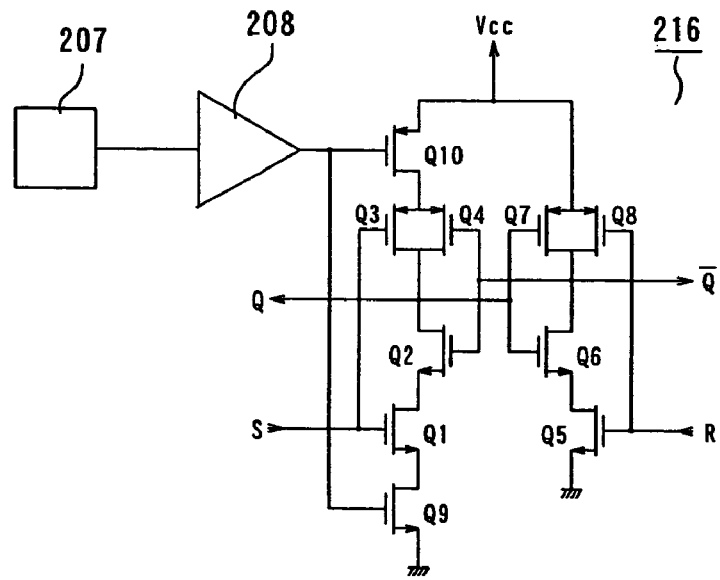
Figure 47:
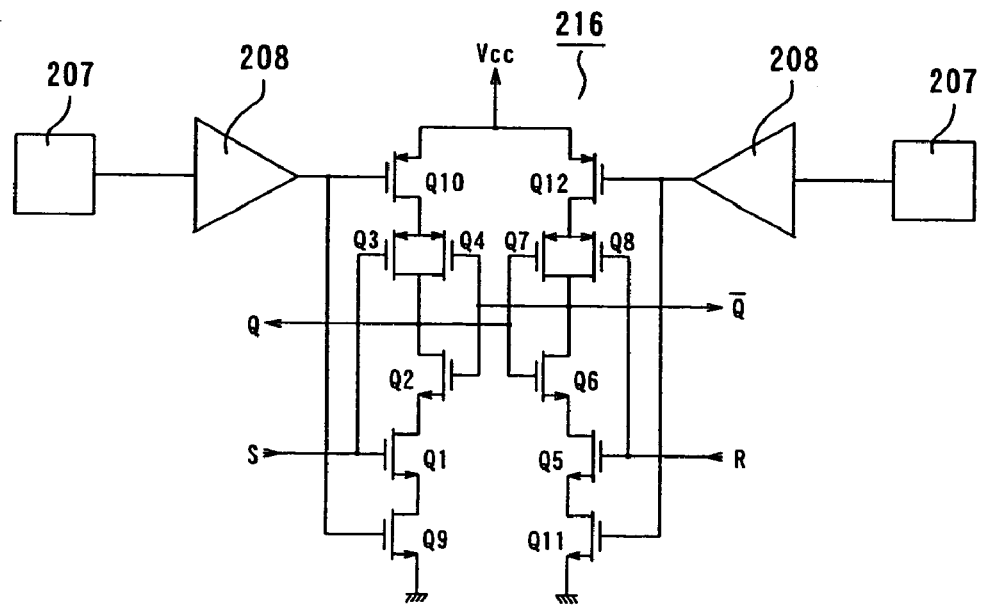

That is, in this embodiment, as shown in FIG. 46, in the circuit structure of FIG. 45, a P-channel MOS transistor Q10 is connected in series to a power supply Vcc side of the S side NAND gate circuit, an N-channel MOS transistor Q9 is connected in series to a GND side, a noise generation source 207 and an amplifier circuit 208 are connected to the gates of these transistors Q9 and Q10, and the threshold voltage of the S side NAND gate circuit is changed by the amplified noise signal. Incidentally, the output of a delay circuit 202 is connected to a terminal S, and the output of a delay circuit 203 is connected to a terminal R. Besides, FIG. 47 shows a structure in which the above circuit is added to the NAND gate circuits of both S side and R side, and different amplified noise signals are respectively inputted to those.

In the above structure, by changing the threshold voltage of the NAND gate circuit, it is possible to instantaneously change the flip-flop output from the metastable state to the stable state of 1 or 0. Then, the random number data RND is monitored by the phase control circuit 205, and the phase difference between two input signals is automatically adjusted so that the occurrence ratio of 1 or 0 of the flip-flop output becomes constant (for example, 50%).

In the third embodiment described above, although the R-S flip-flop 216 is used as the flip-flop for generating the random number (flip-flop for producing the metastable phenomenon), the invention is not limited to only this, and it is also naturally possible to realize the equivalent function by a different flip-flop (for example, a D-type flip-flop, etc.).

Besides, although not shown, when P foregoing serial type random number generators 210 of the first to third embodiments are arranged in parallel to each other, a P-bit construction parallel type random number generator in which any mutual relation between the respective random number generators 210 does not exist can be constructed.

Further, when a probability generator is constructed by using the foregoing serial type random number generator or the parallel type random number generator, an ideal probability without regularity, correlativity and periodicity can be generated.

As described above, since each of the circuits of the invention is digital-constructed by using the MOS transistors, it is easy to deal with the formation of an LSI, the productivity is excellent, and a lot of random numbers and probability data can be supplied at high speed and inexpensively for a use in high-tech industry, such as scientific calculation, game machine, and encryption processing.

As described above, according to the invention, since the jitter generation circuit is added to the input line of the flip-flop for generating the random number, the indefinite operation range of the flip-flop is extended by the jitter in the input signals so that the generation of the random number becomes easy, and consequently, it is possible to realize the more stable generator of a natural random number with uniformity and without regularity, correlativity and periodicity.

Besides, as the different structure, the phase adjustment is converted into the voltage, and the voltage fluctuation is digitized by using the threshold voltage of the circuit element to generate a random number, and therefore, it is possible to realize the more stable generator of a natural random number with uniformity and without regularity, correlativity and periodicity.

Further, as the different structure, the metastable phenomenon of the flip-flop is used to generate a random number, and therefore, it is possible to realize the stabler generator of a natural random number with uniformity and without regularity, correlativity and periodicity.

Besides, by using the random number generator of such structure, the ideal probability generator can be realized, and it becomes very effective to enter into the high-tech industry having security, such as scientific calculation, game machine or encryption processing.

Third Mode of the Invention

Hereinafter, embodiments of a random number generator in the third mode of the invention will be described with reference to the drawings.

Figure 48:
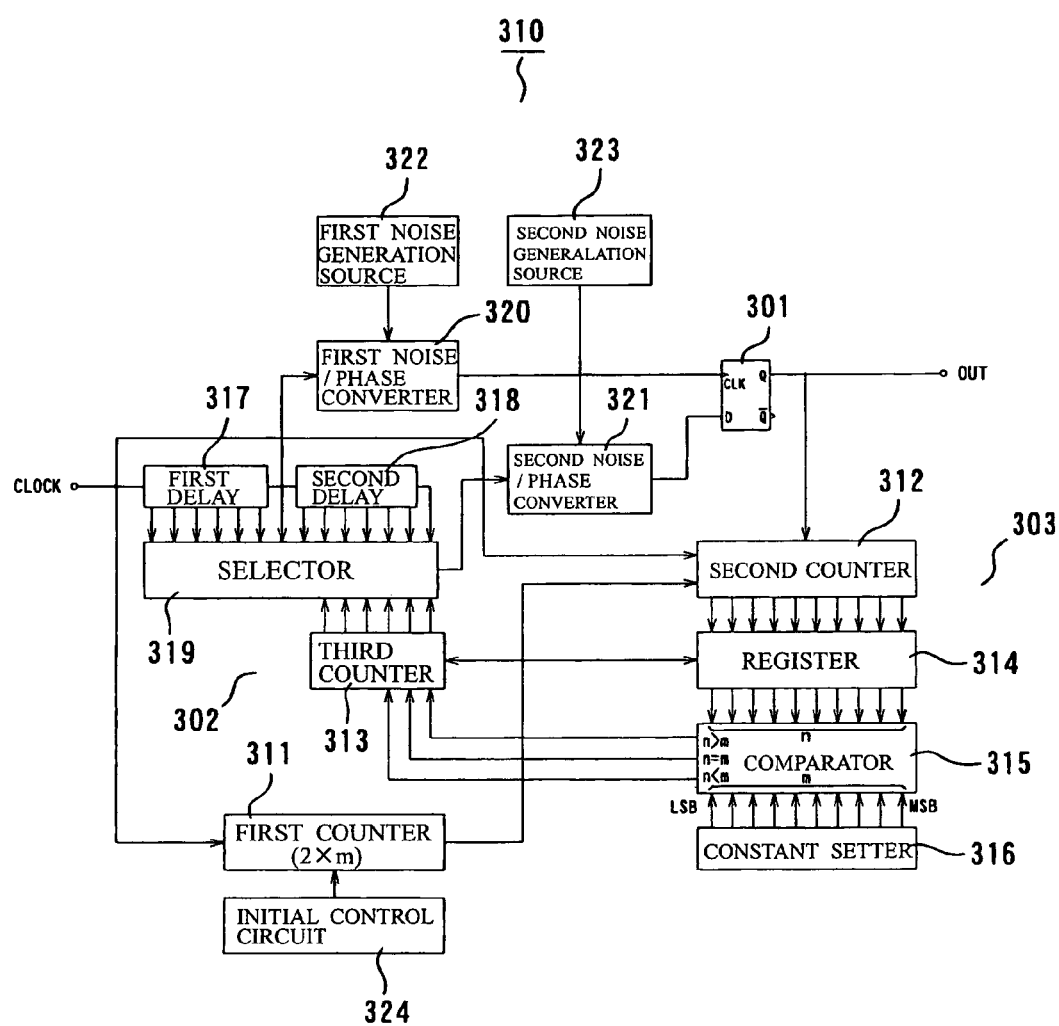

As shown in FIG. 48, a random number generator 310 of a first embodiment includes, as basic structural elements, a flip-flop 301, a phase adjustment unit 302 and a feedback circuit unit 303.

Here, as the flip-flop 301, it is possible to use a flip-flop having a function that an output state ("0" or "1") becomes definite according to a phase difference between input signals (CLOCK) inputted to two input units, and this embodiment uses a D-type flip-flop provided with a clock terminal CLK and a data terminal D for signal input and shown in FIG. 13 of the foregoing mode.

Besides, the phase adjustment unit 302 is constituted by two delay circuits 317 and 318 (first delay 317, second delay 318) connected in series to each other and generating plural delay outputs whose delay amounts are increased stepwise, a selection circuit 319 (selector 319) for selecting any one of the delay outputs according to a select input, and a reversible counter 313 (third counter 313) for controlling this select input. A connection point (which becomes a delay intermediate point) between the first delay 317 and the second delay 318 is connected to the clock terminal CLK of the flip-flop 301 through a first noise/phase converter 320, an output of the selector 319 is connected to the data terminal D through a second noise/phase converter 321, and a phase difference between rising times of two signals inputted to the flip-flop 301 can be arbitrarily adjusted.

Besides, the two noise/phase converters 320 and 321 are circuits for, in order to generate jitter in the inputs of the flip flop, combining noises from noise generation sources 322 and 323 using faint thermal noises generated in circuit elements (for example, transistor, resistor, capacitor, etc.) in an active state into delay outputs. By this, an indefinite operation range of the flip-flop 301 is extended, and it becomes possible to easily generate a more complete natural random number with uniformity and without regularity, correlativity and periodicity.

Figure 49:
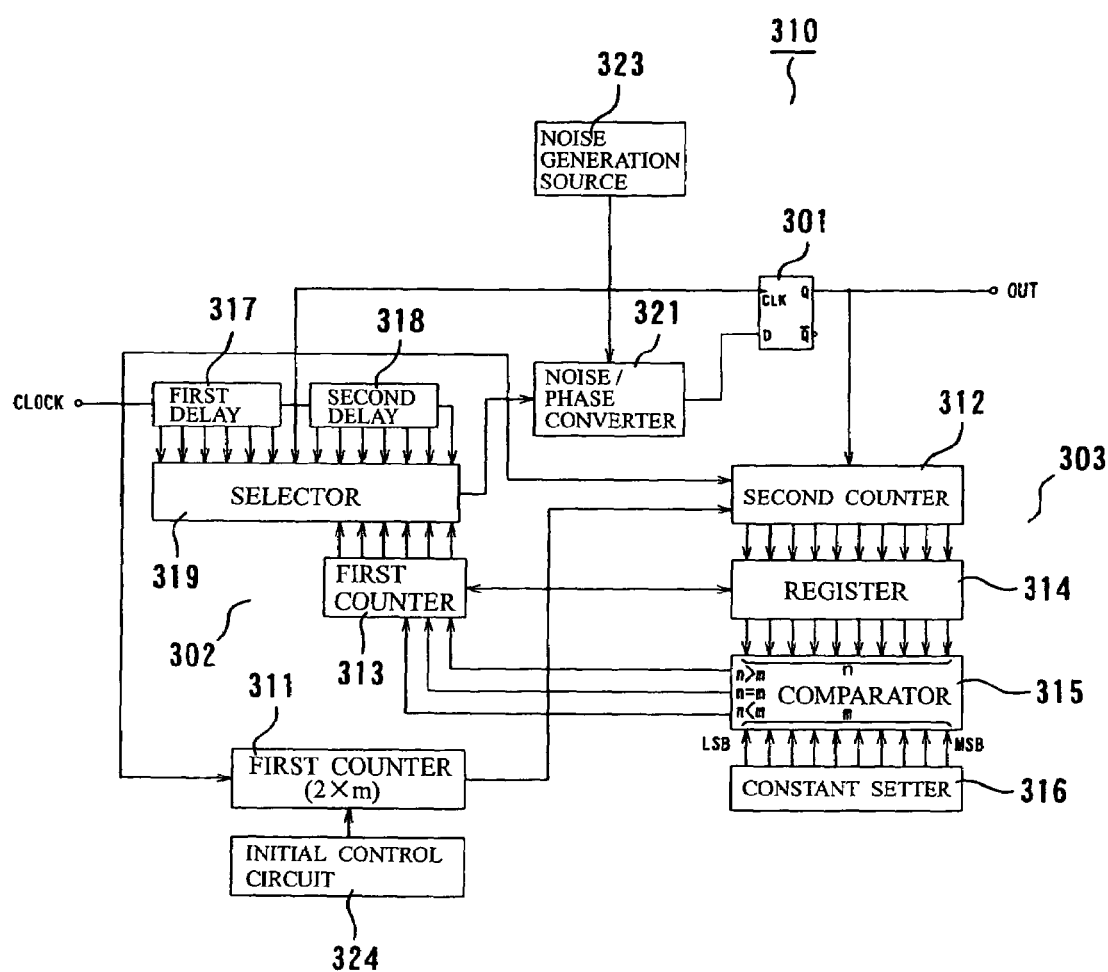

Incidentally, the noise/phase converter is not necessarily added to both the D terminal and the CLK terminal of the flip-flop 301, and like a random number generator 310 shown in FIG. 49, it may be added to any one of the input lines (in FIG. 49, only the D terminal) of the flip-flop 301, and the same effect can be obtained.

Besides, the feedback circuit unit 303 is constituted by a first counter 311, a second counter 312, a register 314, a comparator 315, and a constant setter 316.

The first counter 311 measures a previously determined repetition cycle [CLOCK number (2×m)] from the input signal CLOCK, and the second counter 312 measures the number of occurrences of "1" (or "0") of the output from the flip-flop in every repetition cycle. Besides, the register 314 captures and holds the count value of the second counter 312 every repetition cycle. Incidentally, each time the count value is set in the register 314, the second counter 312 is cleared to 0. The constant setter 316 outputs comparison data for setting of the occurrence ratio of "1" (or "0") of the output from the flip-flop. In this embodiment, it is previously set so that a value (m) of half of the repetition cycle [CLOCK number (2×m)] is outputted. Besides, the comparator 315 compares hold data (n) of the register 314 with the comparison data (m) from the constant setter 316, and generates a comparison output corresponding to a comparison result (n>m) or (n=m) or (n<m). The third counter 313 is operated in an operation mode set by the comparison output from the comparator 315, and the count data is outputted as the select signal of the selector 319. Then, as described before, the selector 319 outputs a predetermined delay signal of the CLOCK signal selected by the select signal.

That is, according to the above structure, according to the comparison output of the output data (n) of the register 314 and the output data (m) from the constant setter 316, the third counter 313 performs an up/down operation (for example, count up (+1) at the time of n>m, count down (−1) at the time of n<m) in every repetition cycle, and automatically corrects the rising time of the CLOCK signal inputted to the data terminal D of the flip-flop 301 so that the comparison output of the comparator 315 converges on n=m (at the time of n=m, the count operation is stopped (±0), and the phase difference between the CLOCK signals is kept constant). Specifically, as shown in FIG. 14(c), a control is performed so that the phase difference Δt between the rising of the CLK signal and the rising of the D signal approaches 0. By this, one-bit serial random number data OUT with uniformity in which the occurrence ratio of "0" and "1" is always kept 50% is obtained at the output of the flip-flop 301.

Although the above is the basic operation of the random number generator 310, in this embodiment, an initial control circuit 324 is connected to the first counter 311, and only in a given number of clocks from the time of power activation, a count set value (2×m) at a time of a normal operation of the first counter 311 is forcibly made m=1. By this, a probability can be efficiently made to converge on ½ when power is turned on, and the phase adjustment period can be shortened.

Figure 50:
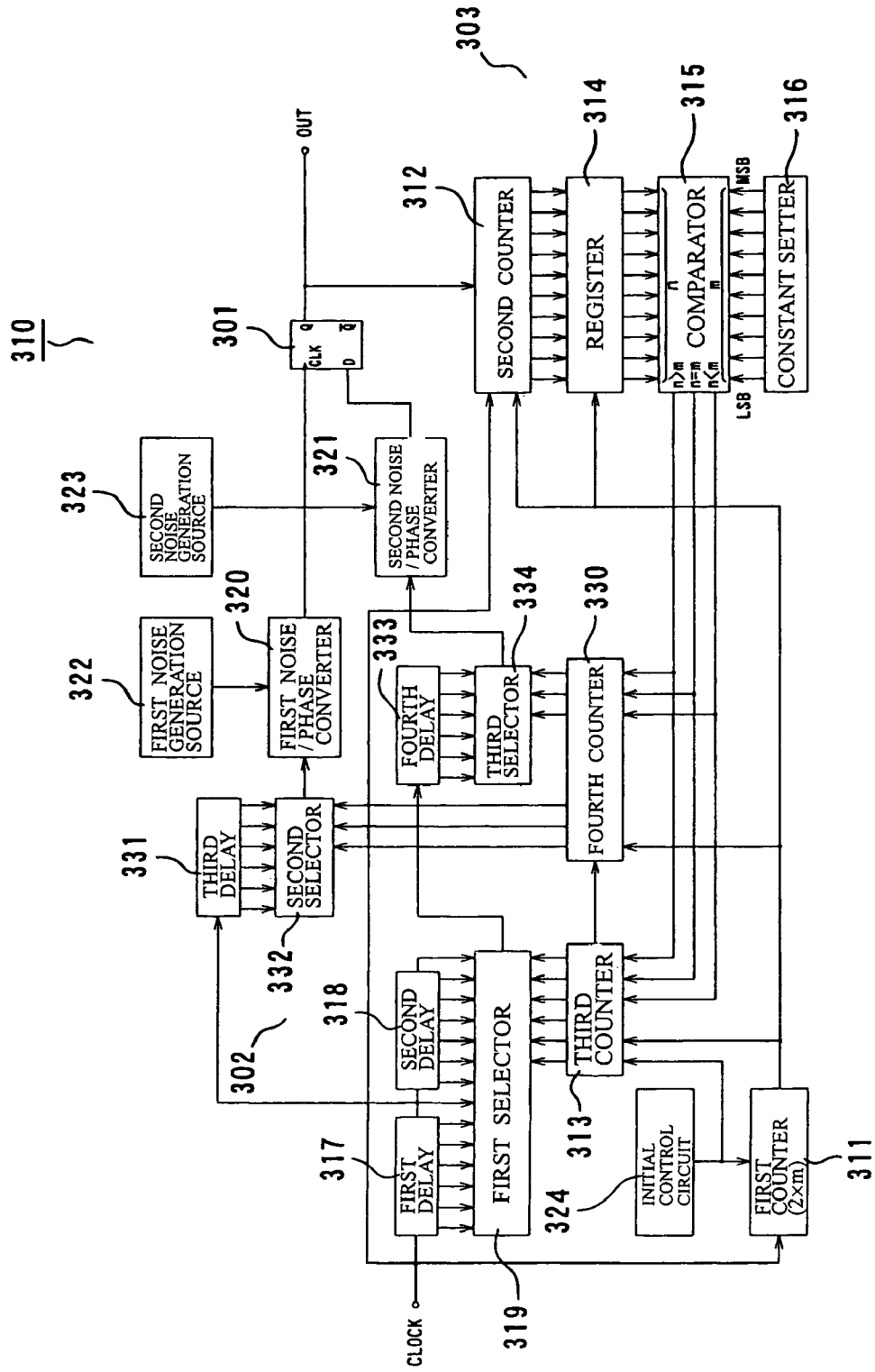

Next, a second embodiment will be described with reference to FIG. 50.

The basic structure of a random number generator 310 of this embodiment is constituted by, similarly to FIG. 48, a flip-flop 301, a phase adjustment unit 302, and a feedback circuit unit 303, however, it is different from FIG. 48 in the structure of the phase adjustment unit 302.

That is, in this structure, a phase adjustment circuit composed of a third counter 313, a first selector 319, a first delay 317, and a second delay 318 is used as fine adjustment means. Coarse adjustment means composed of a third delay 331 and a second selector 332, and coarse adjustment means composed of a fourth delay 333 and a third selector 334 are added to respective delay outputs, and select operations of the second selector 332 and the third selector 334 are specified by outputs of a fourth counter 330. Incidentally, a delay time per step of the first delay 317 and the second delay 318 for fine adjustment is set to be about ⅟20 or less as compared with a delay time of the third delay 331 and the fourth delay 333 for coarse adjustment. Besides, the fourth counter 330 is controlled by the comparison output of the comparator 315, and the count operation is the same as the case of the third counter 313.

Figure 51:
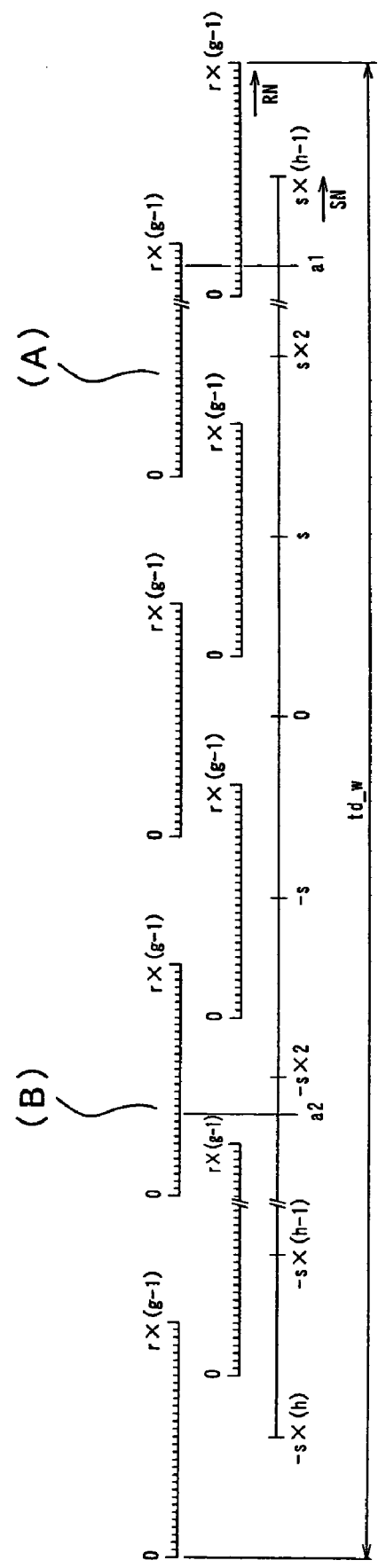

Hereinafter, a coarse adjustment operation of a phase and a fine adjustment operation by the random number generator 310 shown in FIG. 50 will be described with reference to FIG. 51 and Table 1. Incidentally, FIG. 51 shows the operation range of the coarse adjustment and the fine adjustment at the time of the phase adjustment, and Table 1 shows an operation table of the third counter 313 and the fourth counter 330 at that time. Here, the fine adjustment range is made [0 to r×(g−1)] and the coarse adjustment range is made [−s×(h) to s×(h−1)].

In the initial state, both the count value (SN) of the fourth counter 330 for coarse adjustment and the count value (RN) of the third counter 313 for fine adjustment are made 0. By the initial control circuit 324, (m) of the first counter 311 is controlled forcibly to m=1 at power-on for a given number of clocks (phase adjustment width tdw in FIG. 51, that is, clock number of 2×(2×g+h)), and accordingly, in this given period, the third counter 313 performs a count operation (+1, or ±0, or −1) every two clocks on the basis of the comparison output of the comparator 315. Besides, during this, the fourth counter 330 performs a count operation (+1, ±0, or −1) on the basis of the comparison output of the comparator 315 and the state of the third counter 313.

First, (1) in the case where a phase point to be finally adjusted is a1 of FIG. 51, when power is turned on, the third counter 313 counts up from 0 to (g−1) every two clocks by the comparison output (n<m) of the comparator 315.

When the third counter counts up to RN=(g−1), in next two clocks, the fourth counter 330 counts up every two clocks from 0 to (h−2) under the conditions of the comparison output (n<m) of the comparator 315 and the state of RN=(g−1) of the third counter 313 to obtain SN=(h−2). Here, the state of SN=(h−2) is a coarse adjustment step position corresponding to the phase setting point a1 in FIG. 51, and a fine adjustment range corresponding to this becomes a range of [0 to r×(g−1)] of (A) in FIG. 51. In such a counter operation, the state of RN=(g−1) of the third counter 313 is forcibly held under the control of the initial control circuit 324.

Next, in the state where the third counter 313 is RN=(g−1) and the fourth counter 330 is SN=(h−2), the third counter 313 counts down every two clocks by the comparison output (n>m) of the comparator 315 to successively approach the phase setting point a1, the phase is automatically adjusted so that the occurrence ratio of "1" of the output from the flip-flop converges on ½, and it finally remains substantially at the phase of the phase setting point a1.

Besides, (2) in the case where a phase to be finally adjusted is a2, in the initial state, SN=(0) and RN=(0). When the third counter 313 is RN=(0), by the comparison output (n>m) of the comparator 315, in next two clocks, the fourth counter 330 counts down from (0) to (−2) every two clocks to obtain SN=(−2). Here, the state of SN=(−2) is a coarse adjustment step position (−s×2) corresponding to the phase setting point a2 in FIG. 51, and a fine adjustment range becomes a range [0 to r×(g−1)] of (B) in FIG. 51. In such a counter operation, the state of RN=(0) of the third counter 313 is forcibly held under the control of the initial control circuit 324.

Next, from the state where the third counter 313 is RN=(0) and the fourth counter 330 is SN=(−2), by the comparison output (n<m) of the comparator 315, the third counter 313 counts up every two clocks to successively approach the phase setting point a2, and it is automatically adjusted so that the occurrence ratio of "1" of the output from the flip-flop finally converges on ½, and remains substantially at the phase of the phase setting point a2.

Next, (3) in a normal operation after the phase setting point is adjusted to a1 or a2 by the initial control operation, as shown in Table 1, at a time other than RN=(0) or RN=(g-1), the third counter 313 performs a count operation (+1, ±0, -1) on the basis of the comparison output of the comparator 315 in a given period (every clock of 2×m) by m (for example, m=250) set by the first counter 311.

Besides, at the time of RN=(0), the third counter 313 performs a count operation of [+1, ±0, RN=(g-1)] on the basis of the comparison output of the comparator 315, and the fourth counter 330 is decremented by 1 when the third counter 313 is moved to RN=(g-1).

Besides, at the time of RN=(g-1), the third counter 313 performs a count operation of [+1, ±0, RN=(g-1)] on the basis of the comparison output of the comparator 315, and the fourth counter 330 is incremented by 1 when the third counter 313 is moved to RN=(0).

As described above, first of all, the phase is roughly adjusted (coarse adjustment) to a specified phase, and then, the fine adjustment is performed to the finally adjusted phase setting point. By this, the high accuracy phase adjustment is efficiently performed, and it becomes possible to increase the speed of the phase adjustment by the feedback control. Besides, by providing the coarse adjustment means, a wide phase adjustment width can be obtained by the structure of few delay steps, and circuit parts constituting the phase adjustment unit 302 can be reduced.

TABLE 1

| Third counter | Comparator | At the time of initial operation (m = 1) | | At the time of normal operation (m is arbitrary) | |
| --- | --- | --- | --- | --- | --- |
| | | Third counter | Fourth counter | Third counter | Fourth counter |
| RN = (0) | n > m | ±0 | -1 | RN = (g - 1) | -1 |
| | n = m | ±0 | ±0 | ±0 | ±0 |
| | n < m | +1 | ±0 | +1 | ±0 |
| 0 < RN < (g - 1) | n > m | -1 | ±0 | -1 | ±0 |
| | n = m | ±0 | ±0 | ±0 | ±0 |
| | n < m | +1 | ±0 | +1 | ±0 |
| RN = (g - 1) | n > m | -1 | ±0 | -1 | ±0 |
| | n = m | ±0 | ±0 | ±0 | ±0 |
| | n < m | ±0 | +1 | RN = (0) | +1 |

Next, a third embodiment will be described with reference to FIGS. 52 to 54.

Figure 53:
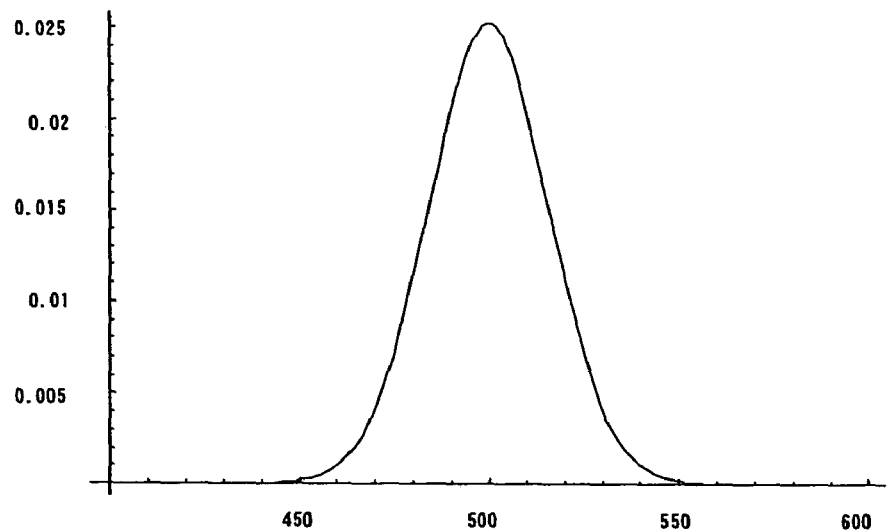
Figure 54:
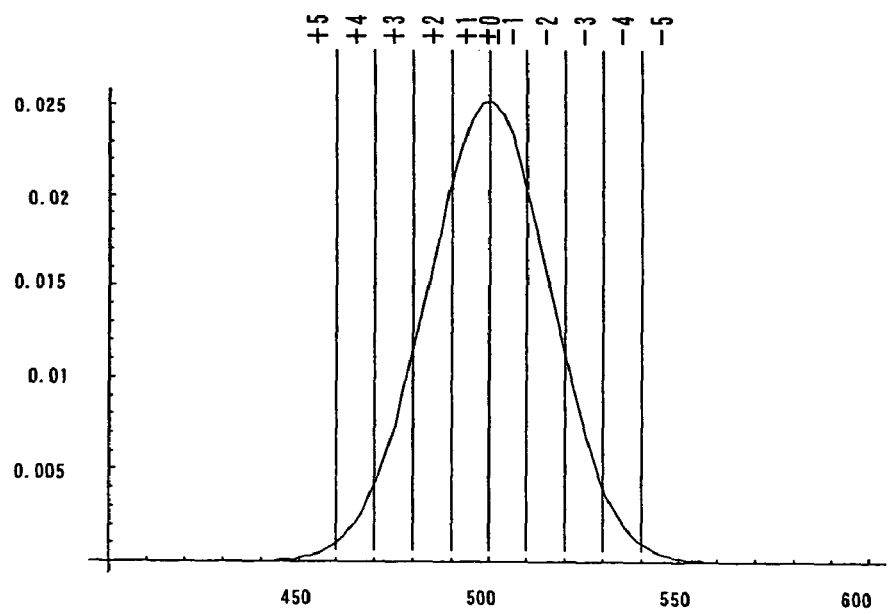

Here, FIG. 53 is a view plotting the number of times of occurrence of "1" or "0" when a random number is outputted 1000 times by a random number generator with uniformity, and shows a normal distribution. FIG. 54 shows this normal distribution which is divided into eight equal parts relative to the center, and the center is made ±0, and weighting of +5 to -5 from the left end is given to the each ten divided positions in total in FIG. 54.

Figure 52:
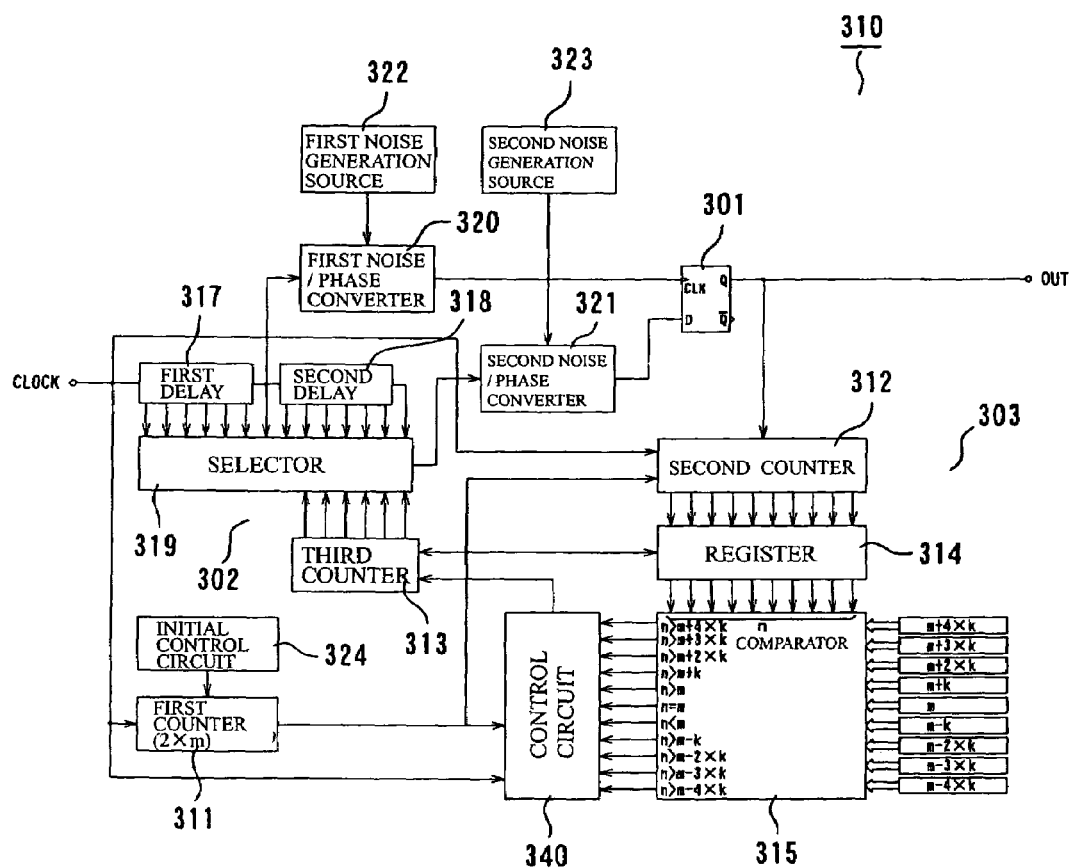

A random number generator 310 shown in FIG. 52 is constructed such that the comparison form of the comparator 315 in the random number generator 310 of FIG. 48 is changed to a multi-form, a control circuit 340 is connected to its output. This embodiment is constructed such that comparison data of the comparator 315 to be compared with the content (n) of a register 314 is made multi-division position data (m+4×k) to (m-4×k) of the normal distribution shown in FIG. 54, and it can be instantaneously outputted that the count number of the number of times of occurrence corresponds to which divided position of the normal distribution.

Besides, the control circuit 340 judges the weighting (-5 to +5) corresponding to the divided position data from the comparison output ((n>m+4×k) to (n>m-4×k)) of the comparator 315, and sets the count number corresponding to each into the third counter 313. The third counter 313 performs a count operation corresponding to the weighting, and controls a change width (change step number) of a delay output by the selector 319. For example, when the weighting is (-4), the third counter 313 repeats a down count four times in one operation, and when the weighting is (+3), it repeats an up count three times in one operation. Besides, when the weighting is (0), the count operation is stopped.

As stated above, in this structure, in a normal distribution region in which the number of times of occurrence of "0" or "1" is small (for example, in FIG. 54, in the vicinity of 450 or 550 in the number of times of occurrence), the change width of the delay output is made large by the weighting to perform the coarse adjustment of the phase, and as it approaches the center of the normal distribution (the vicinity of 500 in the number of times of occurrence in FIG. 54), the change width of the delay output is made small to perform the fine adjustment of the phase. By this, the efficient phase adjustment becomes possible.

In the above described first to third embodiments, although the D-type flip-flop is used as the flip-flop for generating the random number, the invention is not limited to this, and any flip-flop can be used as long as it has a function equivalent to this, for example, an R-S flip-flop or the like can be used.

Besides, by arranging P serial type random number generators 310 of the invention in parallel with each other, a P-bit structure parallel type random number generator can also be constructed.

Further, when the serial type random number generator or the parallel type random number generator is used, it is also possible to realize a high speed and high performance probability generator without regularity, correlativity and periodicity.

As described above, according to the invention, in the phase adjustment by the feedback control, since the phase adjustment unit is provided with the coarse adjustment means and the fine adjustment means, the efficient phase adjustment becomes possible, and the speed of random number generation can be increased. Besides, by providing the coarse adjustment means, a wide phase adjustment width is obtained by a small delay step structure, and circuit parts can be reduced by that.

Besides, according to the invention, the normal distribution of the occurrence ratio of 0 or 1 of a random number is compared with the number of times of actual occurrence, and the phase adjustment width is made variable according to the position of the normal distribution to which the number of times of occurrence corresponds, and accordingly, the efficient phase adjustment becomes possible similarly to the above, and the speed of random number generation can be increased.

Fourth Mode of the Invention

FIGS. 55 to 67 show a fourth mode of the invention. Hereinafter, the fourth mode of the invention will be described with reference to the drawings.

Figure 55:
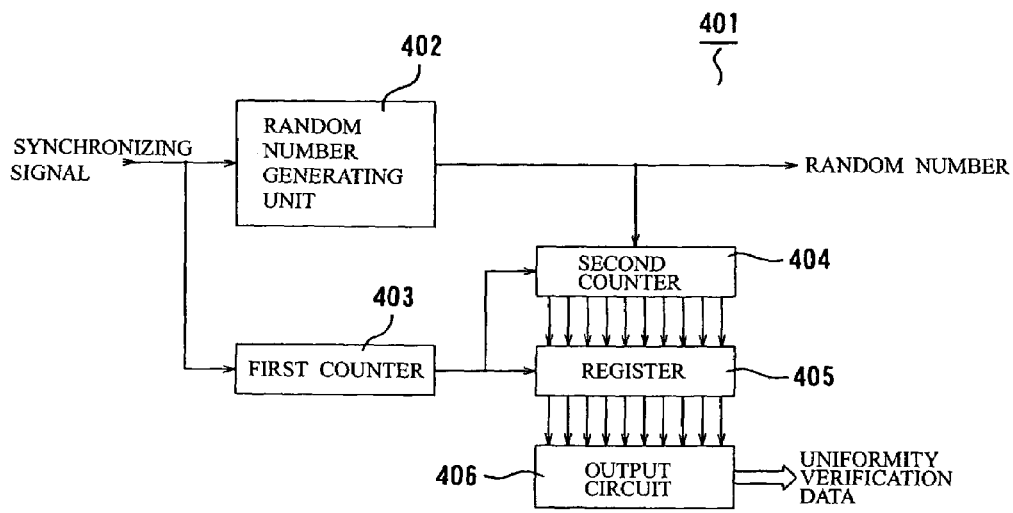

FIG. 55 is a circuit diagram showing a first embodiment of a one-bit random number generator of the invention.

As shown in FIG. 55, this one-bit random number generator 401 is of a verification data output type and is constituted by a random number generating unit 402, a first counter 403, a second counter 404, a register 405 and an output circuit 406, and when a synchronizing signal is inputted to the random number generating unit 402, "1" or "0" as random number data is outputted from the random number generating unit 402. At this time, the input signal of the random number generating unit 402 is inputted to the first counter 403 as well, and the first counter 403 counts a given number of times and outputs it to the second counter 404 and the register 405. On the other hand, the second counter 404 counts the number of times of occurrence of random number data outputted from the random number generating unit 402 and generates count data. Then, the register 405 holds the count data of the second counter 404 in every cycle counted by the first counter 403, and the output circuit 406 outputs the count data held in the register 405 as verification data serially or in parallel.

Accordingly, in this one-bit random number generator 401, even if a user does not perform a troublesome and complicated statistical processing, it becomes possible to verify the uniformity of occurrence of random number data by itself.

Figure 56:
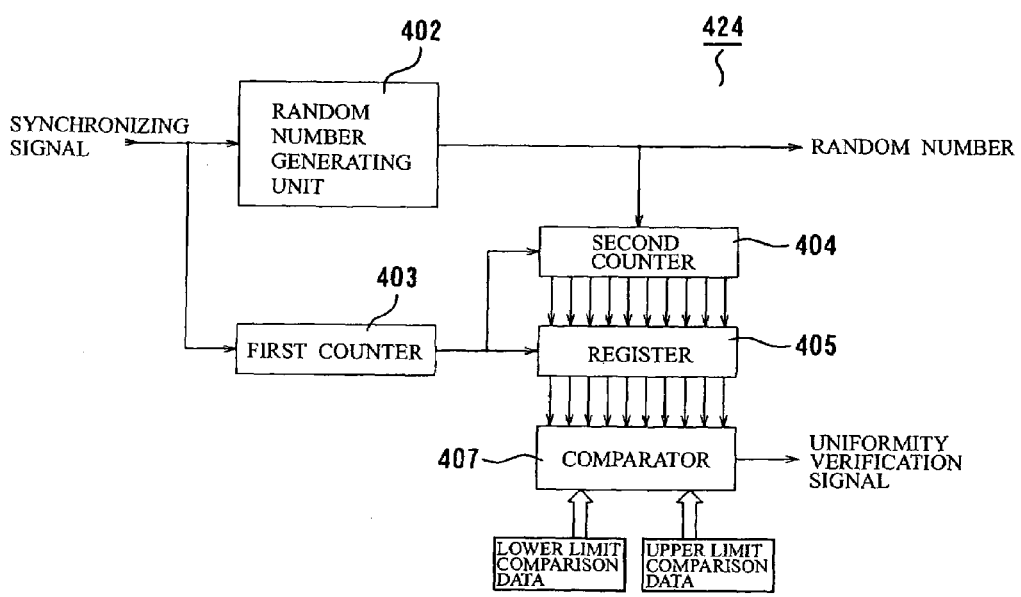

FIG. 56 is a circuit diagram showing a second embodiment of a one-bit random number generator of the invention.

As shown in FIG. 56, this one-bit random number generator 424 is of a verification signal output type and is constituted by a random number generating unit 402, a first counter 403, a second counter 404, a register 405 and a comparator 407, and when a synchronizing signal is inputted to the random number generating unit 402, "1" or "0" is outputted as random number data from the random number generating unit 402. At this time, the input signal of the random number generating unit 402 is inputted to the first counter 403 as well, and the first counter 403 counts a given number of times. On the other hand, the second counter 404 counts the number of times of occurrence of random number data outputted from the random number generating unit 402 and generates count data. Then, the register 405 holds the count data of the second counter 404 in every cycle counted by the first counter 403. Further, the comparator 407 compares the data held in the register 405 with previously set upper limit comparison data and lower limit comparison data, and in a case where the data in the register 405 is between the upper limit comparison data and the lower limit comparison data, it outputs a verification signal indicating that the uniformity of occurrence of random number data is high, and in a case other than that, it outputs a verification signal indicating that the uniformity of occurrence of random number data is low.

Accordingly, in this one-bit random number generator 424, even if a user does not perform a troublesome and complicated statistical processing, it becomes possible to verify the uniformity of occurrence of random number data by itself.

Figure 57:
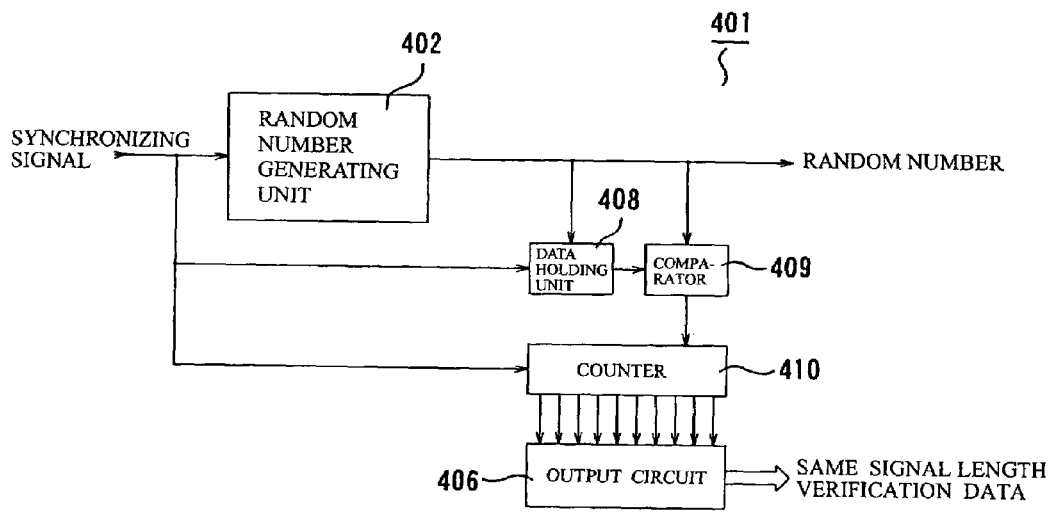

FIG. 57 is a circuit diagram showing a third embodiment of a one-bit random number generator of the invention.

In this one-bit random number generator 401, when the output of a random number generating unit 402 is uniform, the probability of occurrence of "0" or "1" is ½, and the probability that each numeral continuously occurs k times is $(½)^k$, for example, the probability that the same numeral continuously occurs 30 times is 1/1073741824 (that is, almost zero), and accordingly, the basic idea is that if the same numeral continuously occurs 30 times, it is possible to judge that this random number generating unit 402 is not normal.

That is, this one-bit random number generator 401 is, as shown in FIG. 57, of a verification data output type and is constituted by a random number generating unit 402, a data holding unit 408 such as a D-type flip-flop, a comparator 409 such as an exclusive OR element, a counter 410 and an output circuit 406, and when a synchronizing signal is inputted to the random number generating unit 402, "1" or "0" is outputted as random number data from the random number generating unit 402. At this time, the input signal and the output signal of the random number generating unit 402 are inputted to the data holding unit 408 as well, and the data holding unit 408 holds previous random number data outputted from the random number generating unit 402 and outputs it to the comparator 409. Besides, the output signal of the random number generating unit 402 is also inputted to the comparator 409, and the comparator 409 compares present random number data outputted from the random number generating unit 402 with the previous random number data held in the data holding unit 408, and when both are identical to each other, it outputs a count up signal to the counter 410, and when both are different from each other, it outputs a count clear signal to the counter 410. Then, the input signal of the random number generating unit 402 is also inputted to the counter 410, the counter 410 outputs the data to the output circuit 406, and the output circuit 406 successively outputs the data as verification data of the same signal length serially or parallelly.

Accordingly, in this one-bit random number generator 401, by the outputted verification data of the same signal length, a statistical processing for verifying the uniformity of random numbers becomes easy.

Figure 58:
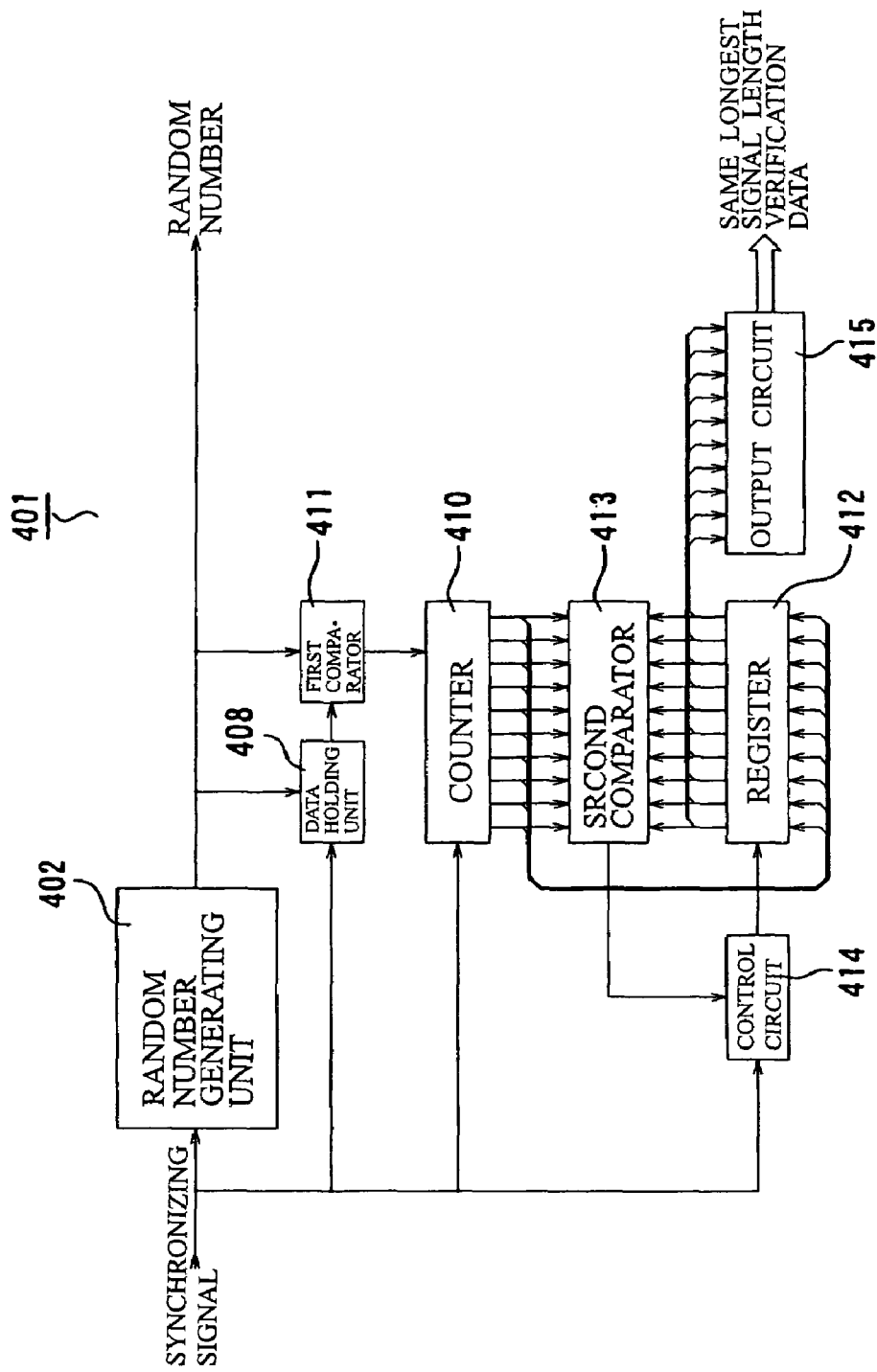

FIG. 58 is a circuit diagram showing a fourth embodiment of a one-bit random number generator of the invention.

This one-bit random number generator 401 is, as shown in FIG. 58, of a verification data output type and is constituted by a random number generating unit 402, a data holding unit 408 such as a D-type flip-flop, a first comparator 411 such as an exclusive OR element, a counter 410, a register 412, a second comparator 413 such as an exclusive OR element, a control circuit 414 and an output circuit 415, and when a synchronizing signal is inputted to the random number generating unit 402, "1" or "0" is outputted as random number data from the random number generating unit 402. At this time, the input signal and the output signal of the random number generating unit 402 are inputted to the data holding unit 408 as well, and the data holding unit 408 holds previous random number data outputted from the random number generating unit 402 and outputs it to the first comparator 411. Besides, the output signal of the random number generating unit 402 is also inputted to the first comparator 411, and the first comparator 411 compares present random number data outputted from the random number generating unit 402 with the previous random number data held in the data holding unit 408, and when both are identical to each other, it outputs a count up signal to the counter 410, and when both are different from each other, it outputs a count clear signal to the counter 410. Then, the input signal of the random number generating unit 402 is also inputted to the counter 410, the counter 410 outputs the data to the second comparator 413, and the second comparator 413 compares the data of the register 412 with the output data of the counter 410, and when the latter is larger than the former, it outputs a data overwrite signal to the control circuit 414, and in a case other than that, it outputs a data hold signal to the control circuit 414. When receiving the data overwrite signal, the control circuit 414 writes the output data of the counter 410 into the register 412, and when receiving the data hold signal, the control circuit controls to hold the data of the register 412, and the output circuit 415 successively outputs the data held in the register 412 as verification data of the same longest signal length serially or parallelly.

Accordingly, in this one-bit random number generator 401, by the outputted verification data of the same longest signal length, a statistical processing for verifying the uniformity of random numbers becomes easy.

Figure 59:
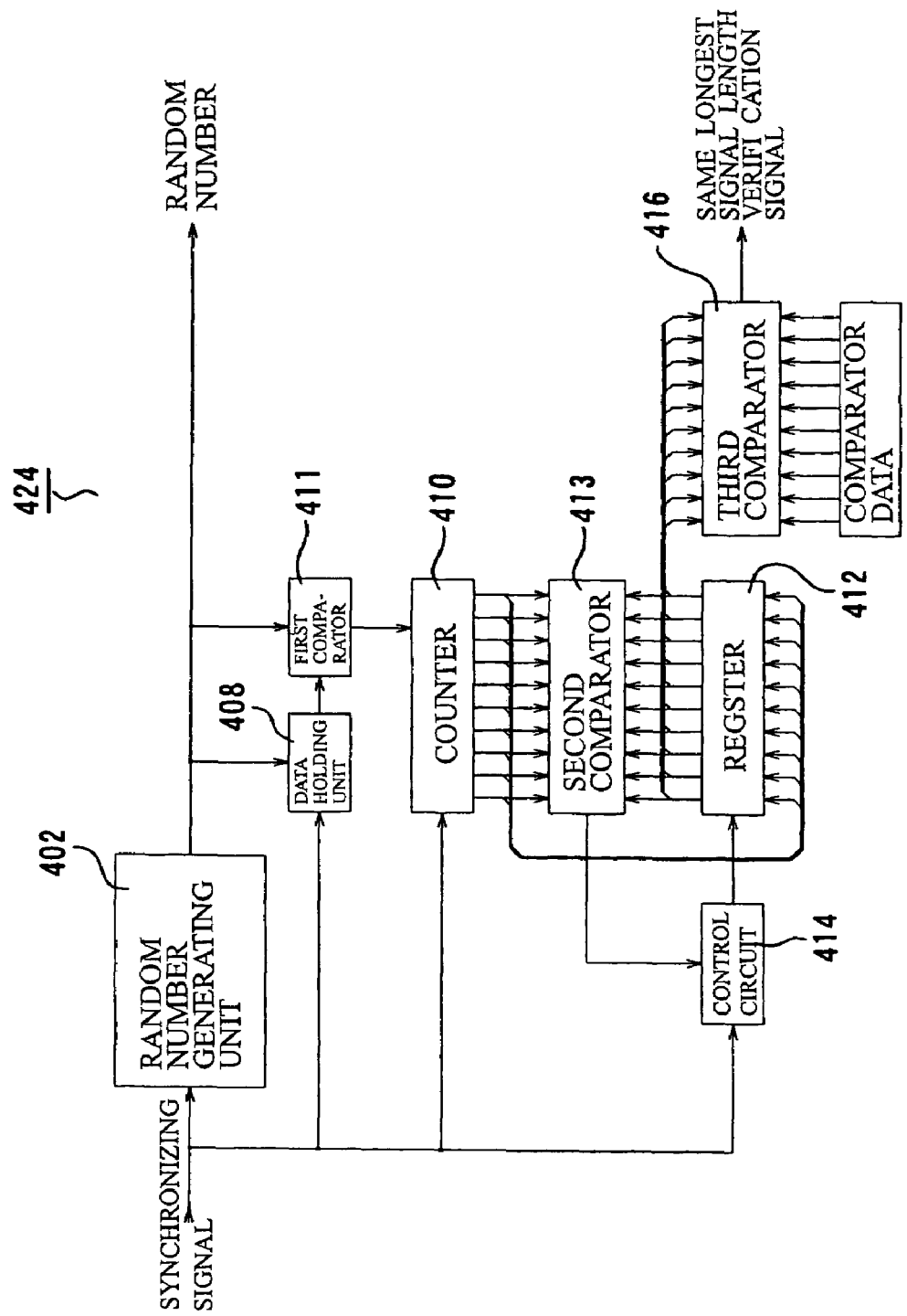

FIG. 59 is a circuit diagram showing a fifth embodiment of a one-bit random number generator of the invention.

This one-bit random number generator 524 is, as shown in FIG. 59, a verification signal output type and is constituted by a random number generating unit 402, a data holding unit 408 such as a D-type flip-flop, a first comparator 411 such as an exclusive OR element, a counter 410, a register 412, a second comparator 413 such as an exclusive OR element, a control circuit 414 and a third comparator 416 such as an exclusive OR element, and when a synchronizing signal is inputted to the random number generating unit 402, "1" or "0" is outputted as random number data from the random number generating unit 402. At this time, the input signal and the output signal of the random number generating unit 402 are inputted to the data holding unit 408 as well, and the data holding unit 408 holds previous random number data outputted from the random number generating unit 402, and outputs it to the first comparator 411. Besides, the output signal of the random number generating unit 402 is also inputted to the first comparator 411, and the first comparator 411 compares present random number data outputted from the random number generating unit 402 with the previous random number data held in the data holding unit 408, and when both are identical to each other, it outputs a count up signal to the counter 410, and when both are different from each other, it outputs a count clear signal to the counter 410. Then, the input signal of the random number generating unit 402 is also inputted to the counter 410, the counter 410 outputs the data to the second comparator 413, and the second comparator 413 compares the data of the register 412 with the output-data of the counter 410, and when the latter is larger than the former, it outputs a data overwrite signal to the control circuit 414, and at a time other than that, it outputs a data hold signal to the control circuit 414. When receiving the data overwrite signal, the control circuit 414 writes the output data of the counter 410 into the register 412, and when receiving the data hold signal, the control circuit controls to hold the data of the register 412, and the third comparator 416 compares the data held in the register 412 with previously set comparison data and successively outputs verification signal of the same longest signal length.

Accordingly, in this one-bit random number generator 424, even if a user does not perform a troublesome and complicated statistical processing, it becomes possible to verify the uniformity of occurrence of random number data by itself.

Figure 60:
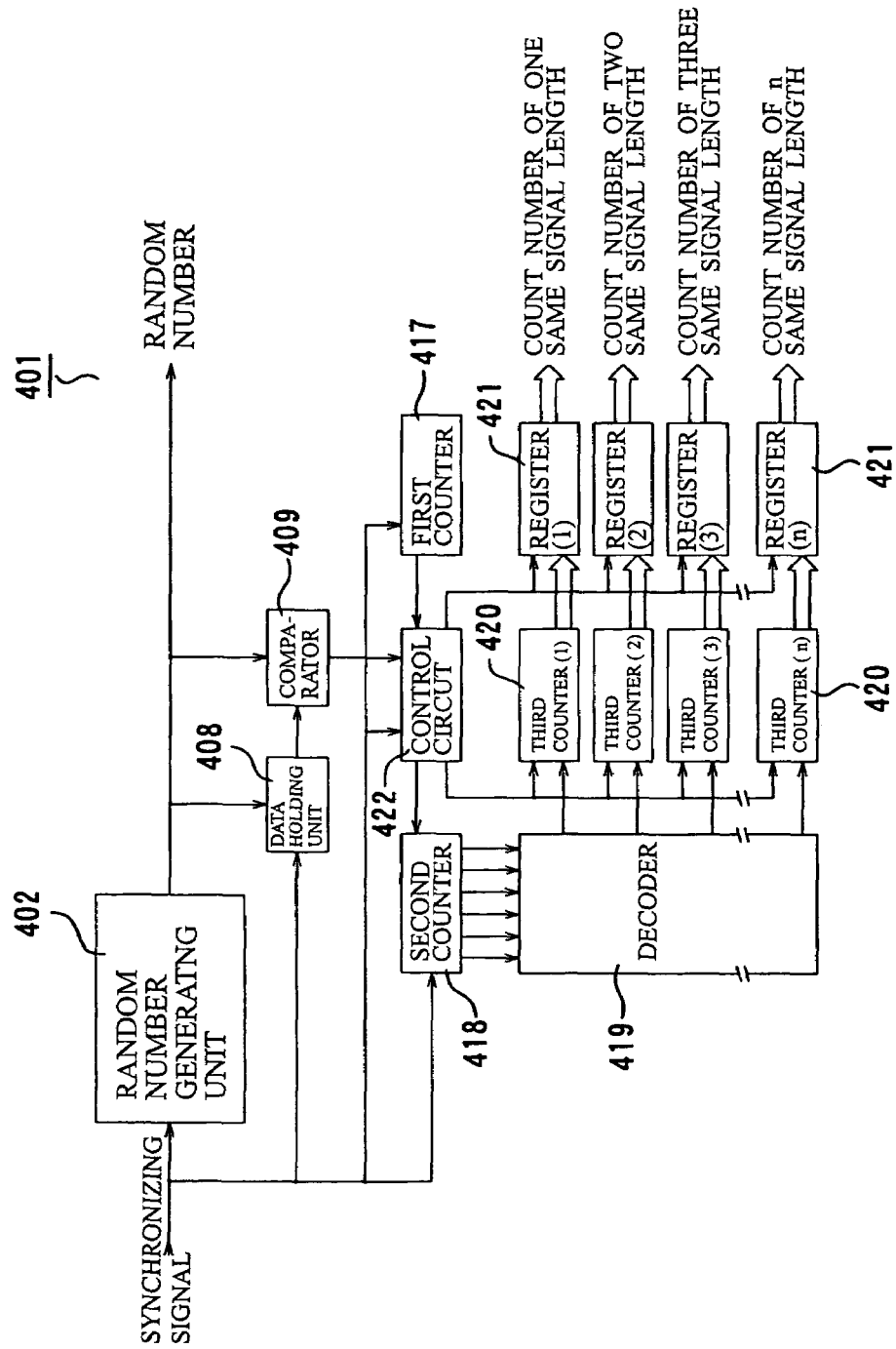

FIG. 60 is a circuit diagram showing a sixth embodiment of a one-bit random number generator of the invention.

This one-bit random number generator 401 is, as shown in FIG. 60, a verification data output type and is constituted by a random number generating unit 402, a data holding unit 408 such as a D-type flip-flop, a comparator 409 such as an exclusive OR element, a first counter 417, a second counter 418, a decoder 419, plural (n) third counters 420, plural (n) registers 421, and a control circuit 422, and when a synchronizing signal is inputted to the random number generating unit 402, "1" or "0" is outputted as random number data from the random number generating unit 402. At this time, the occurrence ratios for respective same signal lengths (1 to n) in a given number of times counted by the first counter 417 are counted, and are written into the registers 421 every given number of times counted by the first counter 417, and the distribution of the respective same signal lengths is successively outputted.

That is, the input signal and the output signal of the random number generating unit 402 are inputted to the data holding unit 408 as well, and the data holding unit 408 holds previous random number data outputted from the random number generating unit 402 and outputs it to the comparator 409. Besides, the output signal of the random number generating unit 402 is also inputted to the comparator 409, and the comparator 409 compares present random number data outputted from the random number generating unit 402 with the previous random number data held in the data holding unit 408, and when both are identical to each other, it outputs a count up signal to the control circuit 422, and when both are different from each other, it outputs a count clear signal to the control circuit 422. On the other hand, the input signal of the random number generating unit 402 is inputted also in the first counter 417 and the control circuit 422, and the first counter 417 counts the given number of times and outputs it to the control circuit 422. Further, the input signal of the random number generating unit 402 is inputted to the second counter 418 as well, and when receiving the count up signal from the comparator 409, the second counter 418 counts up and outputs to the decoder 419, and when receiving the count clear signal from the comparator 409, the second counter clears the count and outputs to the decoder 419. When receiving this, the decoder 419 decodes the output data of the second counter 418 and outputs to the respective third counters 420 for the respective signal lengths, and the respective counters 420 count the output data and output to the respective registers 421. Then, under the control of the control circuit 422, the respective registers 421 successively output verification data of the same signal length serially or parallelly on the basis of the output data of the comparator 409 and the signals for every given number of times counted by the first counter 417.

Accordingly, in this one-bit random number generator 401, by the respective outputted count numbers (verification data), a statistical processing for verifying the uniformity of random numbers becomes easy.

Figure 61:
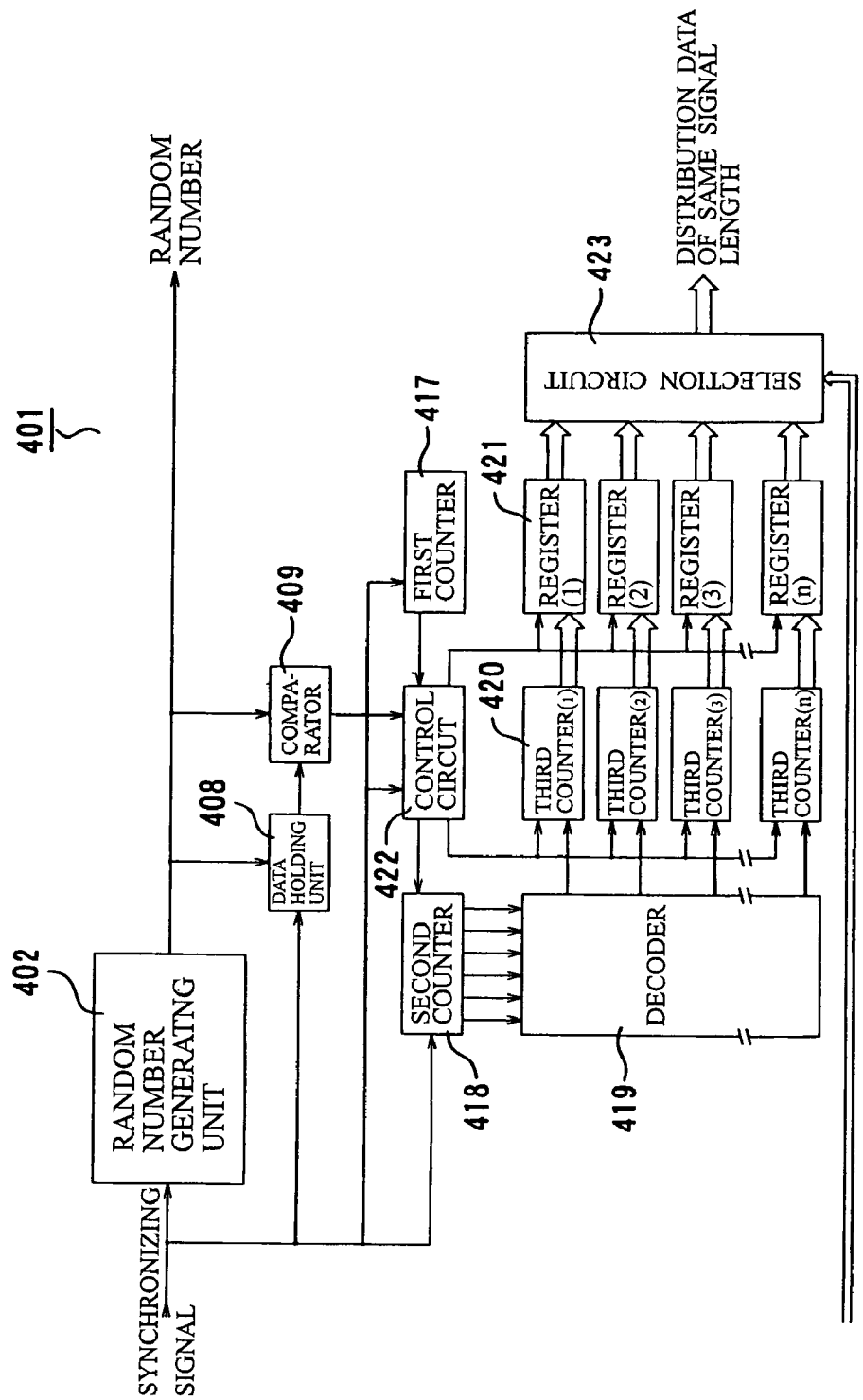

FIG. 61 is a circuit diagram showing a seventh embodiment of a one-bit random number generator of the invention.

This one-bit random number generator 401 is, as shown in FIG. 61, of a verification data output type and is constituted by a random number generating unit 402, a data holding unit 408 such as a D-type flip-flop, a comparator 409 such as an exclusive OR element, a first counter 417, a second counter 418, a decoder 419, plural (n) third counters 420, plural (n) registers 421, a control circuit 422 and a selection circuit 423, and when a synchronizing signal is inputted to the random number generating unit 402, "1" or "0" is outputted as random number data from the random number generating unit 402. At this time, the occurrence ratios of respective same signal lengths (1 to n) in a given number of times counted by the first counter 417 are counted, and are written into the registers 421 every given number of times counted by the first counter 417, and the distribution of the respective same signal lengths is successively outputted by the selection circuit 423 which can select it by external selection data.

That is, the input signal and the output signal of the random number generating unit 402 are inputted to the data holding unit 408 as well, and the data holding unit 408 holds previous random number data outputted from the random number generating unit 402 and outputs it to the comparator 409. Besides, the output signal of the random number generating unit 402 is also inputted to the comparator 409, and the comparator 409 compares present random number data outputted from the random number generating unit 402 with the previous random number data held in the data holding unit 408, and when both are identical to each other, it outputs a count up signal to the control circuit 422, and when both are different from each other, it outputs a count clear signal to the control circuit 422. On the other hand, the input signal of the random number generating unit 402 is inputted to the first counter 417 and the control circuit 422 as well, and the first counter 417 counts the given number of times and outputs it to the control circuit 422. Further, the input signal of the random number generating unit 402 is inputted to the second counter 418 as well, and when receiving the count up signal from the comparator 409, the second counter 418 counts up and outputs to the decoder 419, and when receiving the count clear signal from the comparator 409, the second counter clears the count and outputs to the decoder 419. When receiving this, the decoder 419 decodes the output data of the second counter 418, and outputs to the respective third counters 420 for respective signal lengths, and the respective counters 420 count the output data and outputs to the respective registers 421. Then, under the control of the control circuit 422, the respective registers 421 successively output verification data of the same signal length to the selection circuit 423 serially or parallelly on the basis of the output data of the comparator 409 and the signals for every given number of times counted by the first counter 417. Further, when the selection data is inputted to the selection circuit 423 from the outside, the selection circuit 423 suitably selects the output data of the registers 421 on the basis of the selection data and outputs it.

Accordingly, in this one-bit random number generator 401, by the outputted distribution data of the same signal length, a statistical processing for verifying the uniformity of random numbers becomes easy.

Figure 62:
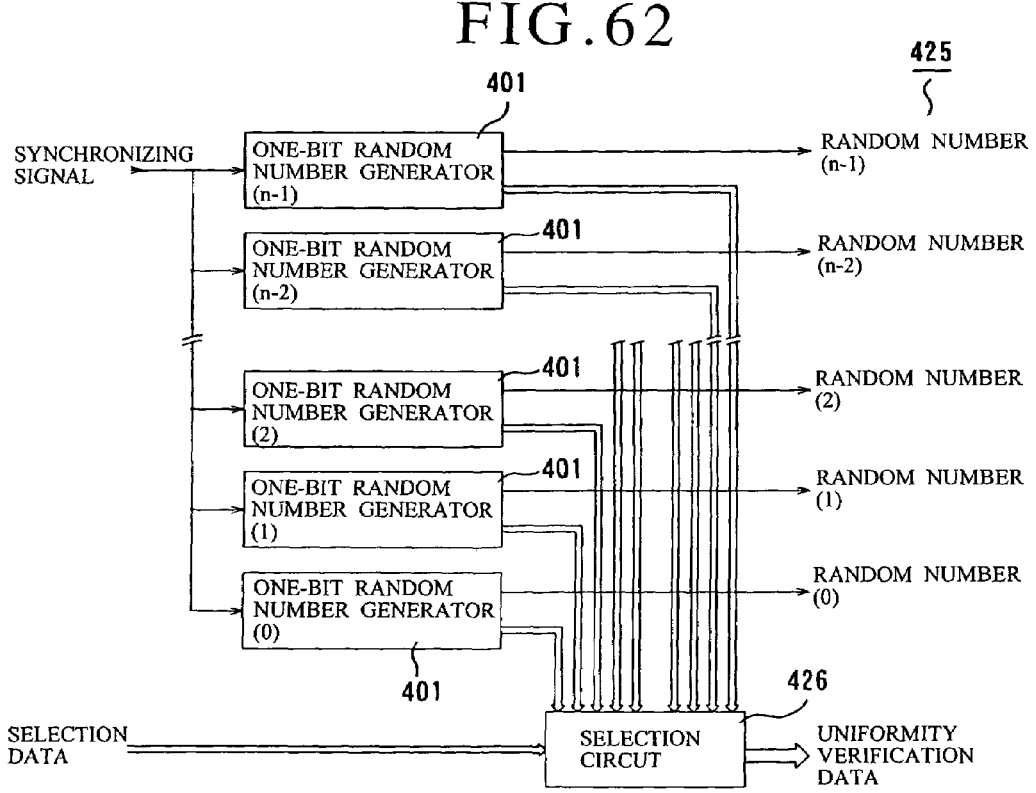

FIG. 62 is a circuit diagram showing a first embodiment of a multi-bit random number generator of the invention.

In this multi-bit random number generator 425, as shown in FIG. 62, plural (n) verification data output type one-bit random number generators 401 as described above are connected in parallel, and a selection circuit 426 is added to these. When selection data is inputted to the selection circuit 426 from the outside, the selection circuit 426 selects verification data outputted from the one-bit random number generators 401 for every bit on the basis of the selection data and outputs it.

Accordingly, in this multi-bit random number generator 425, by the outputted uniformity verification data, a statistical processing for verifying the uniformity of random numbers becomes easy.

Figure 63:
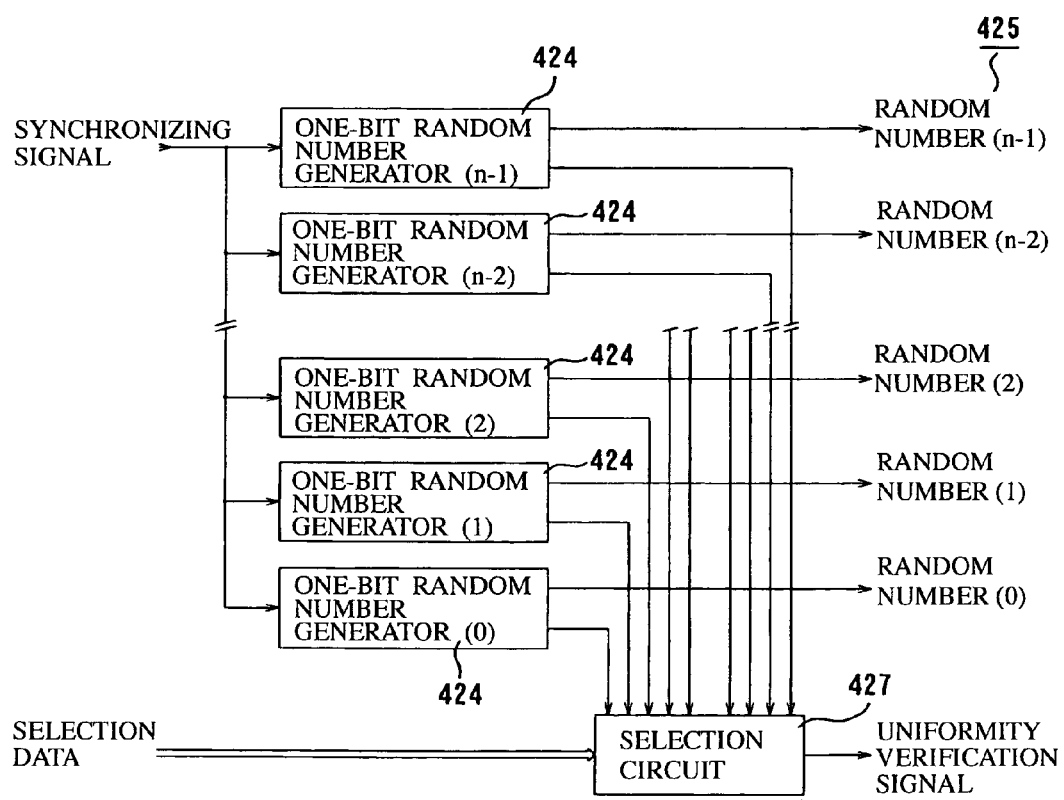

FIG. 63 is a circuit diagram showing a second embodiment of a multi-bit random number generator of the invention.

In this multi-bit random number generator 425, as shown in FIG. 63, plural (n) verification signal output type one-bit random number generators 424 as described above are connected in parallel, and a selection circuit 427 is added to these. When selection data is inputted to the selection circuit 427 from the outside, the selection circuit 427 selects verification signals outputted from the one-bit random number generators 424 for every bit on the basis of the selection data and outputs them.

Accordingly, in this multi-bit random number generator 425, even if a user does not perform a troublesome and complicated statistical processing, it becomes possible to verify the uniformity of occurrence of random number data by itself.

Figure 64:
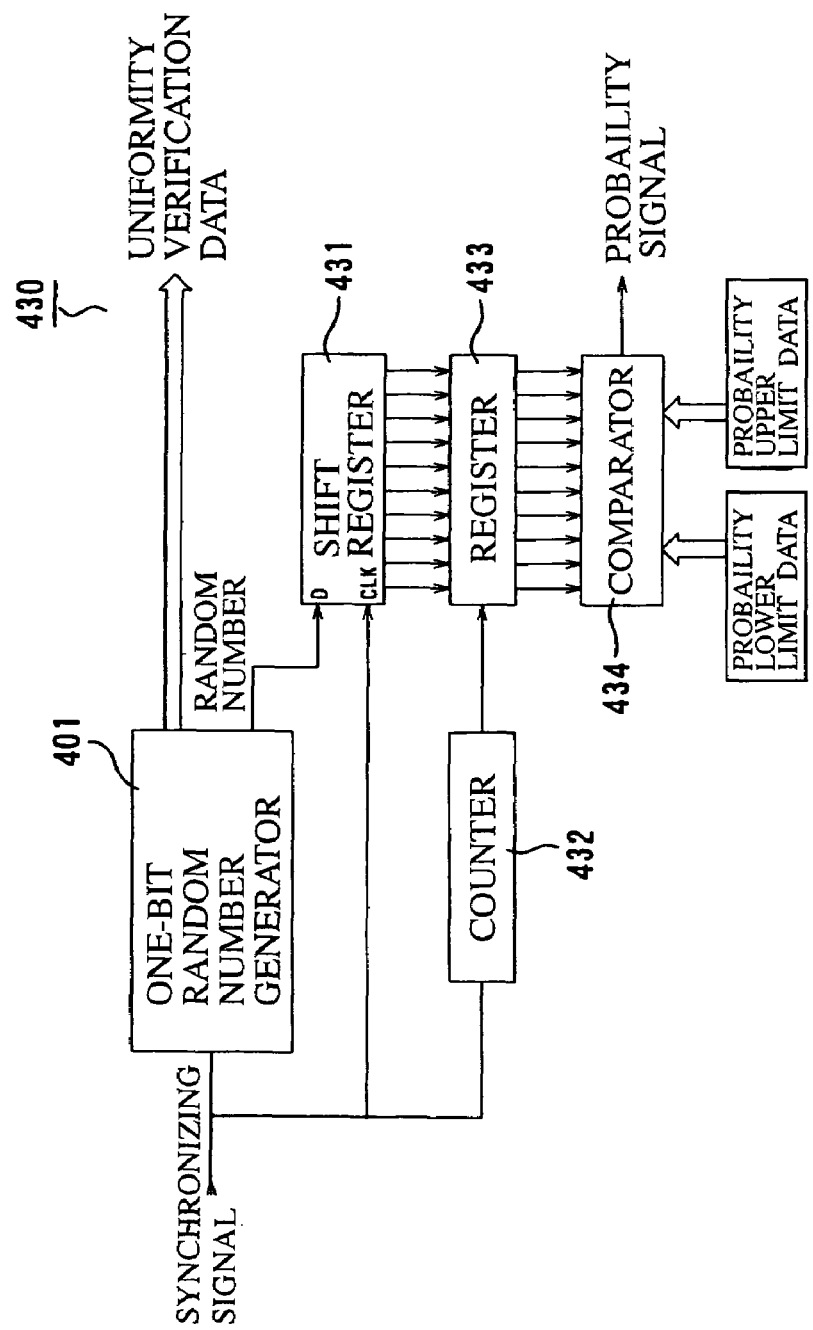

FIG. 64 is a circuit diagram showing a first embodiment of a probability generator of the invention.

This probability generator 430 is, as shown in FIG. 64, constituted by a verification data output type one-bit random number generator 401 as described above, a shift register 431, a counter 432, a register 433 and a comparator 434. Random number data outputted from the one-bit random number generator 401 is inputted to the shift register 431, and the shift register 431 converts this random number data from serial data to parallel data, and outputs it to the register 433. On the other hand, the input signal of the one-bit random number generator 401 is inputted to the counter 432 as well, and the counter 432 counts the bit length of given parallel data and outputs it to the register 433. Then, the register 433 holds the parallel data of the shift register 431 in every cycle counted by the counter 432. Then, the comparator 434 compares the data held by the register 433 with previously set probability upper limit data and probability lower limit data, and outputs a probability signal of "hit" in the case where the data in the register 433 is between the probability upper limit data and the probability lower limit data, and "miss" in a case other than that.

Accordingly, in this probability generator 430, even if a user does not perform a troublesome and complicated statistical processing, it is easy to verify the uniformity of occurrence of random number data, and accordingly, it also becomes easy to evaluate the reliability of probability.

Figure 65:
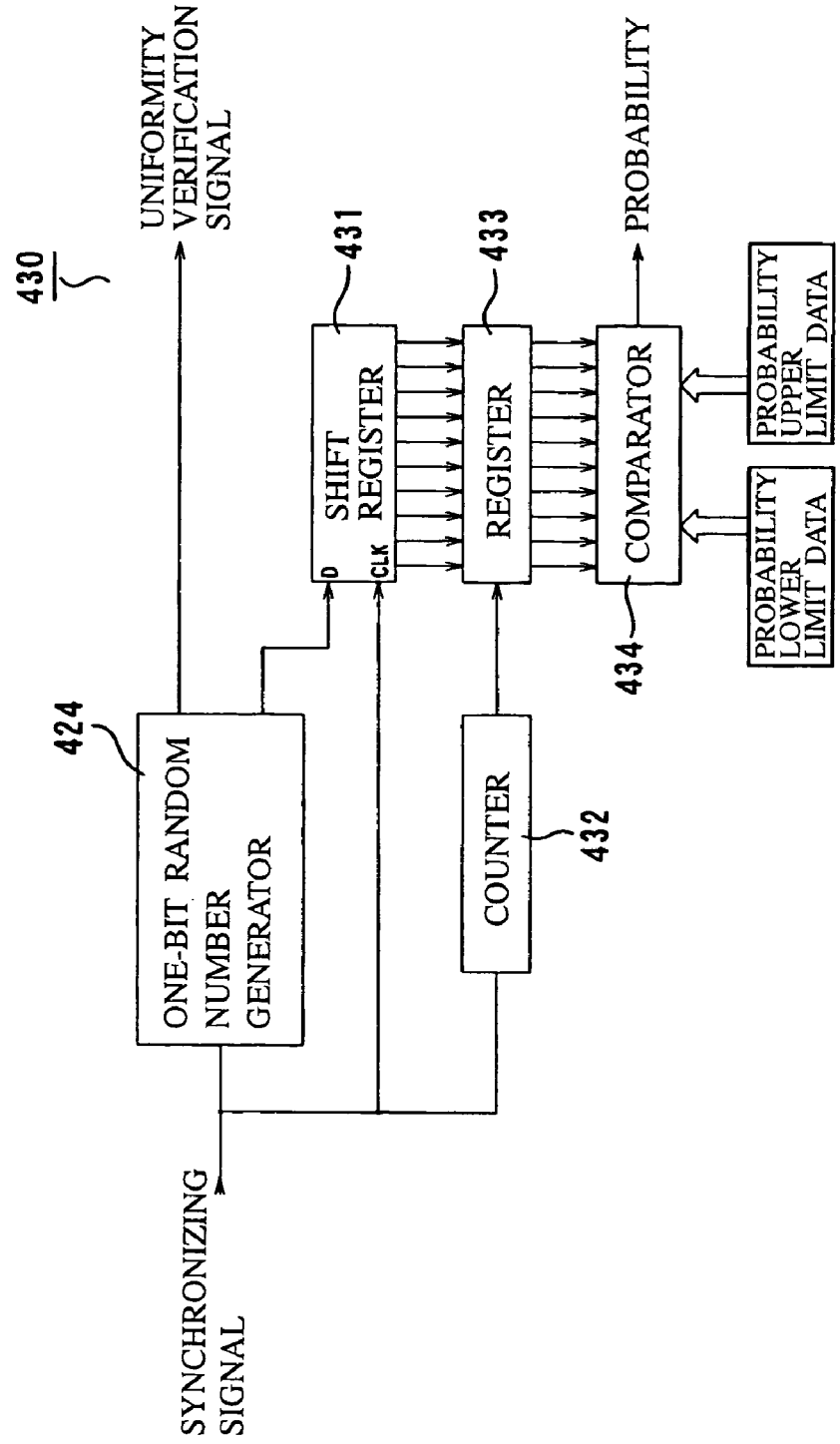

FIG. 65 is a circuit diagram showing a second embodiment of a probability generator of the invention.

This probability generator 430 is, as shown in FIG. 65, constituted by a verification signal output type one-bit random number generator 424 as described above, a shift register 431, a counter 432, a register 433 and a comparator 434. Random number data outputted from the one-bit random number generator 424 is inputted to the shift register 431, and the shift register 431 converts this random number data from serial data to parallel data, and outputs it to the register 433. On the other hand, the input signal of the one-bit random number generator 424 is inputted to the counter 432 as well, and the counter 432 counts the bit length of given parallel data and outputs it to the register 433. Then, the register 433 holds the parallel data of the shift register 431 in every cycle counted by the counter 432. Then, the comparator 434 compares the data held by the register 433 with previously set probability upper limit data and probability lower limit data, and outputs a probability signal of "hit" in a case where the data in the register 433 is between the probability upper limit data and the probability lower limit data, and "miss" in a case other than that.

Accordingly, in this probability generator 430, even if a user does not perform a troublesome and complicated statistical processing, it is easy to verify the uniformity of occurrence of random number data, and accordingly, it also becomes easy to evaluate the reliability of probability.

Figure 66:
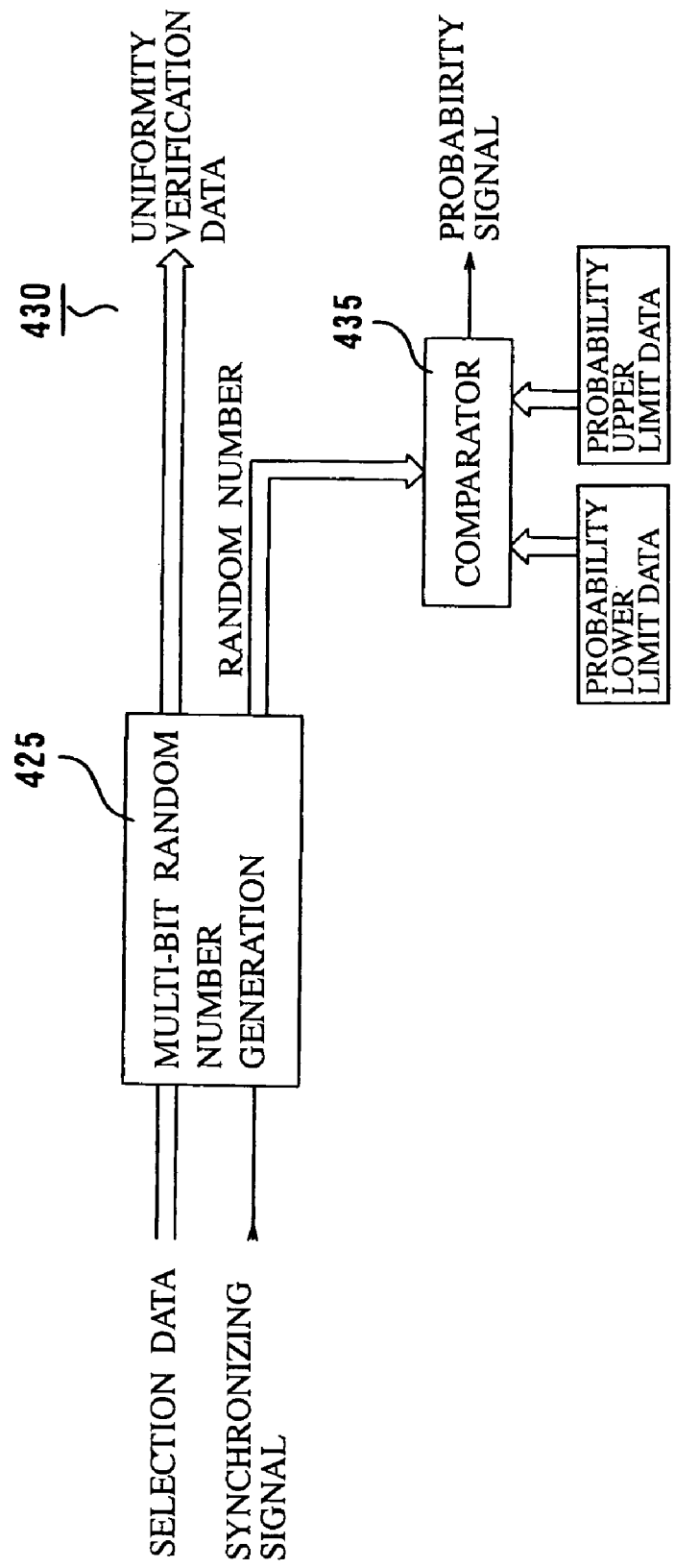
Figure 67:
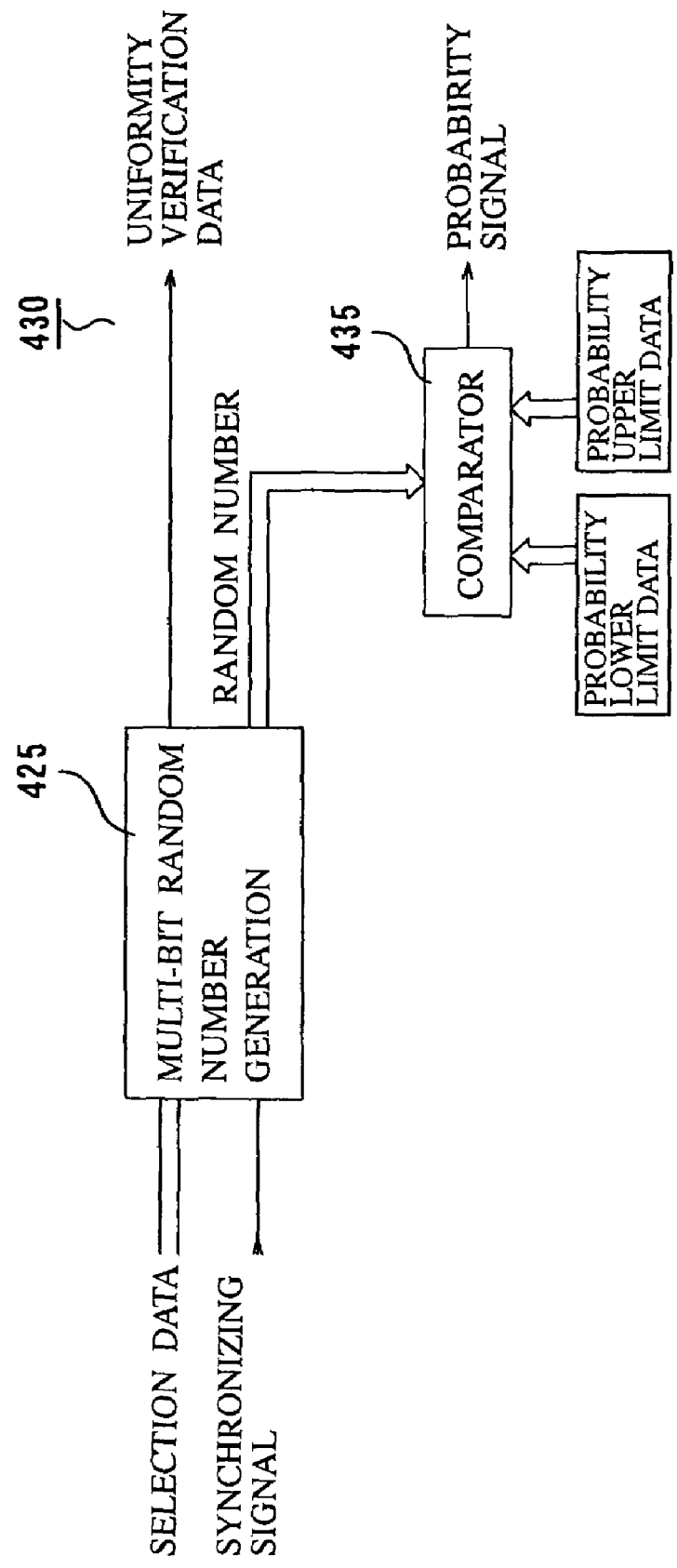

FIG. 66 is a circuit diagram showing a third embodiment of a probability generator of the invention, and FIG. 67 is a circuit diagram showing a fourth embodiment of a probability generator of the invention.

Each of these probability generators 430 is, as shown in FIGS. 66 and 67, a multi-bit random number generator 425 as described above and a comparator 435. Random number data (parallel data) outputted from the multi-bit random number generator 425 is inputted to the comparator 435, and the comparator 435 compares the random number data with previously set probability upper limit data and probability lower limit data, and outputs a probability signal of "hit" in a case where the random number data is between the probability upper limit data and the probability lower limit data, and "miss" in a case other than that.

Accordingly, in this probability generator 430, even if a user does not perform a troublesome and complicated statistical processing, it is easy to verify the uniformity of occurrence of random number data, and accordingly, it also becomes easy to evaluate the reliability of probability.

As described above, according to the above modes of the invention, the uniformity of occurrence of random number data can be verified by itself, and it becomes unnecessary for a user to perform a statistical processing, and therefore it is possible to provide the one-bit random number generator which can easily verify the uniformity of occurrence of random number data and to raise the reliability.

Besides, the uniformity of occurrence of random number data can be verified by itself, and it becomes unnecessary for a user to perform a statistical processing, and therefore it is possible to provide the multi-bit random number generator which can easily verify the uniformity of occurrence of random number data and can raise the reliability.

Further, according to the invention above among the inventions, the uniformity of occurrence of random number data can be verified by itself, and it becomes unnecessary for a user to perform a statistical processing, and therefore it is possible to provide the probability generator which can easily verify the uniformity of occurrence of random number data and can raise the reliability.

What is claimed is:

1. A random number generator comprising:
   a flip-flop in which an output state (0 or 1) becomes definite according to a phase difference between signals inputted to two input units;
   a delay unit for producing the phase difference between the two input signals; and
   a feedback circuit for controlling the phase difference so that an occurrence ratio of 0 or 1 of an output from the flip-flop by the input signals is constant within a specified repetition cycle.

2. The random number generator according to claim 1, wherein the delay unit comprises a delay circuit for delaying the input signals at several stages and outputting them, and a selection circuit for selecting one of delay outputs according to a select input.

3. The random number generator according to claim 1 wherein the feedback circuit comprises:
   a first counter for measuring the specified repetition cycle of the input signals;
   a second counter for measuring the number of occurrences of 0 or 1 of the output from the flip-flop in every repetition cycle;
   a register for holding a measurement output of the second counter every repetition cycle;
   a constant setter for generating comparison data for setting of the occurrence ratio of 0 or 1 of the output from the flip-flop;
   a comparator for comparing output data of the register with the comparison data; and
   a reversible counter for generating a select signal of the selection circuit on the basis of a comparison output of the comparator.

4. The random number generator according to claim 3, wherein a random number outputted from the flip-flop or a random number constructed by scrambling the former random number is used as set data of the repetition cycle set for the first counter and the comparison data of the comparator.

5. The random number generator according to claim 3, further comprising an auxiliary random number generating unit having a same structure as the random number generator as set forth in claim 3, wherein a random number from the auxiliary random number generating unit is used as set data of the repetition cycle set for the first counter and the comparison data of the comparator.

6. The random number generator according to claim 3, further comprising an auxiliary random number generating unit having a same structure as the random number generator as set forth in claim 3, wherein a random number from the auxiliary random number generating unit and a random number constructed by scrambling a random number from the random number generator are used as set data of the repetition cycle set for the first counter and the comparison data of the comparator.

7. The random number generator according to claim 3, further comprising an initial control circuit for setting the comparison data of the comparator to 0 for a specified period when power is turned on.

8. The random number generator according to claim 1, wherein a waveform shaping circuit is added to an input signal line of the flip-flop.

9. The random number generator according to claim 1, wherein a D-type flip-flop or an R-S flip-flop is used as the flip-flop.

10. A random number generator, according to claim 1 further comprising a plurality of the random number generators as set forth in claim 1 arranged in parallel to one another.

11. A probability generator, Further comprising the random number generator as set forth in claim 1.

12. A random number generator in which a phase difference between two input signals inputted to a flip-flop is automatically adjusted to make an occurrence ratio of 1 or 0 of an output from the flip-flop constant, characterized in that
   a jitter generation circuit including a source for generating a noise, an amplifier circuit for amplifying the noise, and a mixer circuit for generating jitter in the input signals by the amplified noise signal is added to an input line of the flip-flop.

13. The random number generator according to claim 12, wherein the jitter generation circuit is added to both input lines of the flip-flop.

14. The random number generator according to claim 12, wherein the jitter generation circuit is added to any one of input lines of the flip-flop, and an integration circuit for delay time correction is added to the other of the input lines.

15. The random number according to claim 12, further comprising latch means for latching an output of the jitter generation circuit every repetition cycle of the input signals.

16. The random number generator according to claim 12, wherein that the mixer circuit includes an integration circuit, and a series connection circuit of a series P-channel transistor circuit and a series N-channel transistor circuit respectively having, as inputs, the integration output signal and the amplified noise signal.

17. The random number generator according to claim 12, wherein the mixer circuit includes a series transistor circuit of an N-channel transistor and a P-channel transistor having, as an input, a combined signal of the amplified noise signal and the input signal.

18. The random number generator according to claim 12, wherein the amplifier circuit includes a series input circuit of a capacitor and a resistor, and a series circuit of a P-channel transistor and an N-channel transistor, and a resistor intervenes between an input and an output of the transistor circuit.

19. The random number generator according to claim 18, wherein the amplifier circuit is connected in multistage and in series.

20. The random number generator according to claim 12, wherein the amplifier circuit includes a series input circuit of a capacitor and a resistor, and a series circuit of a P-channel transistor and an N-channel transistor, and a resistor and a capacitor intervene in parallel between an input and an output of the transistor circuit.

21. The random number generator according to in claim 12, wherein the source for generating the noise is constructed by connecting a P-channel transistor and an N-channel transistor in series and short-circuiting an input and an output.

22. The random number generator according to claim 12, wherein the source for generating the noise is constructed by connecting a P-channel transistor and an N-channel transistor in series and making a resistor intervene between an input and an output.

23. The random number generator according to in claim 12, wherein that the source for generating the noise is constructed by connecting a P-channel transistor and an N-channel transistor in series, making a resistor intervene between an input and an output, and making a series circuit of a resistor and a capacitor intervene between the input and GND.

24. The random number generator according to claim 12, wherein that the source for generating the noise is constructed by connecting a P-channel transistor and an N-channel transistor in series, making a resistor intervene between an input and an output, and making a series circuit of a resistor and a capacitor intervene between the input and a power supply.

25. The random number generator according to claim 12, wherein the source for generating the noise is constructed by short-circuiting an input and an output of an N-channel transistor, and making a resistor intervene between the output and a power supply.

26. The random number generator according to claim 12, wherein the source for generating the noise is constructed by making a resistor intervene between an input and an output of an N-channel transistor, and by making a resistor intervene between the output and a power supply.

27. The random number generator according to claim 12, wherein the source for generating the noise is constructed by short-circuiting an input and an output of a P-channel transistor, and by making a resistor intervene between the output and GND.

28. The random number generator according to claim 12, wherein the source for generating the noise is constructed by making a resistor intervene between an input and an output of a P-channel transistor, and by making a resistor intervene between the output and GND.

29. A probability generator comprising the random number generator as set forth in claim 12.

30. A random number generator in which a phase difference between two input signals is automatically adjusted to make an occurrence ratio of 1 or 0 of an output from a flip-flop constant, characterized in that
a phase-voltage conversion circuit for converting the phase difference between the two input signals into a voltage is added to a data input line of the flip-flop.

31. The random number generator according to claim 30, wherein the phase-voltage conversion circuit includes enable means operating only at an operation permissible time.

32. The random number generator according to claim 30, wherein a jitter generation circuit including a source for generating a noise, an amplifier circuit for amplifying the noise, and a mixer circuit for generating jitter in the input signals by the amplified noise signal is added to an output of the phase-voltage conversion circuit.

33. The random number generator according to claim 12 or 32, wherein that the jitter generation circuit includes enable means operating only at an operation permissible time.

34. A random number generator in which a phase difference between two input signals inputted to an R-S flip-flop is automatically adjusted to make an occurrence ratio of 1 or 0 of an output from the flip-flop constant, characterized in that
a P-channel transistor is connected in series to a power supply side of an R side gate circuit or an S side gate circuit of an internal transistor circuit constituting the R-S flip-flop, an N-channel transistor is connected in series to a GND side, a source for generating a noise and an amplifier circuit for amplifying the noise are connected to inputs of the P-channel transistor and the N-channel transistor, and a threshold voltage of one of the gate circuits is changed by the amplified noise signal.

35. A random number generator in which a phase difference between two input signals inputted to an R-S flip-flop is automatically adjusted to make an occurrence ratio of 1 or 0 of an output from the flip-flop constant, characterized in that
a P-channel transistor is connected in series to a power supply side of an R side gate circuit and an S side gate circuit of an internal transistor circuit constituting the R-S flip-flop, an N-channel transistor is connected in series to a GND side, a source for generating a noise and an amplifier circuit for amplifying the noise are connected to inputs of the P-channel transistor and the N-channel transistor, and threshold voltages of both of the gate circuits are changed by the amplified noise signal.

36. A random number generator comprising:
a flip-flop in which an output state (0 or 1) becomes definite according to a phase difference between two input signals;
a phase adjustment unit for adjusting phases of the input signals; and
a feedback circuit unit for controlling the phase difference so that an occurrence ratio of 0 or 1 of an output from the flip-flop by the input signals converges on a given value within a specified repetition cycle,
wherein the phase adjustment unit includes coarse adjustment means of a phase and fine adjustment means operating in sequence to achieve enlargement of a phase adjustment width and shortening of a phase adjustment time.

37. The random number generator according to claim 36, wherein each of the coarse adjustment means and the fine adjustment means includes a delay circuit for delaying the input signals at several stages and outputting them, a selection circuit for selecting one of delay outputs according to a select input, and a reversible counter for controlling the select input according to the phase difference.

38. The random number generator according to claim 36, further comprising an initial control circuit for making the repetition cycle shorter than the repetition cycle at a normal operation time for a given period from power activation.

39. The random number generator according to claim 36, wherein a noise generation source and a noise/phase converter are added to both input lines of the flip-flop.

40. The random number generator according to claim 36, wherein a noise generation source and a noise/phase converter are added to any one of input lines of the flip-flop.

41. A random number generator comprising:
a flip-flop in which an output state (0 or 1) becomes definite according to a phase difference between two input signals;
a phase adjustment unit for adjusting phases of the input signals; and
a feedback circuit unit for controlling the phase difference so that an occurrence ratio of 0 or 1 of an output from the flip-flop by the input signals converges on a given value within a specified repetition cycle, wherein:

the phase adjustment unit includes a delay circuit for delaying the input signals at several stages and outputting them, a selection circuit for selecting one of delay outputs according to a select input, and a reversible counter for controlling the select input according to the phase difference, and includes a control circuit for comparing a normal distribution of the occurrence ratio of 0 or 1 with the number of times of occurrence of 0 or 1 within the repetition cycle and making a count number of the reversible counter variable according to a position of the normal distribution to which the number of times of occurrence corresponds to achieve shortening of the phase adjustment time.

* * * * *